US012592044B2

(12) United States Patent
Holmes

(10) Patent No.: US 12,592,044 B2
(45) Date of Patent: \*Mar. 31, 2026

(54) SYSTEMS AND METHODS FOR PROVIDING REAL-TIME COMPOSITE VIDEO FROM MULTIPLE SOURCE DEVICES FEATURING AUGMENTED REALITY ELEMENTS

(71) Applicant: Russell Holmes, Otley (GB)

(72) Inventor: Russell Holmes, Otley (GB)

( \* ) Notice: Subject to any disclaimer, the term of this patent is extended or adjusted under 35 U.S.C. 154(b) by 0 days.

This patent is subject to a terminal disclaimer.

(21) Appl. No.: 18/230,503

(22) Filed: Aug. 4, 2023

(65) Prior Publication Data

US 2023/0386147 A1     Nov. 30, 2023

Related U.S. Application Data

(63) Continuation-in-part of application No. 17/892,990, filed on Aug. 22, 2022, now Pat. No. 12,020,389,
(Continued)

(51) Int. Cl.
*G06T 19/00*        (2011.01)
*G06F 3/01*         (2006.01)
(Continued)

(52) U.S. Cl.
CPC ............ *G06T 19/006* (2013.01); *G06F 3/011* (2013.01); *G06F 3/016* (2013.01); *G06T 15/20* (2013.01); *G06V 20/41* (2022.01); *G06V 40/11* (2022.01)

(58) Field of Classification Search
CPC . G06T 19/006; G06T 2219/024; G06T 11/00; G06F 3/011; G06F 3/016; G06F 3/012; G06F 3/04815; G06V 20/41; G06V 20/20; G06V 20/46; G06V 40/161; G06V 40/107; G06V 40/10; G06V 40/16; G06V 40/20; H04N 2007/145; H04N 21/816; H04N 7/147; H04N 7/157; H04N 21/23418; H04N 21/4312; H04N 21/4788; H04M 2201/50; H04M 3/567; H04M 2203/359; G11B 27/031; G11B 27/28

See application file for complete search history.

(56) References Cited

U.S. PATENT DOCUMENTS 4,187,487 A     2/1980  Numata et al.
5,751,337 A     5/1998  Allen et al.
(Continued)

OTHER PUBLICATIONS

Boyer et al., "The Personal Presence System—A Wide Area Network Resource for The Real Time Composition of Multipoint Multimedia Communications," Oct. 15, 1994, pp. 453-460, XP000646542, pp. 455.456, figures 2-5.
(Continued)

*Primary Examiner* — Stephen G Sherman

(57) ABSTRACT

Systems and methods for superimposing the human elements of video generated by computing devices, wherein a first user device implemented as a mixed reality headset and second user device capture and transmit video to a central server which analyzes the video to identify and extract human elements, superimpose these human elements upon one another, adds in at least one augmented reality element, and then transmits the newly created superimposed video back to at least one of the user devices.

31 Claims, 49 Drawing Sheets

Related U.S. Application Data which is a continuation-in-part of application No. 17/197,935, filed on Mar. 10, 2021, now Pat. No. 11,423,627, which is a continuation-in-part of application No. 16/745,997, filed on Jan. 17, 2020, now Pat. No. 11,151,796, which is a continuation-in-part of application No. 16/116,613, filed on Aug. 29, 2018, now Pat. No. 10,636,215, which is a continuation of application No. 15/670,682, filed on Aug. 7, 2017, now Pat. No. 10,089,793, which is a continuation-in-part of application No. 15/360,536, filed on Nov. 23, 2016, now Pat. No. 9,729,820.

(60) Provisional application No. 63/287,354, filed on Dec. 8, 2021, provisional application No. 63/274,230, filed on Nov. 1, 2021, provisional application No. 62/887,721, filed on Aug. 16, 2019, provisional application No. 62/485,558, filed on Apr. 14, 2017, provisional application No. 62/407,267, filed on Oct. 12, 2016, provisional application No. 62/383,006, filed on Sep. 2, 2016, provisional application No. 62/834,285, filed on Apr. 15, 2019, provisional application No. 62/830,556, filed on Apr. 8, 2019, provisional application No. 62/836,147, filed on Apr. 19, 2019.

(51) Int. Cl.
| | | |
|---|---|---|
| *G06T 15/20* | (2011.01) | |
| *G06V 20/40* | (2022.01) | |
| *G06V 40/10* | (2022.01) | |

(56) References Cited

U.S. PATENT DOCUMENTS

| | | | |
|---|---|---|---|
| 7,106,358 | B2 | 9/2006 | Valliath et al. |
| 7,855,737 | B2 | 12/2010 | Petrescu et al. |
| 7,907,638 | B2 | 3/2011 | Norhammar et al. |
| 8,004,555 | B2 | 8/2011 | Oswald et al. |
| 8,072,479 | B2 | 12/2011 | Valliath et al. |
| 8,467,510 | B2 | 6/2013 | Hillis et al. |
| 8,502,856 | B2 | 8/2013 | Cranfill et al. |
| 9,007,427 | B2 | 4/2015 | Hoover et al. |
| 9,015,242 | B2 | 4/2015 | Dorso et al. |
| 9,118,804 | B2 | 8/2015 | Kim et al. |
| 9,165,318 | B1 | 10/2015 | Pauley et al. |
| 9,172,752 | B2 | 10/2015 | Dorso et al. |
| 9,269,009 | B1 | 2/2016 | Liu et al. |
| 9,282,287 | B1 | 3/2016 | Marsh |
| 9,349,414 | B1 | 5/2016 | Furment et al. |
| 9,503,682 | B2 | 11/2016 | Avrahami et al. |
| 9,729,820 | B1 | 8/2017 | Holmes |
| 2006/0012694 | A1 | 1/2006 | Yoneda et al. |
| 2009/0327893 | A1 | 12/2009 | Terry et al. |
| 2011/0060835 | A1 | 3/2011 | Dorso et al. |
| 2011/0066924 | A1 | 3/2011 | Dorso et al. |
| 2011/0249074 | A1* | 10/2011 | Cranfill ................. G06F 3/0486 348/E7.083 |
| 2012/0120186 | A1* | 5/2012 | Diaz ...................... H04N 23/63 348/E13.001 |
| 2012/0314077 | A1* | 12/2012 | Clavenna, II .......... H04N 5/272 348/E7.086 |
| 2013/0050070 | A1 | 2/2013 | Lewis et al. |
| 2013/0162766 | A1 | 6/2013 | Cohen |
| 2013/0205163 | A1 | 8/2013 | Dorso et al. |
| 2014/0071044 | A1 | 3/2014 | Nam |
| 2015/0172599 | A1 | 6/2015 | Caldwell |
| 2015/0188970 | A1 | 7/2015 | Kowshik et al. |
| 2015/0244987 | A1 | 8/2015 | Delegue et al. |
| 2015/0288933 | A1 | 10/2015 | Iversen et al. |
| 2016/0065880 | A1 | 3/2016 | Pearson et al. |
| 2016/0156838 | A1 | 6/2016 | Cheng et al. |
| 2016/0189425 | A1 | 6/2016 | Li et al. |
| 2016/0210998 | A1 | 7/2016 | Leske |
| 2016/0277708 | A1 | 9/2016 | Rintel et al. |
| 2017/0026635 | A1 | 1/2017 | Nadler |

OTHER PUBLICATIONS

International Search Report of the International Searching Authority prepared by the USPTO in connection with the PCT/G2017/052532, dated Nov. 1, 2017; Entire Document (6 pages).
International Search Report of the International Searching Authority prepared by the USPTO in connection with the PCT/G2017/052533, dated Nov. 1, 2017; Entire Document (6 pages).

* cited by examiner

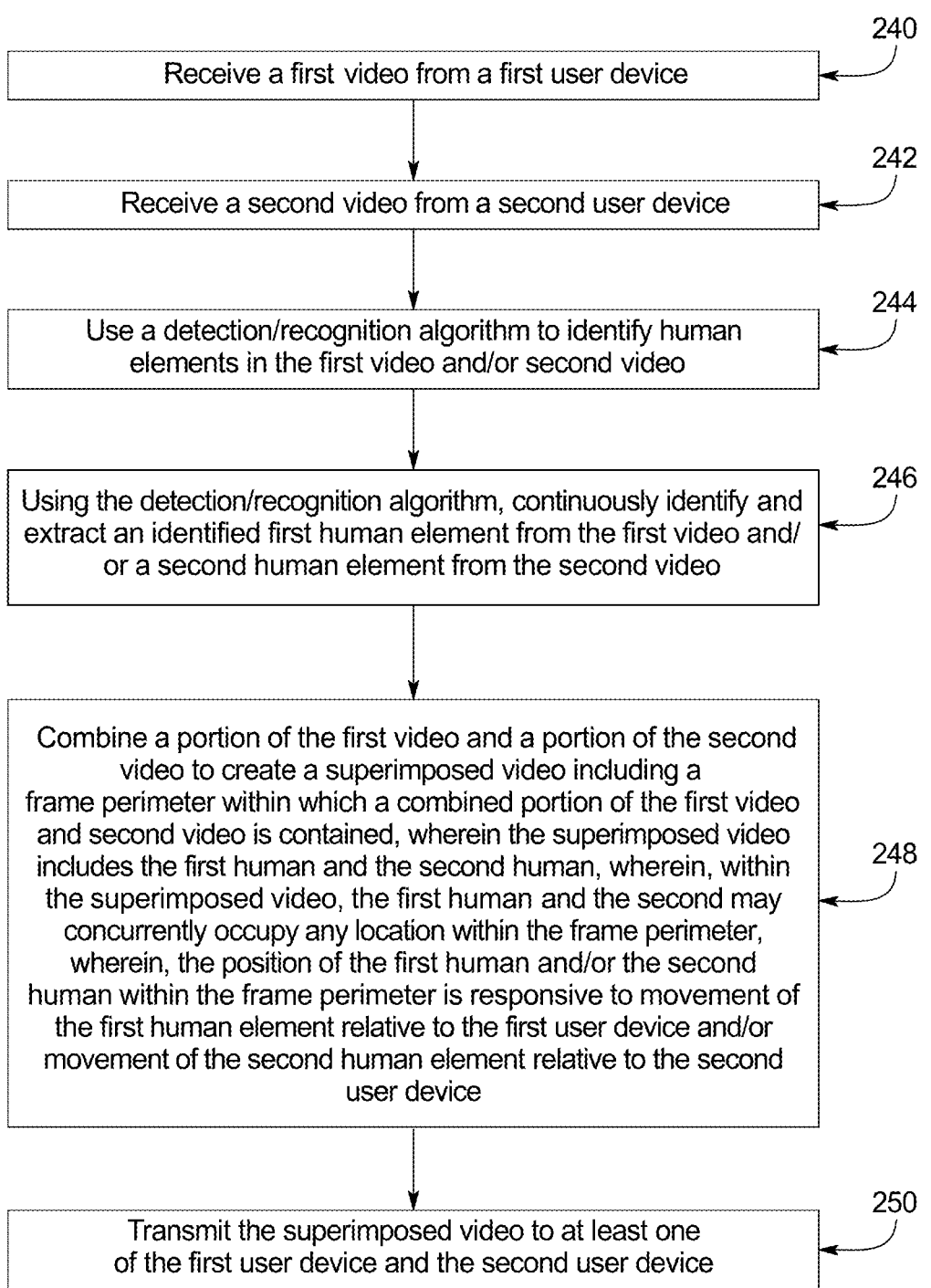

240

Receive a first video from a first user device

242

Receive a second video from a second user device

244

Use a detection/recognition algorithm to identify human elements in the first video and/or second video

246

Using the detection/recognition algorithm, continuously identify and extract an identified first human element from the first video and/ or a second human element from the second video

248

Combine a portion of the first video and a portion of the second video to create a superimposed video including a frame perimeter within which a combined portion of the first video and second video is contained, wherein the superimposed video includes the first human and the second human, wherein, within the superimposed video, the first human and the second may concurrently occupy any location within the frame perimeter, wherein, the position of the first human and/or the second human within the frame perimeter is responsive to movement of the first human element relative to the first user device and/or movement of the second human element relative to the second user device

250

Transmit the superimposed video to at least one of the first user device and the second user device

FIG. 3

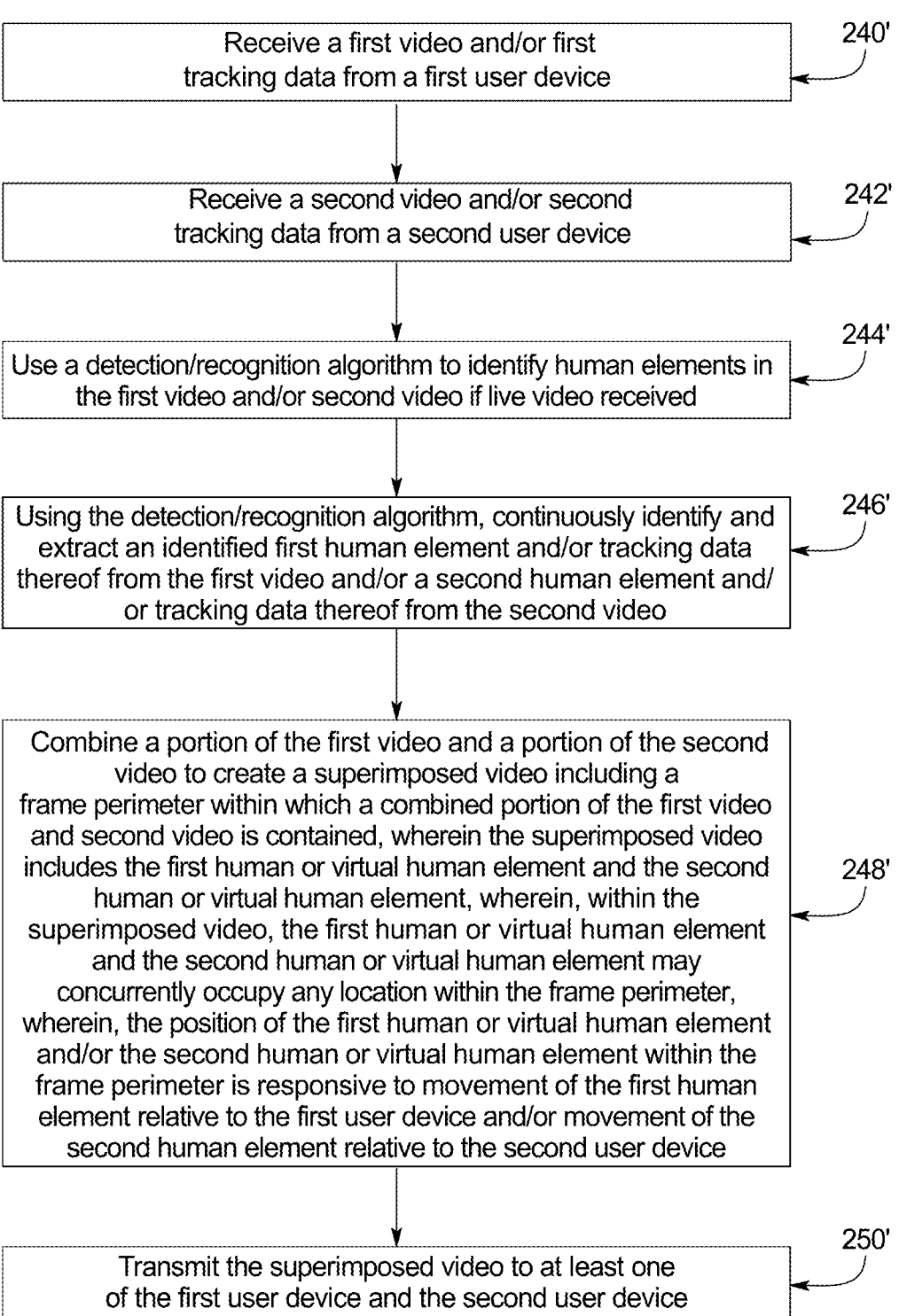

Receive a first video and/or first
tracking data from a first user device    240'

Receive a second video and/or second
tracking data from a second user device    242'

Use a detection/recognition algorithm to identify human elements in
the first video and/or second video if live video received    244'

Using the detection/recognition algorithm, continuously identify and
extract an identified first human element and/or tracking data
thereof from the first video and/or a second human element and/
or tracking data thereof from the second video    246'

Combine a portion of the first video and a portion of the second
video to create a superimposed video including a
frame perimeter within which a combined portion of the first video
and second video is contained, wherein the superimposed video
includes the first human or virtual human element and the second
human or virtual human element, wherein, within the
superimposed video, the first human or virtual human element
and the second human or virtual human element may
concurrently occupy any location within the frame perimeter,
wherein, the position of the first human or virtual human element
and/or the second human or virtual human element within the
frame perimeter is responsive to movement of the first human
element relative to the first user device and/or movement of the
second human element relative to the second user device    248'

Transmit the superimposed video to at least one
of the first user device and the second user device    250'

FIG. 11

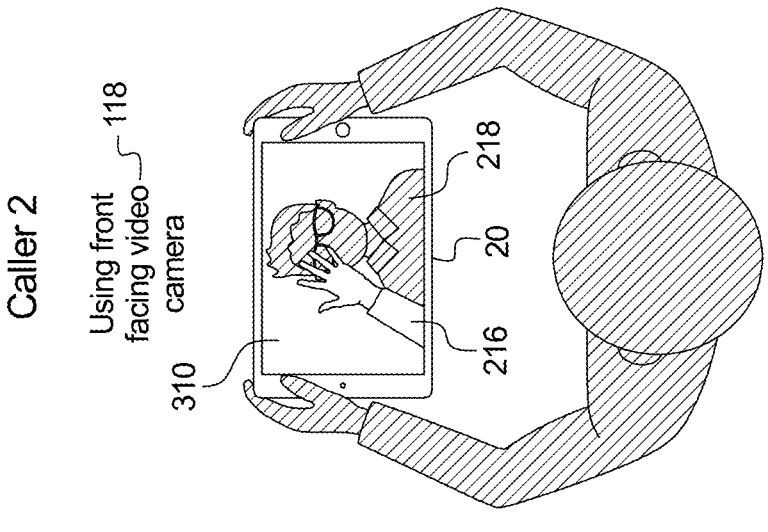
Caller 2
Using front
facing video—118
camera
310
218
20
216
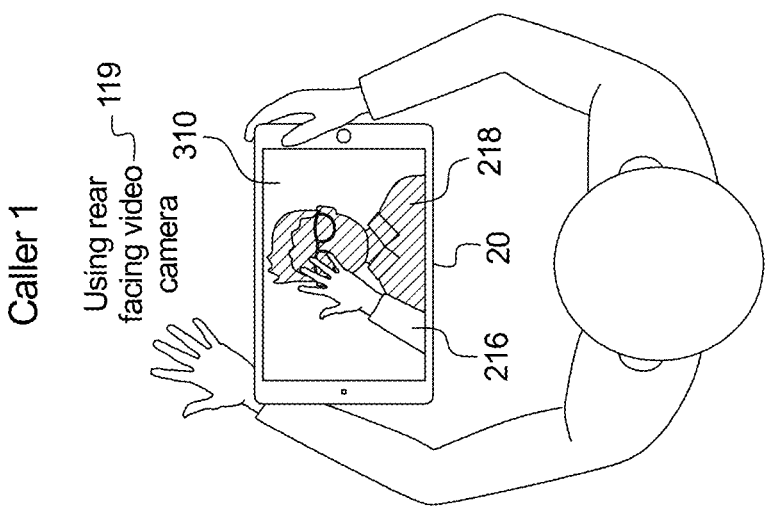
Caller 1
Using rear
facing video—119
camera
310
218
20
216
10
FIG. 12A

Caller 2 End User Device 20 118

Front camera active 210

Front camera video or tracking data sent 214

Superimposed video displayed to end users

Central Server 30

Human element tracking data identified and extraneous video elements removed from videos (optional)

Videos superimposed with human and/or virtual elements

Superimposed video sent to end users 310

Caller 1 End User Device 20 119

Rear camera active 210

Rear camera video or tracking data sent 212

Superimposed video displayed to end users

FIG. 12B

10

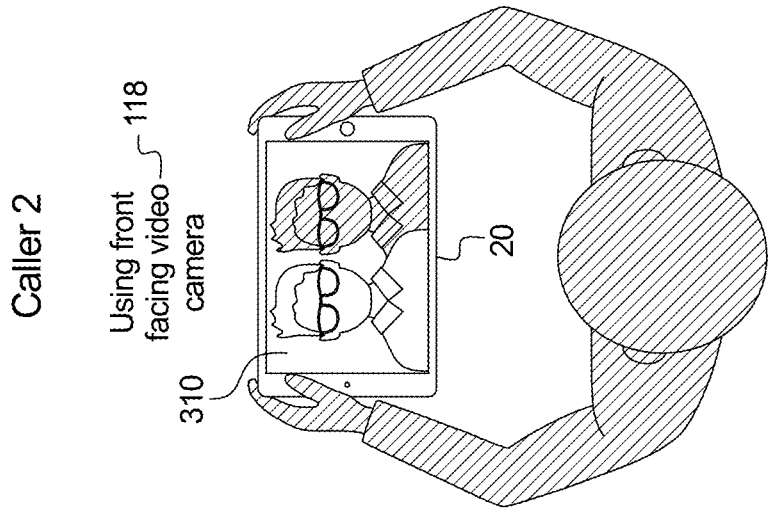
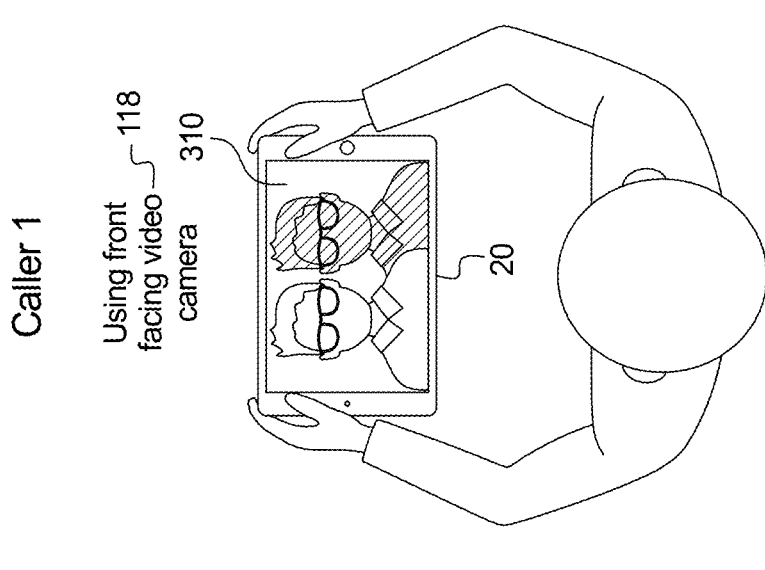
FIG. 13A

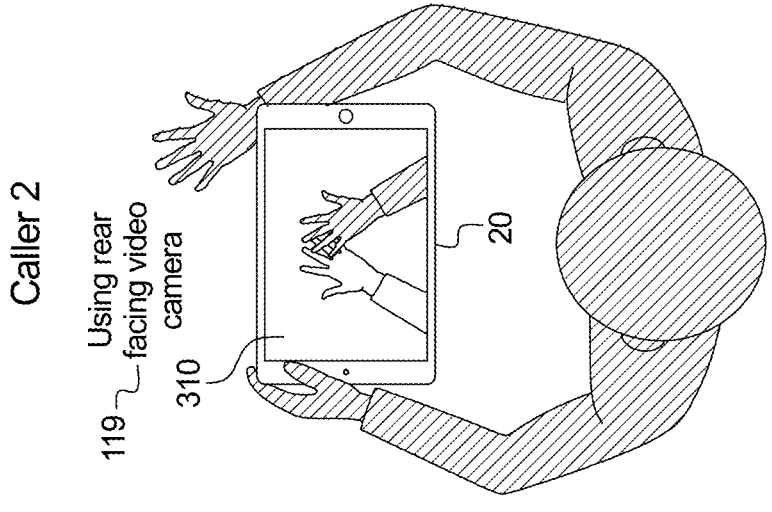
Caller 2
Using rear
facing video
camera
119
310
20
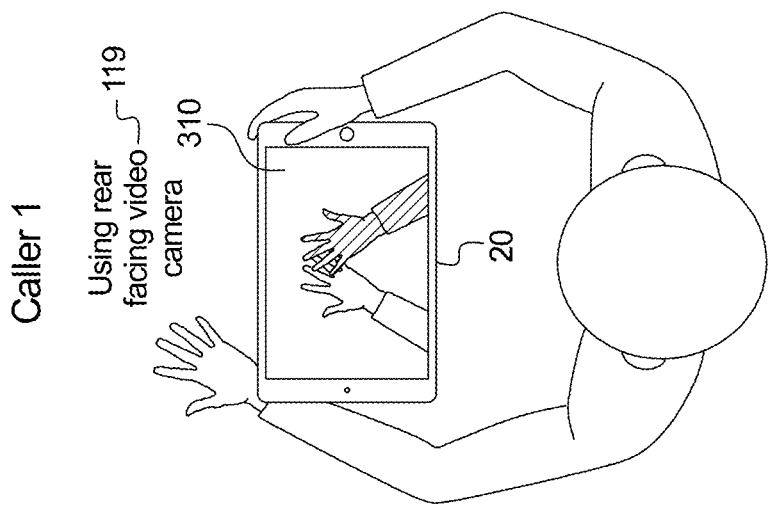
Caller 1
Using rear
facing video
camera
119
310
20
10
FIG. 14A Caller 2 End User Device 20 119

Rear camera active

Rear camera video and/or tracking data sent 210

Superimposed video displayed to end users

Central Server 30

Human element location data identified and extraneous video elements removed from videos (optional)

Video superimposed with human and/or virtual elements

Superimposed video sent to end users 310

Caller 1 End User Device 20 119

Rear camera active

Rear camera video and/or tracking data sent 210

Superimposed video displayed to end users

FIG. 14B

10

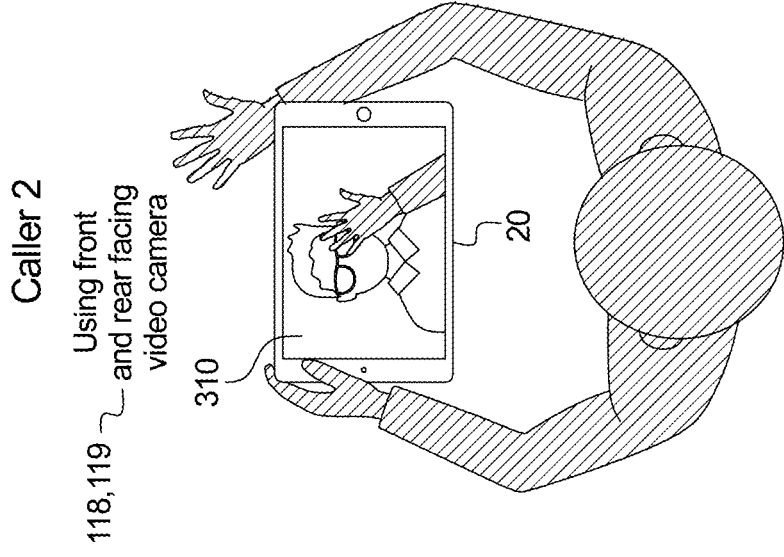
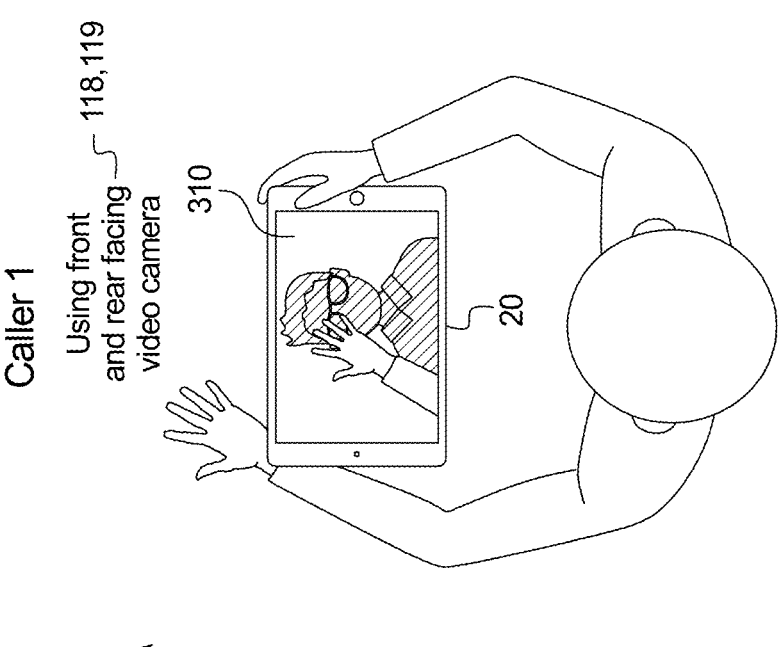
FIG. 15A

Caller 2 End User Device 20

Front camera active 118

Front camera video and/or tracking data sent 210

Rear camera active 119

Rear camera video and/or tracking data sent 210

Central Server 30

Human element location data identified and extraneous video elements removed from videos (optional)

Video superimposed with human and/or virtual elements

Superimposed video sent to end users 310

Superimposed video displayed to end users

Caller 1 End User Device 20

Front camera active 118

Front camera video and/or tracking data sent 210

Rear camera active 119

Rear camera video and/or tracking data sent 210

Superimposed video displayed to end users

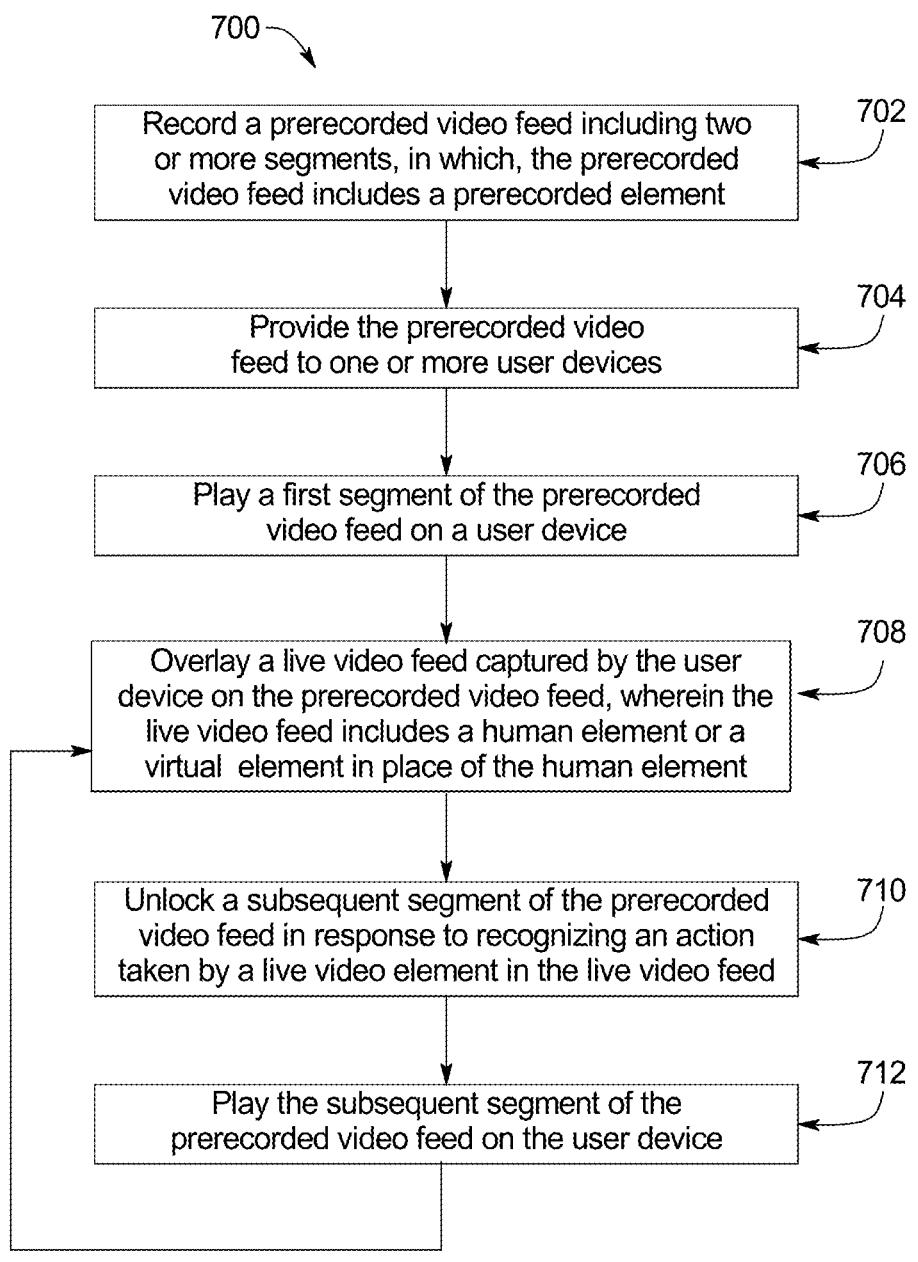

700

Record a prerecorded video feed including two or more segments, in which, the prerecorded video feed includes a prerecorded element — 702

Provide the prerecorded video feed to one or more user devices — 704

Play a first segment of the prerecorded video feed on a user device — 706

Overlay a live video feed captured by the user device on the prerecorded video feed, wherein the live video feed includes a human element or a virtual element in place of the human element — 708

Unlock a subsequent segment of the prerecorded video feed in response to recognizing an action taken by a live video element in the live video feed — 710

Play the subsequent segment of the prerecorded video feed on the user device — 712

FIG. 18C

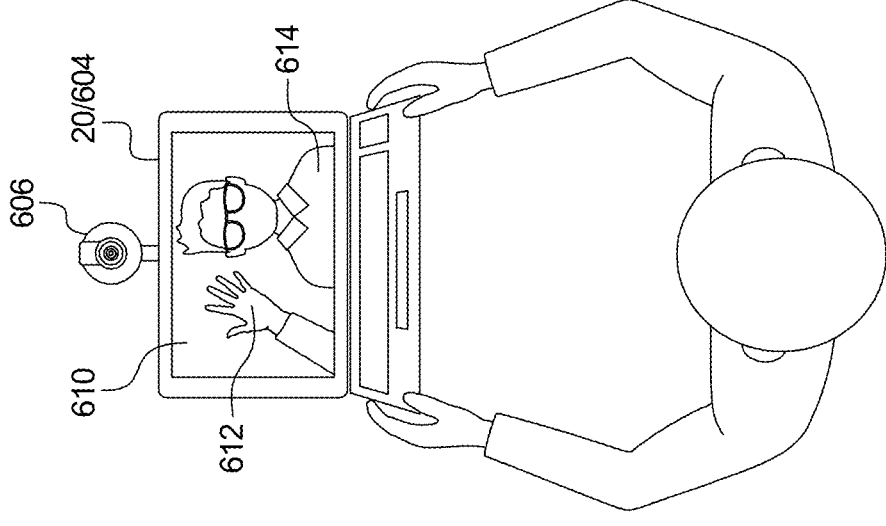
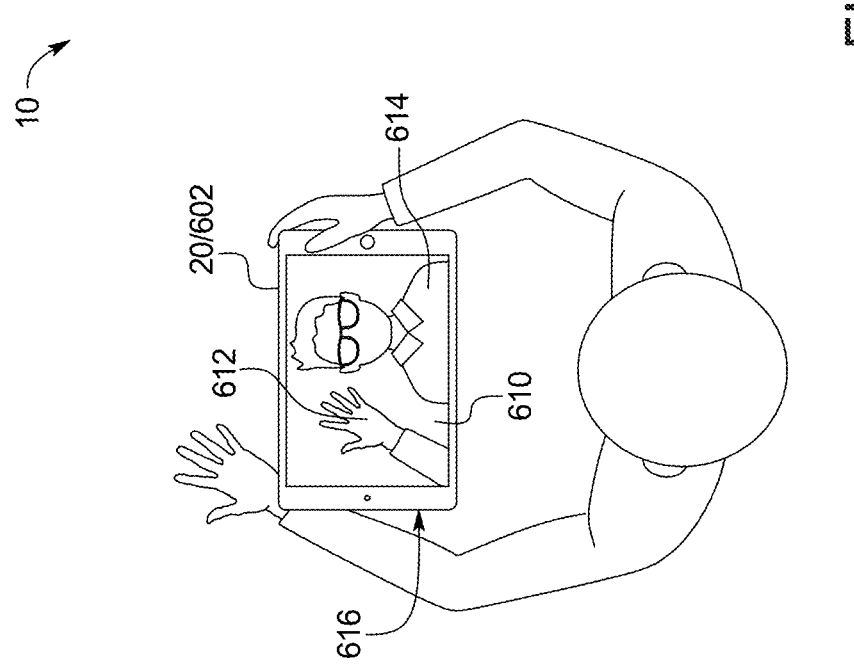
FIG. 19

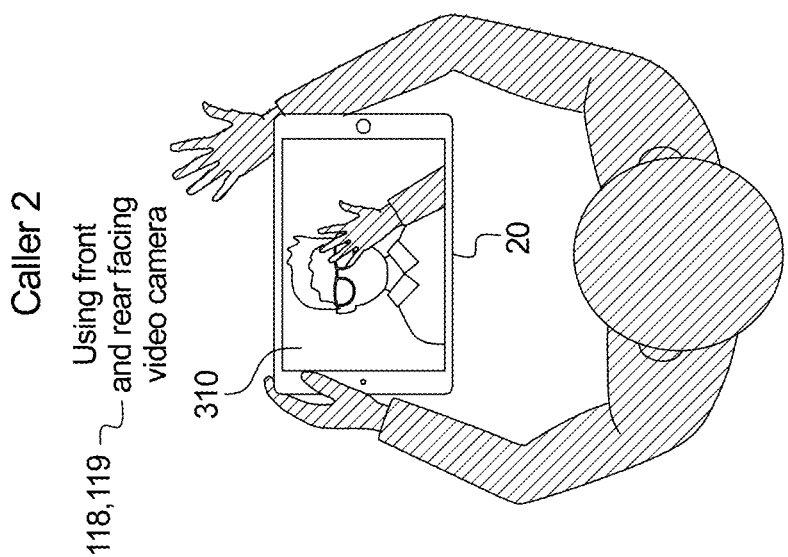
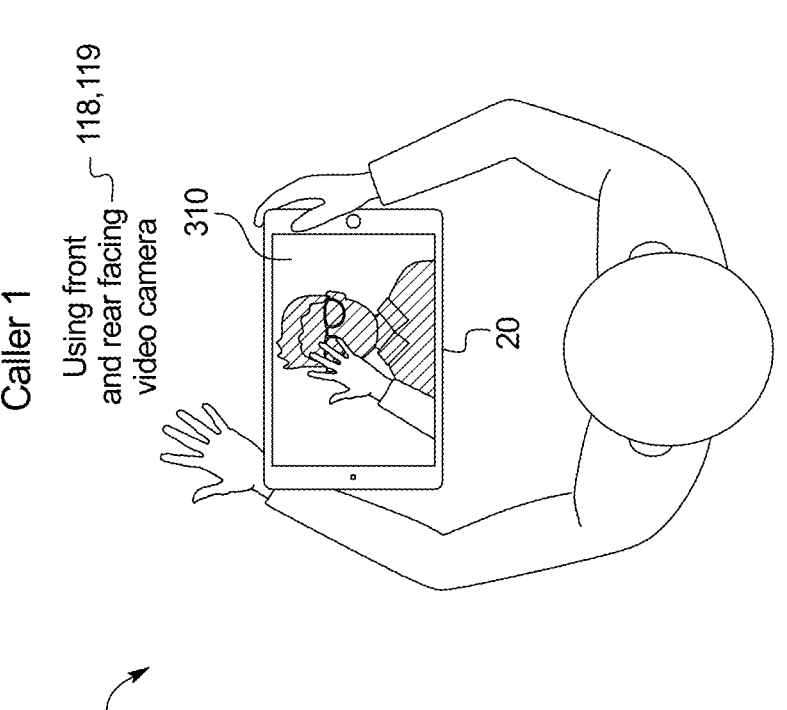
FIG. 26

SYSTEMS AND METHODS FOR PROVIDING REAL-TIME COMPOSITE VIDEO FROM MULTIPLE SOURCE DEVICES FEATURING AUGMENTED REALITY ELEMENTS

BACKGROUND OF THE INVENTION

The present subject matter relates generally to a teleconferencing system. More specifically, the present invention relates to teleconferencing system that simulates the mutual physical presence of users in a virtual interaction featuring augmented reality elements.

A teleconference or video interaction over almost any distance is an inherently impersonal experience. Many developments in recent technology have aimed to solve the issue of people missing the aspects of human interactions hearing someone's voice alone does not provide. From teleconferencing, to FaceTime and Snapchat, the use of video calling and messages has greatly enhanced communicating over great distances, but these innovations are not without their shortcomings. Companies such as Snapchat and Facebook have developed augmented reality facial filters, lenses, etc. to create another more interesting dimension to a standard video message, chat, or call.

Existing video call technology does not allow a user to feel as though they are in close proximity to the person being called. While users may be able to see and speak with a colleague or loved one over FaceTime, etc. it is readily apparent both users of such technology are in separate locations. Additionally, current video calls and chats do not incorporate augmented reality into such calls or chats, missing an opportunity for fun and excitement.

Accordingly, there is a need for a video communication system that simulates the mutual physical presence of users in virtual interactions featuring augmented reality elements.

BRIEF SUMMARY OF THE INVENTION

To meet the needs described above and others, in one embodiment, the subject matter provided herein is embodied in a video call application that provides users the illusion of both being present in a single physical location. Specifically, the embodiment presents the users the visual experience of being able to reach out and touch the person with whom they are speaking. The experience is provided through an application that allows users to make a video call with the additional benefit of being able to superimpose the video from other user(s) devices' cameras onto the video displayed on each of the user devices' screens. This can be used to provide a real-time video image of all callers on the same screen, simulating that everyone involved in the call are physically in each other's presence. Accordingly, the systems and methods herein may be used to create a first-person or third-person perspective point of view for a participant in a video call in which the overlapping human elements in a superimposed video simulate the visual impression of physical contact between two users.

Some embodiments used herein to describe the invention identify and combine human elements in a video using the rear and/or front facing camera(s) of a mobile device (a front facing camera being a camera facing the user while the user is viewing the device's display and a rear facing camera being a camera facing away from the user while the user is viewing the device's display). However, it is understood that those skilled in the art will recognize that the user device does not need to be a mobile device, it may be an alternative such as a laptop or PC computer, mixed reality headset (or similar) equipped with either or both a forward and rear facing cameras or a configuration of cameras used to capture images of a focal point from various angles in order to generate volumetric imaging and/or holograms. In instances in which alternative devices are being used, an external peripheral camera device must be used as the rear camera to prevent the user from having to awkwardly reach around to the back side of the device (for example, it may be difficult for a user to reach to the back side of an alternative device while still viewing the display screen at the front of the device). The rear facing camera is intended to be used to capture a real-time video feed of human element(s), such as hands, hands and arms or intimate body parts, such as genitalia, etc. In other embodiments, the human elements may be displayed as three-dimensional video. The three-dimensional video may be captured and created using volumetric video techniques described herein. The device may use a detection/recognition algorithm to identify these human elements captured in the viewing field of a rear and/or front facing camera(s) of an end user device (e.g. smartphones, tablets, personal computers, mixed reality headsets, etc.).

The video call application described herein presents a superimposed video to end user devices. The superimposed video feed combines a first video feed of a first human element and a second video feed of a second human element, optionally including augmented or virtual reality elements. In all embodiments described herein, the first video feed and/or the second video feed may be a live or prerecorded two-dimensional video feed or a live or prerecorded volumetric video feed.

Throughout the application the term "human element" is used to refer to: (a) a video image of a real life human element captured by a camera of a mobile device; or (b) an augmented representation of a human element produced from tracking data or depth data of a real-life human element captured by a camera (or other visual, imaging, or proximity sensor). The augmented representation of the human element is not required to take the appearance of a human form and may be represented in any alternative form (e.g. as a robot, animal, alien, cartoon character, graphical representation, alternative human, etc.)

In one example, a first user may reach behind a mobile device during a video call, whilst still being able to look at the front display screen of their mobile device. The front display screen of their mobile device would show a superimposed real-time video containing a human element, superimposed with real time video from a second user's device. The resulting superimposed video, containing overlapping human elements from each user gives a visual impression of physical interaction between the users. In some embodiments, The application which enables this functionality may be standalone or integrated into other video calling applications. The application may run on mobile devices (e.g., smartphones, tablets, mixed reality headsets, etc.) and personal computers (e.g., desktop computers, laptops, etc.).

Another way in which the application may achieve the superimposed video effect is by use of the multiple cameras of a smartphone, tablet or mixed reality headsets. Most mobile devices have two cameras, one on the front face of the device and one on the back. Some newer devices (e.g., the iPhone 7) include multiple cameras on the back of the device in addition to one or more front facing cameras. In a second example, the application may allow multiple cameras on a user device to be active at the same time, with the system superimposing the human elements (e.g., face, body, hands, genitalia, etc.) of the video captured by device cameras to give an illusion of physical interaction.

In a third example, the application may utilize a first user's rear facing camera and a second user's front facing camera to enable the first user to physically reach around to the back of the first user device such that the first user's hand (a human element of a video) appears on the second user's screen when the first user's hand is in view of their device's back camera. This arrangement enables the users to both view the video call on their given device's while simultaneously creating a visual representation of physical touching. This effect is achieved by the first user reaching behind their mobile device into the field of view their rear facing camera which is capturing video. The combination of superimposing a video of a hand (or other human element) taken from a rear facing camera of a mobile device; with a human element (e.g., a face, neck, and torso) from a second users second users video creates the visual representation of physical interaction/touch between the callers. It should be noted the first user's hand could be superimposed over the face, body, or any other human (or non-human) element(s) captured by the second user's camera. This allows users of the system to carry out the illusion of physical interactions such as shaking hands, high-fiving, etc. depending on which device cameras are utilized by end users.

As used throughout this disclosure, any time the term "live video" is used, it may be in reference to video in any format including: (i) a traditional two-dimensional video feed; (ii) a volumetric video feed; (iii) holographic video; (iv) higher dimensional video feed (four-dimensional, five-dimensional, etc.); or (v) any combination of the preceding.

In a further embodiment, a neural radiance field (NeRF) is used to generate images for use with the multi-feed video call system described herein. NeRF is a fully-connected neural network that can generate novel views of complex three-dimensional scenes based on a partial set of two-dimensional images. NeRF is trained to use a rendering loss to produce input views of a scene by taking input images representing a scene and interpolating between them to render one complete scene. NeRF is a highly effective way to generate images for synthetic data.

A NeRF network is trained to map directly from viewing direction and spatial location (five-dimensional input) to opacity and color (four-dimensional output), using volume rendering to render new views. NeRF is a computationally-intensive algorithm, and processing of complex scenes can take hours or days. However, new algorithms are available that dramatically improve performance.

Many of the various embodiments and examples described herein include a composite video in which two separate video sources, each including a human element, are combined. To more realistically combine human elements from multiple video sources, it may be useful to employ an auto-scaling function in which the size of the human element in each video source is scaled to more appropriately match the human element in the other video source. This may be especially important in examples in which contact is simulated between the human elements from each video source. For example, when combining a first user's hand and arm from a first video source with a second user's head and chest from a second video source, it may be advantageous to scale the video elements such that the proportions of the first user's hand and arm look natural in light of the proportions of the second user's head and chest. Such autoscaling may be accomplished by first recognizing which types of human elements are being combined in the composite video and referencing a data set including physiological parameters such as the standard proportions of body parts compared to each other. In this manner, the system may recognize that a male hand is one of the first human elements from a first video source that is being combined with a female head as one of the second human elements from a second video source and use statistical norms to scale the video including the male hand and/or the video including the female head such that the composite video appears to be a more natural combination.

Such automatic scaling may be accomplished in a scaling of the video feed or it may be accomplished by automatically adjusting a zoom setting of the image capturing device. Accordingly, the scaling may occur as part of the capture process, in the process of combining the video feeds, or in some cases in both stages.

The video from all cameras utilized by system users at a given time may be fed into a central server, which in turn transmits the video(s) to other user(s) involved in a given video call. The transmission and reception of the video calls may be carried out via the internet or any other functionally capable communications network with the superimposition of video carried out by user devices, the central server, or both depending on what is most functionally advantageous. Those skilled in the art with further recognize that any of the features and functions described herein as being carried out by a central server may instead be accomplished in a peer-to-peer system in which the devices communicate directly to each other without any intervention by a central server. In such instances, the any of the features and functions described herein as being performed by the server would instead be performed by the user devices.

In all examples/arrangements of the invention a detection/recognition algorithm may be used to identify and extract the human elements from a real-time or prerecorded video feed. One or more of the following detection/recognition methods may be used (in whole or in part) to identify and extract the human element(s) from a video feed: foreground and background separation, proximity recognition, Chroma keying, hand-arm/body detection, background subtraction, a Kalman filter or AI machine learning model, etc. Furthermore, once a human element is captured within the field of vision of an active camera of a user's device, the detection/recognition algorithm will continuously identify and extract the identified human element(s) in real time throughout the duration of the video call. The remainder of the video footage (that has not been identified or extracted as a human element from at least one of the video feeds) may be removed and not shown on the display screen of either user's device. As will be recognized by those skilled in the art, the detection/recognition methods may be based on or aided by the type or types of cameras being employed. For example, a three-dimensional, or depth-sensing, camera may be used to assist in identifying and extracting the human elements.

As noted, the systems and processes employed in the identification and extraction of the human elements in the videos may be completed using a depth-sensing camera, e.g., a time-of-flight camera. The depth-sensing camera may work in collaboration with other video cameras and other elements of the system to identify and extract a human element. The extracted human elements may be given three-dimensional properties using the three-dimensional data acquired by the depth-sensing camera. The three-dimensional data enables the system to cause certain human elements or augmented reality elements to occlude other human elements or augmented reality elements within the video call. The three-dimensional properties may also facilitate further augmented reality interaction. For example, the occlusion enabled by the three-dimensional data enables the superimposed video to more realistically show a person holding an augmented reality object.

The depth-sensing camera further enables the system to segment elements within the video based on their depth from the camera. This functionality may be used, for example, to identify the two-dimensional location of the human element to be extracted from the video feed.

The application may also allow users to create a user profile which features information about the user, their call preferences, contacts, etc. User profiles may be stored in the memory of the central server, on user devices, or both.

The application may allow for many different video call modes, including: Traditional Video Call—front or rear facing camera only; One Way Touch Call—a superimposed real time video image of one user's front camera and another user's rear camera (or vice versa); Rear Touch Call—a superimposed real time video image of both users' rear cameras (typically used to show holding hands, etc.); and Front Touch Call—a superimposed real time video image of both users' front cameras (typically used to show a kiss, etc.).

A goal of the present invention is to increase the quality, intimacy, and entertainment value of video calls. By using the front and rear cameras on a smart phone/tablet, the video superimposing system gives the impression of reaching out and touching another person, playing a game with them, putting virtual clothing upon them, etc. Such interactions are not possible with traditional video chat and could be invaluable to long distance couples, isolated elderly people, overseas business partners, etc.

In one embodiment, a computer-implemented method of superimposing video carried out by a processor, the method includes the steps of: receiving a first video from a first user device; receiving a second video from a second user device; identifying a first human element in the first video and a second human element in the second video; combining a portion of the first video and a portion of the second video in real-time to create a superimposed video including a frame perimeter within which a combined portion of the first video and second video is contained, wherein the superimposed video includes the first human element and the second human element, wherein, within the superimposed video, the first human element and the second human element may concurrently occupy any location within the frame perimeter; and transmitting the superimposed video to at least one of the first user device and the second user device.

In some examples, in response to real-time movement by the first human element in the first video and the second human element in the second video, contact is simulated between the first human element and the second human element in the superimposed video.

In other examples, in response to real-time movement by the first human element in the first video and the second human element in the second video, the first human element is superimposed upon the second human element in the superimposed video such that the first human element obscures at least a portion of the second human element.

In some examples, the first user device is a mobile computing device, in others, it is a personal computer. In some examples, the first video is captured by a camera of the first user device. In other examples, the first video is captured by at least two cameras of the first user device simultaneously.

In other examples, the first video is captured by a rear facing camera of the first user device, the second video is captured by a front facing camera of the second user device, and the first human element obscures at least a portion of the second human element in the transmitted superimposed video. In still others, the first video is captured by a rear facing camera of the first user device, the second video is captured by a rear facing camera of the second user device, and the first human element obscures at least a portion of the second human element in the transmitted superimposed video. Alternatively, the first video may be captured by a front facing camera of the first user device, the second video is captured by a front facing camera of the second user device, and the first human element obscures at least a portion of the second human element in the transmitted superimposed video.

Yet another embodiment may feature a computer-implemented system for superimposing video, comprising: a central server featuring a processor, memory, and networking interface; a first user device featuring a camera, processor, memory, and networking interface; a second user device featuring a camera, processor, memory, and networking interface; wherein the central server, receives a first video from a first user device and a second video from a second user device, identifies a first human element in the first video and a second human element in the second video, combines a portion of the first video and a portion of the second video in real-time to create a superimposed video including a frame perimeter within which a combined portion of the first video and second video is contained, wherein the superimposed video includes the first human element and the second human element, wherein, within the superimposed video, the first human element and the second human element may concurrently occupy any location within the frame perimeter, and transmits the superimposed video to at least one of the first user device and the second user device.

This system may, in response to real-time movement by the first human element in the first video and the second human element in the second video, contact is simulated between the first human element and the second human element in the superimposed video. The system may also, in response to real-time movement by the first human element in the first video and the second human element in the second video, the first human element is superimposed upon the second human element in the superimposed video such that the first human element obscures at least a portion of the second human element.

The system may run on a smartphone or desktop computer, wherein the first video is captured by a rear facing camera of the first user device, the second video is captured by a front facing camera of the second user device, and the first human element obscures at least a portion of the second human element in the transmitted superimposed video. Alternatively, the first video may be captured by a rear facing camera of the first user device, the second video is captured by a rear facing camera of the second user device, and the first human element obscures at least a portion of the second human element in the transmitted superimposed video. Additionally, the first video may be captured by a front facing camera of the first user device, the second video is captured by a front facing camera of the second user device, and the first human element obscures at least a portion of the second human element in the transmitted superimposed video.

In some examples of the systems and methods described herein, the superimposed video may simply be the human element of both callers' video feeds superimposed together. In another example, it may be the human element of one caller's video feed superimposed over the full video feed from the second caller. It is contemplated that there is a technical advantage to just overlaying one identified human element, rather than selecting two human elements. For example, just overlaying one identified human element over the full video feed of the other caller requires less computing resources and ideally results in less latency.

Embodiments of the presently disclosed system may also include augmented reality functionality. This augmented reality functionality may be incorporated into video calls carried out by the system in the form of augmented reality elements. Such elements may be augmented reality objects, environments, and/or effects added to the superimposed video generated by the system. The augmented reality objects may be any two-dimensional or three-dimensional object, cartoon, emoji, animated graphics interchange format files (.gif files), digital images, avatars, etc. added into a video call by the system. The augmented reality objects may be pure additions to the video call or they may be substitutions for elements within the video. For example, human elements (e.g., arms, hands, faces, genitals, etc.) may be replaced by augmented reality (e.g., graphically representative) versions of those elements. Augmented reality environments and/or effects may also be incorporated by the system within a given call. For example, if an end user was to place an animated three-dimensional insect augmented reality object into a given video call carried out by the system, additional buzzing sound augmented reality effects might also be added by the system into the final superimposed video generated. Similarly, a human element (e.g., arm) can be substituted with an augmented reality graphic, such as an augmented reality arm or an augmented reality baseball bat. The augmented reality arm may be given visual effects such as being made translucent, turned black and white, or shown as another color.

As used herein, "replaced" or "substituted" refers to the replacement or substitution of the video image of an extracted real life human element with an augmented virtual representation of a human element taken from the real life human element tracking data from the user device's camera, visual sensor, Lidar, etc. This two-dimensional or three-dimensional tracking data can be identified within with video image using various computer vision approaches to identify objects within a video image, including but not limited to the use of tracking data landmarks. The tracking data can also be obtained from depth or proximity measurements of the human element, including but not limited to time of flight and Lidar data.

In embodiments in which an augmented reality element substitutes for a human element, for example, in which a virtual hand is substituted in place of a human hand in the superimposed video, the augmented reality element may be positioned in the superimposed video using tracking data derived from the video feed that includes the human element such that the augmented reality/virtual hand replicates the movements of the real hand on a continuous basis. In other words, the segmentation and extraction of the human element described throughout this disclosure may be performed by tracking the human element and the substitution of the human element with an augmented reality model. The human element tracking may be two-dimensional tracking or three-dimensional tracking.

In the instances in which the human element is a human hand, real-time hand tracking can be implemented using a high-fidelity hand and finger tracking solution such as MediaPipe Hands or MediaPipe Handpose, which was developed as a collaborative effort between the MediaPipe and TensorFlow.js teams within Google Research. The hand tracking data is then used to construct and present a virtual hand, i.e., a graphical representation of a human element, in the superimposed video.

In this example, the virtual hand may be a two-dimensional or three-dimensional model and it may or may not include a render of the user's real hand. The same holds true for any other virtual representation of a human element.

The operations related to the construction and presentation of the virtual hand may be performed by either user's device or a combination of each. For example, a first user's device may track the first user's hand using a rear facing camera and then transmit the tracking data and a locally stored virtual hand model, rather than the video or a segmented portion of the video, to the second user device. Alternatively, the first user's device may capture a video and extract location or tracking data of a first human element within the video and transmit the location or tracking data and a locally stored virtual hand model, rather than the video or a segmented portion of the video, to the second user device. The second user device can then use the tracking and/or location data and the virtual hand model to construct and present the virtual hand in the superimposed video. Such an operation may be less resource intensive than segmenting and combining two videos, which makes the systems and methods provided herein better suited for implementation via web browser extensions or web applications, rather than requiring a dedicated mobile application or remote servers.

Similarly, the first user device may implement the hand tracking (or other human element tracking) and construct the model before sending the model to the second device. In such embodiments, there is no need to exchange the model for the other device to use in construction on the second device.

Each user device may store or otherwise have access to one or more models of one or more human elements. The models may be generic or individualized. The models may be specific to a person or they may be generally related, such as by gender, skin tone, hair color, etc. In some embodiments, the user devices exchange each user's personal models upon initiation of a call. In other embodiments, each user's device, or the application running on each user's device, prompts the user to select a model from a list of available models. In yet other embodiments, models can be saved and stored in association with contact information and automatically selected when initiating a video call. These options may be present regardless of which user device is tasked with constructing the model based on the tracking data.

In other embodiments, the processing of the tracking data and the construction of the augmented reality virtual human element can be done on a third-party computer (e.g., a remote server) and transmitted back for display on one or more of the user devices.

In some embodiments, in which an augmented reality version of a human element (e.g., a virtual hand) is constructed and used in a superimposed video on the other user's device, the augmented reality element may or may not be viewed by the user whose human element is being represented by the augmented reality element. Instead, the user may view the video of their real life extracted human element.

Another example, continuing with the insect object mentioned above could be an end user selecting a jungle themed augmented reality environment in which to carry out a video call. The system may place the human elements from each call participant upon a jungle background, add jungle sound effects, and have augmented reality bug objects all appear within the final super imposed video generated by the system. In this example, each of the users may have their human elements segmented from their backgrounds to be placed onto the virtual reality background. Accordingly, one or both of the user devices may implement face tracking to monitor the position of the user's faces and/or segment the user's face from the background. The face tracking may be carried out on the user devices. Alternatively, the face tracking may be carried out on a remote server.

The augmented reality elements (objects, environments, and/or effects) may be passive or active. If the augmented reality elements are passive, they merely add visual effects to the call. If, however, the augmented elements are active, the human elements may be able to interact with these elements (and environment, effects, etc.). For example, if the bug object mentioned above is active in nature, each of the end users may be able to swat the bug or smash it. Such interactions maybe be carried out via the actual physical movement of the human elements within the frame perimeter of the superimposed video generated by the system. Additional augmented reality effects may also be generated from such interactions. For instance, if water balloon augmented reality elements are added by the system, end users may "toss" these balloons at one another by hand movement. Users may also try to dodge the water balloons via physical movement but if a balloon element runs into another human element once "thrown", it will burst and then leave whatever human element it contacted covered in augmented reality water and/or result in a wet appearance augmented reality effect being applied to the contacted element(s). This same sort of interaction could also occur with a boxing glove augmented reality object used to "punch" the face human element of another user; leaving the face element with a black eye effect. Accordingly, the augmented reality element itself may be the element that simulates contact between the two users.

A given augmented reality element may also be acted upon by two or more human elements at once. For example, if there was a rope augmented reality object, two human hand elements may be able to grasp opposite ends of the rope and have a tug of war. Another example could be that of a ninja enemy augmented reality object that two or more end users could beat up simultaneously. Movement and the relative position of all visual elements within the frame perimeter of a video call carried out by the system may be tracked by a spatial recognition algorithm. This algorithm may track movement speed, acceleration, and momentum of all visual elements (human elements, augmented reality elements, background, etc.) in real time.

Yet another example of the present invention is a computer-implemented method of superimposing video carried out by a processor, the method comprising the steps of: receiving a first video from a first user device; receiving a second video from a second user device; identifying and extracting, on a continuous basis, a first human element from the first video using a detection algorithm; combining the first human element and a portion or all of the second video in real-time to create a superimposed video including a frame perimeter within which the superimposed video includes the first human element and a second human element from the second video, wherein, within the superimposed video, the first human element and the second human element may concurrently occupy any location within the frame perimeter; inserting an augmented reality element within the frame perimeter such that the superimposed video includes the first human element extracted from the first video, the second human element from the second video, and the augmented reality object; and transmitting the superimposed video to at least one of the first user device and the second user device; wherein the first video is captured by a rear facing camera of the first user device and, in response to movement of the first human element relative to the first user device, the first human element obscures at least a portion of the second human element in the transmitted superimposed video. In some examples, in response to real-time movement by the first human element relative to the first user device and the second human element relative to the second user device, the method simulates contact between the first human element and the second human element in the superimposed video.

In another example, the present invention is embodied in a computer-implemented system for superimposing video, including: a central server featuring a processor, memory, and networking interface; a first user device featuring a camera, processor, memory, and networking interface; a second user device featuring a camera, processor, memory, and networking interface; wherein one of the central server, the first user device's processor, and the second user device's processor: receives a first video from a first user device and a second video from a second user device; identifies and extracts, on a continuous basis, a first human element from the first video using a detection algorithm; combines the first human element with a portion or all of the second video in real-time to create a superimposed video including a frame perimeter within which the superimposed video includes the first human element and a second human element from the second video, wherein, within the superimposed video, the first human element and the second human element may concurrently occupy any location within the frame perimeter; inserts an augmented reality element within the frame perimeter such that the superimposed video includes the first human element extracted from the first video, the second human element from the second video, and the augmented reality object; and transmits the superimposed video to at least one of the first user device and the second user device; wherein the first video is captured by a rear facing camera of the first user device and, in response to movement of the first human element relative to the first user device, the first human element obscures at least a portion of the second human element in the transmitted superimposed video.

In embodiments of the examples above, the first user device is a mobile computing device. In other examples, the first user device is a personal computer. The first video may be captured by at least two cameras of the first user device simultaneously. The second video may be captured by a front facing camera of the second user device. The second video may be captured by a rear facing camera of the second user device. The detection algorithm may include any one or more of foreground and background separation, proximity recognition, Chroma keying, hand-arm/body detection, background subtraction, and a Kalman filter.

In some examples, the augmented reality element is passive within the superimposed video. In other examples, the augmented reality element is active and responsive within the superimposed video to movement of the first human element relative to the first user device and to movement of the second human element relative to the second user device.

In some embodiments, any occlusion that results in obscuring one or more of the human elements, such as, for example, any overlapping of the human elements on the display of the user's device activates a haptic vibration on at least one of the user devices. This vibration helps to simulate the sensation of touch between the users. This haptic response may be selectively triggered, or induced, by a user who is viewing the relative position of the human elements on a display. For example, a user may align the position of the first human element of the first user to simulate contact with the second human element of the second user in the superimposed video while viewing the position of the first human element of the first user and the second human element of the second user on the front facing display of the first user device to selectively induce a haptic response in one or both of the first user device and the second user device.

Similarly, in some embodiments, any occlusion that results in obscuring one or more of the human elements, such as, for example, any overlapping of the human elements on the display of the user's device activates a sound on at least one of the user devices. This sound helps to simulate the sensation of touch between the users. This sound may be selectively triggered, or induced, by a user who is viewing the relative position of the human elements on a display. For example, a user may align the position of the first human element of the first user to simulate contact with the second human element of the second user in the superimposed video while viewing the position of the first human element of the first user and the second human element of the second user on the front facing display of the first user device to selectively induce a sound in one or both of the first user device and the second user device.

In these embodiments, in which simulated contact between the two users results in a sound and/or a haptic response, each of the user devices may store a model of each relevant human element to identify when a simulated contact occurs. Such models may be generic or personalized.

As described throughout the disclosure provided herein, a common application of the systems and methods provided herein includes capturing two video streams (i.e., a first from a front facing camera and a second from a rear facing camera) and one audio stream from each of two user devices. The four video streams and two audio streams then combine to form two composite videos. Each composite video includes elements derived from a video stream captured by a front facing camera of one device, elements derived from a video stream captured by a rear facing video steam of a second device, and an audio channel received from the other user's device. Accordingly, each user is presented with an entirely unique video and audio production.

In additional examples, the video feed from one of the devices may be prerecorded with the other video feed being a live feed. The prerecorded video feed may or may not be recorded using a mobile device. For example, the prerecorded video feed may be recorded using professional film making equipment. In primary embodiments, a prerecorded video feed may be taken from the perspective of a front facing camera and a live element of a video call may be taken from a rear facing camera of a user's device. However, in other examples, the prerecorded video may be taken from a rear facing camera of a mobile device or using a camera not associated with a mobile device.

The prerecorded video feed may be provided to a specific one user or may be provided to many users at once. For example, the prerecorded video may be part of a marketing or advertising campaign in which a large number of users are given the opportunity to interact with the prerecorded video.

In some instances, the prerecorded video feed may be adapted such that it is provided in segments, with transitions from one segment to the next being dependent on the system recognizing a specific movement or action made by the user in the video feed. For example, the prerecorded video feed may feature a celebrity, such as an athlete, who presents an introduction and then asks the viewer for a specific interaction (e.g., asks the viewer for a high-five) and only progresses to a second "un-locked" segment of the prerecorded video when the viewer executes the appropriate action in the video feed. The action required to unlock the subsequent segment of the prerecorded video may be a combination of both movement and audio, just movement, or just audio.

Many online platforms allow multiple users, sometimes thousands of users, each to simultaneously watch a live stream video of influencers or performers. In some instances, the stream is captured (i.e., recorded) and available to replay on-demand by any number of users. The subject matter taught herein can be adapted to enable users watching these live streams to feel more connected to the person in the stream they are viewing by being able to create a composite video feed that combines video of the stream performer with video of a human element extracted from a video taken by the viewer of the steamed content. For example, the system and methods may be implemented such that each stream viewer can independently create a personal composite video that includes video of a first human element of the stream viewer, captured using a rear facing camera of the stream viewer's device, superimposed over the streaming content to simulate contact between the viewer and the performer. Accordingly, each viewer can be viewing a different personalized composite version of the stream on their device.

In some embodiments, the streaming user cannot view any of the individual composite videos, each is independently private to the creator. In other embodiments, the streaming user may view any one or more of the composite videos created by the viewers, whether a selected one at each time or many shown simultaneously side-by-side on a display.

In these embodiments, the streaming user is likely to be using a robust video capture system, including a dedicated camera, a lighting system, and a personal computer including one or more monitors. Though it is certainly possible that the streaming user will simply be using a mobile device to capture the streaming content, using either a front facing or rear facing camera.

To have the most interactive experience, the stream viewers are most likely to be using mobile devices (e.g., smartphones, tablets, etc.) or virtual reality headsets equipped with depth sensing cameras. However, it is understood that any video capture device that provides a proximity camera or similar proximity detection, a three-dimensional camera or similar three-dimensional detection, LiDAR (light detection and ranging), laser distance detection, spatially aware ultra-wide-band (UWB) radio waves, or other mechanism that enables the segmentation and extraction of a human element from a video feed to enable its superimposition in a composite video can be used to capture the human element of the stream viewer to be superimposed on the streamed content.

An advantage of the present invention is that the application gives another dimension to traditional video calls and allows friends and families that are apart from each other to not only experience the sensation of being able to touch their loved ones from anywhere with an internet connection, but also become immersed in augmented reality. The present invention could allow someone climbing Mt. Everest to call someone in the depths of the Amazon rainforest and both parties could simulate being beside one another and also virtually place comical stickers upon one another, etc.

Because various embodiments of the systems and methods provided herein utilize both a device's front facing and rear facing cameras simultaneously, it is contemplated that there may be instances in which an icon may be displayed to the user, for example on the front facing display, when the rear facing camera is active.

Another advantage of the present invention is that in some embodiments the application uses four different cameras (or four different sets of cameras) to capture four different video streams, each video stream including a different human element. The four video streams are combined into two different superimposed videos, each including at least one human element from each user. For example, a first user device uses a front facing camera to capture a face of a first user and a rear facing camera to capture a hand of the first user and a second user device uses a front facing camera to capture a face of a second user and a rear facing camera to capture a hand of the second user. A first superimposed video shown on the second user device includes the first user's face and the second user's hand. A second superimposed video shown on the first user device includes the second user's face and the first user's hand.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 3 is a flowchart illustrating a computer-implemented method of superimposing video carried out by a processor.

FIG. 11 is an alternative embodiment of the flowchart of FIG. 3, illustrating a computer-implemented method of superimposing video carried out by a processor.

FIG. 12A illustrates a One Way Touch call using the multi-feed video call system.

FIGS. 12B and 12C are hybrid schematic-flowcharts showing how the components of the multi-feed video call system may cooperate to accomplish a One Way Touch call using the process shown in FIGS. 3 and 11.

FIG. 13A illustrates a Front Touch call using the multi-feed video call system.

FIG. 14A is an overview diagram of a Rear Touch call using the multi-feed video call system.

FIGS. 14B and 14C are hybrid schematic-flowcharts showing how the components of the multi-feed video call system may cooperate to accomplish a Rear Touch call using the process shown in FIGS. 3 and 11.

FIG. 15A is an overview diagram of a Multi-Way Touch call using the multi-feed video call system.

FIGS. 15B and 15C are hybrid schematic-flowcharts showing how the components of the multi-feed video call system may cooperate to accomplish a Multi-Way Touch call using the process shown in FIGS. 3 and 11.

FIG. 18C is a flowchart illustrating a further computer-implemented method of superimposing video on a prerecorded video carried out by a processor.

FIG. 19 is a diagram illustrating another example of a multi-feed video call system.

FIG. 26 is an overview diagram of a Multi-Way Touch call using the multi-feed video call system in which each user device's rear facing camera captures human element tracking data used to constructed and display a virtual human element in a superimposed video.

DETAILED DESCRIPTION OF THE INVENTION

Throughout the descriptions provided herein, the term extraction is used to describe isolating and separating one or more elements in a video from other elements and/or the background of the video. As used herein, the term extraction is used to include identification and processing of elements in a video using: segmentation techniques; tracking data to create an augmented reality virtual element; or similar techniques for isolating and representing one or more ele-ments from a first video feed in another video feed. The primary purpose of such extraction in the present subject matter is to take and combine certain parts of a first video with parts of a second video to create a composite (i.e., superimposed) video. In each instance, the term extraction is meant to broadly describe segmentation (or any similar process) used for isolating elements in a video such that they can be used in creating a composite video, especially in a continuous and ongoing manner. While extraction (i.e., segmentation) is often used to describe the separation of the foreground and background in an image or video, it is understood that in the present disclosure, segmentation may separate human from non-human elements, foreground from background, or any other isolation and separation of ele-ments in the video.

Figure 1:
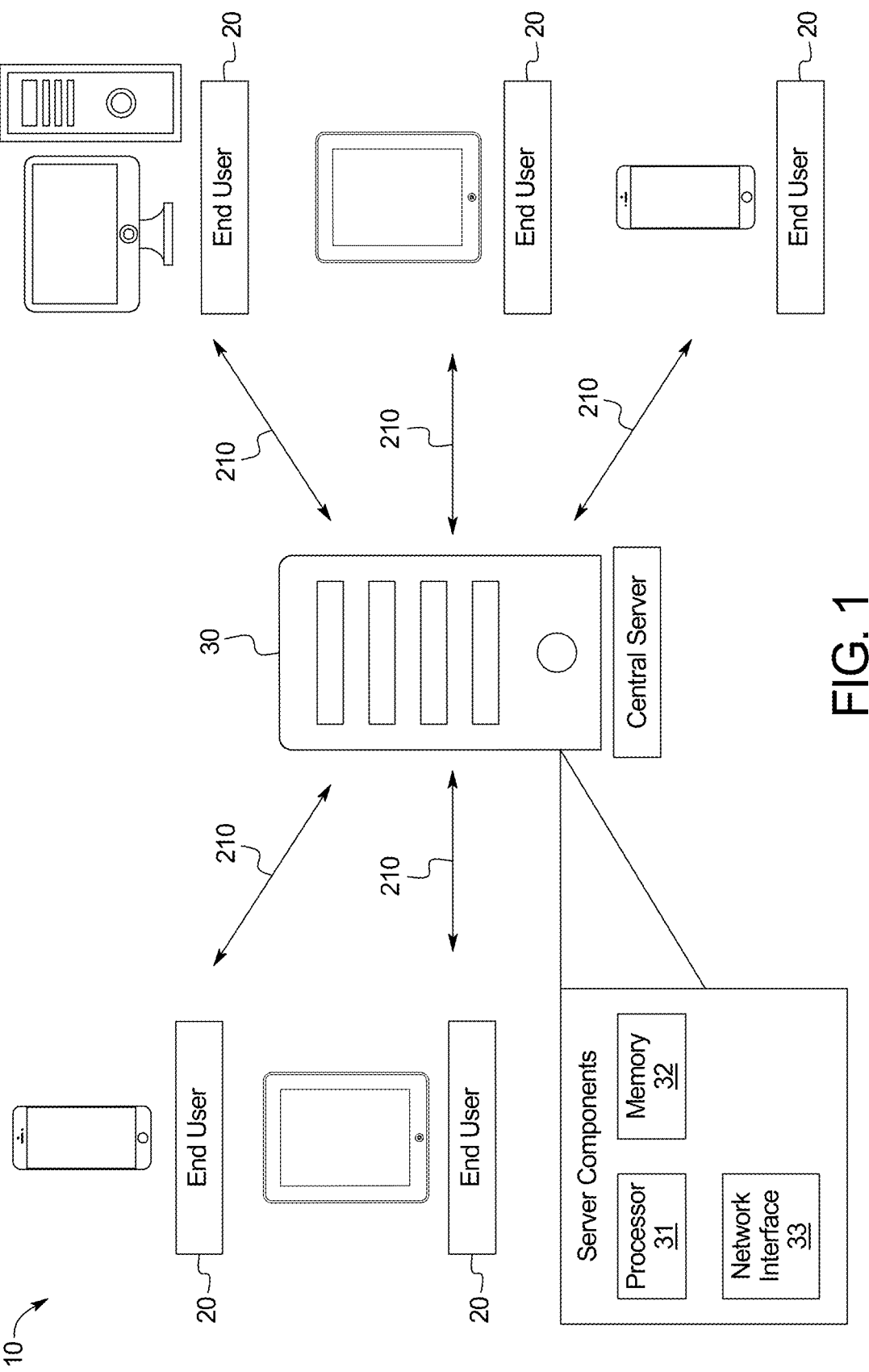
FIG. 1 is a schematic diagram of a multi-feed video call system.
Figure 2:
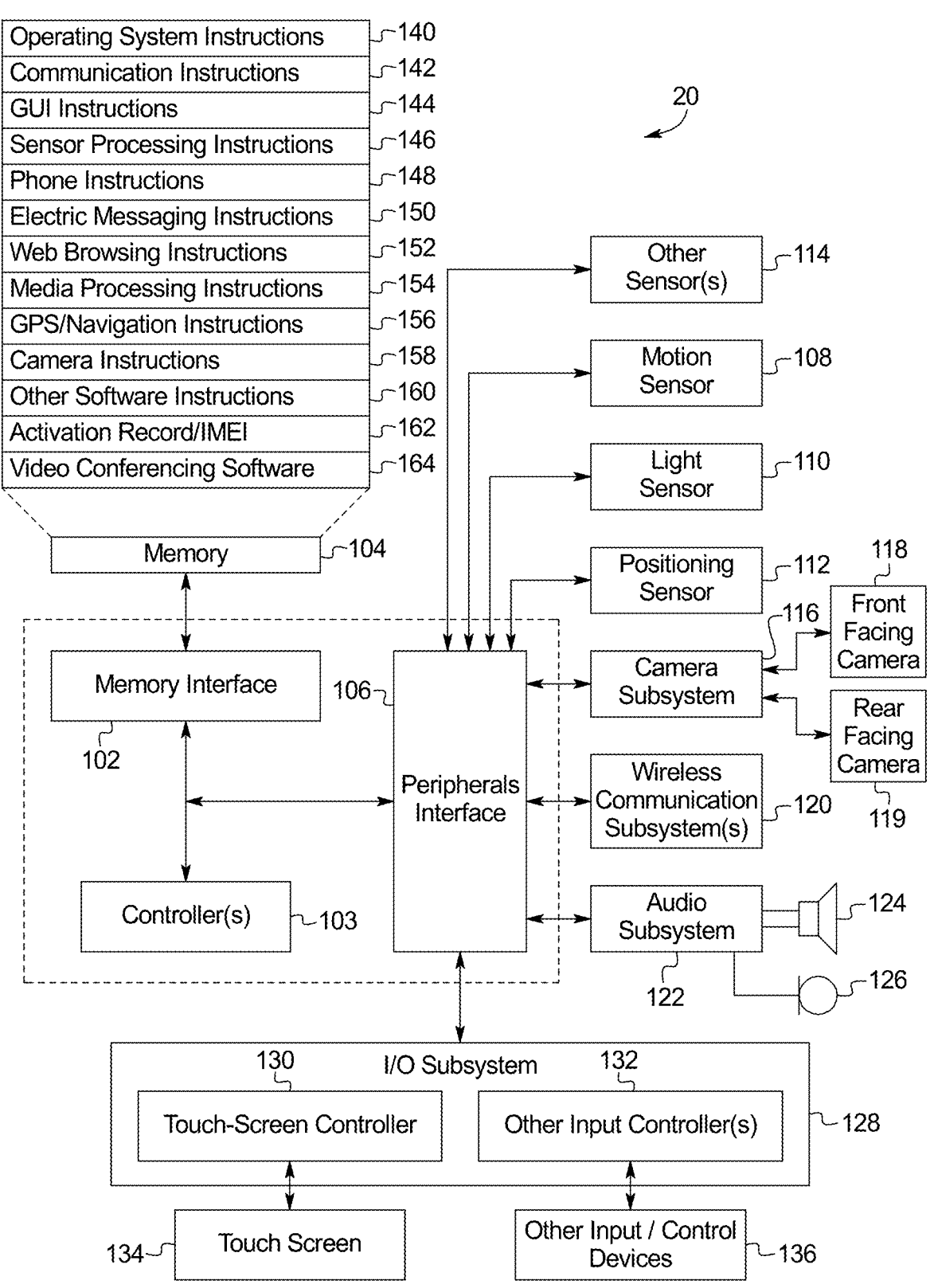
FIG. 2 is a schematic diagram illustrating an example of an end user device that may be used in the system shown in FIG. 1.

FIG. 1 is a schematic diagram of a multi-feed video call system 10. As shown in FIG. 1, the system 10 features multiple end users' devices 20. Each end user device 20 (e.g., a laptop computer, smartphone, tablet, etc.) sends video 210 to a central server 30 from an end user device camera subsystem 116 through its wireless communication subsystem(s) 120 and receives video 210 from the central server 30 to be displayed and output through the end user device I/O subsystem 128 and the end user device audio subsystem 124. As shown in FIG. 2, a camera subsystem 116 may, for example, include front 118 and back 119 cameras of a smartphone.

Figure 4:
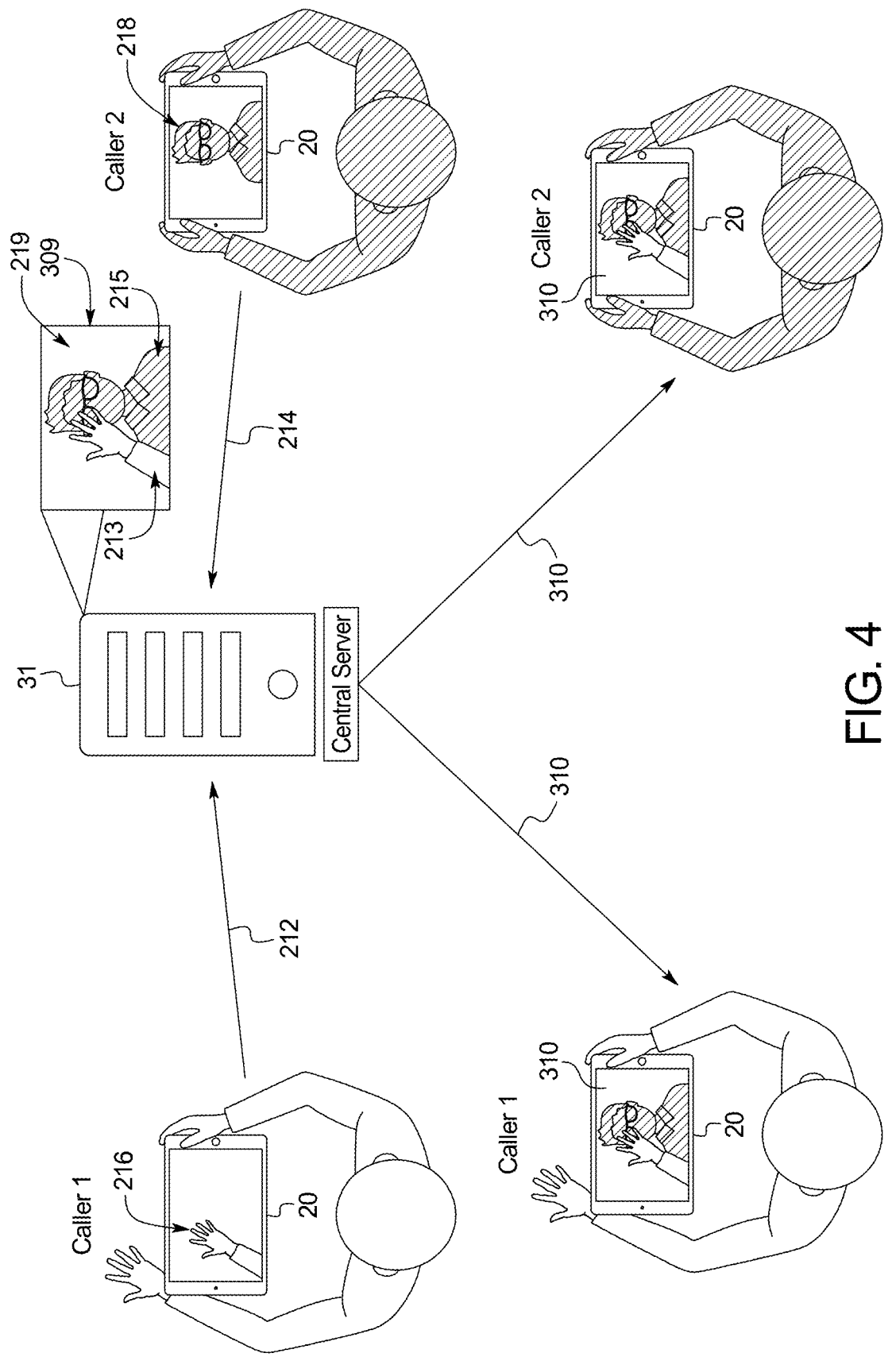
FIG. 4 illustrates the multi-feed video call system superimposing videos.

As described further herein, a primary object of the system 10 is to enable a portion of a first live video 212 to be superimposed upon a second live video 214 (illustrated in FIG. 4) to produce a superimposed video 310 (illustrated in FIG. 4) in which human elements (e.g., a first human element 216 and second human element 218—also seen in FIG. 4) from each of the first live video 212 and the second live video 214 may interact and be displayed in any position relative to each other to simulate the appearance of the human elements from each of the first live video 212 and the second live video 214 to be present in the same physical space.

As shown in FIG. 1, the central server 30 includes a processor 31 and memory 32 for carrying out the superim-position of video 210 (e.g., combining portions of a first live video 212 and a second live video 214 into the superimposed video 310), as well as a networking interface 33 for com-munication with user devices 20, as described further herein. The superimposed video 310 (shown in FIG. 4) created by the server 30 is then transmitted back to the user devices 20. The superimposed video 310 simulates users being physi-cally in each other's presence.

It should be noted that in the example described above, the analysis, processing, and transformation of video 210 is carried out on the central server 30. In alternative embodi-ments, some, or all, of such actions may be carried out on one or more of the end user devices 20.

FIG. 2 is a schematic diagram illustrating an example of an end user device 20 that may be used in the system shown in FIG. 1. In the example shown in FIG. 2, the multi-feed video call system 10 runs as a video conferencing applica-tion embodied in video conferencing software 164 on the end user device 20. As shown in FIG. 2, the end user device 20 maybe a mobile device, such as a smartphone, running video conferencing software 164 to provide the functionality described herein. A user may install the video conferencing software 164 on his or her end user device 20 via Apple's App Store, the Android Market, etc. The end user device 20 may include a wireless communication subsystem 120 to communicate with the central server 30 running the video conferencing software 164.

The user device 20 may include a memory interface 102, controllers 103, such as one or more data processors, image processors and/or central processors, and a peripherals interface 106. The memory interface 102, the one or more controllers 103 and/or the peripherals interface 106 can be separate components or can be integrated in one or more integrated circuits. The various components in the user device 20 can be coupled by one or more communication buses or signal lines, as will be recognized by those skilled in the art.

Sensors, devices, and additional subsystems can be coupled to the peripherals interface 106 to facilitate various functionalities. For example, a motion sensor 108 (e.g., a gyroscope), a light sensor 163, and positioning sensors 112 (e.g., GPS receiver, accelerometer) can be coupled to the peripherals interface 106 to facilitate the orientation, lighting, and positioning functions described further herein. Other sensors 114 can also be connected to the peripherals interface 106, such as a proximity sensor, a temperature sensor, a biometric sensor, or other sensing device, to facilitate related functionalities.

A camera subsystem 116 includes a physical camera (e.g., a charged coupled device (CCD) or a complementary metal-oxide semiconductor (CMOS) optical sensor) which can be utilized to facilitate camera functions, such as recording photographs and video clips. Modern smartphones and other devices typically feature more than one physical camera operated by the camera subsystem 116. Such cameras may be located on the front of the device 20—the side of the device with a screen (e.g., front cameras 118) or rear of the device 20—the side opposite the screen (e.g., rear facing cameras 119).

Communication functions can be facilitated through a network interface, such as one or more wireless communication subsystems 120, which can include radio frequency receivers and transmitters and/or optical (e.g., infrared) receivers and transmitters. The specific design and implementation of the communication subsystem 120 can depend on the communication network(s) over which the user device 20 is intended to operate. For example, the user device 20 can include communication subsystems 120 designed to operate over a GSM network, a GPRS network, an EDGE network, a Wi-Fi or Imax network, and a Bluetooth network. In particular, the wireless communication subsystems 120 may include hosting protocols such that the user device 20 may be configured as a base station for other wireless devices.

An audio subsystem 122 can be coupled to a speaker 124 and a microphone 126 to facilitate voice-enabled functions, such as voice recognition, voice replication, digital recording, and telephony functions.

The I/O subsystem 128 may include a touch screen controller 130 and/or other input controller(s) 132. The touch-screen controller 130 can be coupled to a touch screen 134, such as a touch screen. The touch screen 134 and touch screen controller 130 can, for example, detect contact and movement, or break thereof, using any of a plurality of touch sensitivity technologies, including but not limited to capacitive, resistive, infrared, and surface acoustic wave technologies, as well as other proximity sensor arrays or other elements for determining one or more points of contact with the touch screen 134. The other input controller(s) 132 can be coupled to other input/control devices 136, such as one or more buttons, rocker switches, thumb-wheel, infrared port, USB port, and/or a pointer device such as a stylus. The one or more buttons (not shown) can include an up/down button for volume control of the speaker 124 and/or the microphone 126.

The memory interface 102 may be coupled to memory 104. The memory 104 can include high-speed random access memory and/or non-volatile memory, such as one or more magnetic disk storage devices, one or more optical storage devices, and/or flash memory (e.g., NAND, NOR). The memory 104 may store operating system instructions 140, such as Darwin, RTXC, LINUX, UNIX, OS X, iOS, ANDROID, BLACKBERRY OS, BLACKBERRY 10, WINDOWS, or an embedded operating system such as VxWorks. The operating system instructions 140 may include instructions for handling basic system services and for performing hardware dependent tasks. In some implementations, the operating system instructions 140 can be a kernel (e.g., UNIX kernel).

The memory 104 may also store communication instructions 142 to facilitate communicating with one or more additional devices, one or more computers and/or one or more servers. The memory 104 may include graphical user interface instructions 144 to facilitate graphic user interface processing; sensor processing instructions 146 to facilitate sensor-related processing and functions; phone instructions 148 to facilitate phone-related processes and functions; electronic messaging instructions 150 to facilitate electronic-messaging related processes and functions; web browsing instructions 152 to facilitate web browsing-related processes and functions; media processing instructions 154 to facilitate media processing-related processes and functions; GPS/Navigation instructions 156 to facilitate GPS and navigation-related processes and instructions; camera instructions 158 to facilitate camera-related processes and functions; and/or other software instructions 160 to facilitate other processes and functions (e.g., access control management functions, etc.). The memory 104 may also store other software instructions controlling other processes and functions of the user device 20 as will be recognized by those skilled in the art. In some implementations, the media processing instructions 154 are divided into audio processing instructions and video processing instructions to facilitate audio processing-related processes and functions and video processing-related processes and functions, respectively. An activation record and International Mobile Equipment Identity (IMEI) 162 or similar hardware identifier can also be stored in memory 104. As described above, the video conferencing software 164 is also stored in the memory 104 and run by the controllers 103.

Each of the above identified instructions and applications can correspond to a set of instructions for performing one or more functions described herein. These instructions need not be implemented as separate software programs, procedures, or modules. The memory 104 can include additional instructions or fewer instructions. Furthermore, various functions of the user device 20 may be implemented in hardware and/or in software, including in one or more signal processing and/or application specific integrated circuits. Accordingly, the user device 20, as shown in FIG. 2, may be adapted to perform any combination of the functionality described herein.

Aspects of the systems and methods described herein are controlled by one or more controllers 103. The one or more controllers 103 may be adapted run a variety of application programs, access and store data, including accessing and storing data in associated databases, and enable one or more interactions via the user device 20. Typically, the one or more controllers 103 are implemented by one or more programmable data processing devices. The hardware elements, operating systems, and programming languages of such devices are conventional in nature, and it is presumed that those skilled in the art are adequately familiar therewith.

For example, the one or more controllers 103 may be a PC based implementation of a central control processing system utilizing a central processing unit (CPU), memories and an interconnect bus. The CPU may contain a single microprocessor, or it may contain a plurality of microcontrollers 103 for configuring the CPU as a multi-processor system. The memories include a main memory, such as a dynamic random access memory (DRAM) and cache, as well as a read only memory, such as a PROM, EPROM, FLASH-EPROM, or the like. The system may also include any form of volatile or non-volatile memory. In operation, the main memory is non-transitory and stores at least portions of instructions for execution by the CPU and data for processing in accord with the executed instructions.

The one or more controllers 103 may further include appropriate input/output ports for interconnection with one or more output displays (e.g., monitors, printers, touchscreen 134, motion-sensing input device 108, etc.) and one or more input mechanisms (e.g., keyboard, mouse, voice, touch, bioelectric devices, magnetic reader, RFID reader, barcode reader, touchscreen 134, motion-sensing input device 108, etc.) serving as one or more user interfaces for the processor. For example, the one or more controllers 103 may include a graphics subsystem to drive the output display. The links of the peripherals to the system may be wired connections or use wireless communications.

Although summarized above as a smartphone-type implementation, those skilled in the art will recognize that the one or more controllers 103 also encompasses systems such as host computers, servers, workstations, network terminals, PCs, and the like. Further one or more controllers 103 may be embodied in a user device 20, such as a mobile electronic device, like a smartphone or tablet computer. In fact, the use of the term controller is intended to represent a broad category of components that are well known in the art.

FIG. 3 is a flowchart illustrating a computer-implemented method of superimposing video 210 carried out by a processor 31. As shown in FIG. 3, the method of superimposing video 210 carried out by a processor 31 begins with the processor 31, at a first step 240 receiving a first video 212 from a first user's device 20. Reception 240 by a processor 31 is illustrated in FIG. 4, wherein the user device 20 of a first user transmits a first video 212 (in this case a video 210 captured by the user's rear camera 119) to a central server 30 including a processor 31 (though the processor 31 may be in a central server 30, the first user device 20, or the second user device 20). The second step 242 of superimposing video 210 carried out by a processor 31 is receiving a second video 214 from a second user's device 20. Again referring to FIG. 4, reception of the second video 214 from a second user's device 20 by a processor 31 is illustrated (with the second video 214 being captured by the second user's front camera 118). The third step 244 of this method calls for the processor 31 to identify a first human element 216 in the first video 212 and/or a second human element 218 in a second video 214 by use of a detection/recognition algorithm. Such human elements 216, 218 are illustrated in FIG. 4 with the first human element 216 being a hand (captured by the first user's rear camera 119) and the second human element 218 being a face (captured by the second user's front camera 118).

The fourth step 246 calls for the system 10 to continuously identify and extract a first human element 216 (identified in the first video 212) and/or second human element 218 (identified in the second video 214) from their respective videos via use of the detection/recognition algorithm. Extraction may be carried out by the detection/recognition algorithm or a separate piece of programing and the methodologies used to extract a given human element may vary depending on technological resources available to a given set of end users. For example, if the system 10 was utilized by users with slower computing components, the extraction methodology used (e.g., foreground and background separation, proximity recognition, Chroma keying, hand-arm/body detection, background subtraction, and/or a Kalman filter) may be automatically selected by the system to utilize as little processor 31 power as possible.

The fifth step 248 of the computer-implemented method of superimposing video 210 carried out by a processor 31 is combing a portion of the first video 213 and a portion of the second video 215 in real-time to create a superimposed video 310 including a frame perimeter 309 within which a combined portion of the first video 212 and second video 214 is contained, wherein the superimposed video 310 includes the extracted first human element 216 and the second human element 218, wherein, within the superimposed video 310, the first human element 216 and the second human element 218 may concurrently occupy any location within the frame perimeter 309 and the positions of the human elements 216 and/or 218 within the frame perimeter 309 are responsive to movement of these human elements 216 and/or 218 relative to their corresponding end user devices 20. It should be noted that the system may unilaterally extract a human element from one video (e.g., the first human element 216 or second human element 218, in this example) without a human element being present in both videos 212 and 214. Further, the extracted first human element 216 and/or the extracted second human element 218 may be an augmented reality virtual human element presented within the superimposed video 310 according to the human element location data identified in the fourth step 246, as discussed in greater detail below.

A key feature of the multi-feed video call system 10 is that, within the superimposed video 310, the first human element 216 and the second human element 218, are each able to occupy any portion of the superimposed video 310. In the example shown in FIG. 4, this feature is represented by the ability of either the first human element 216 or the second human element 218 to occupy any space within the frame perimeter 309 and the frame perimeter 309 is shown to occupy the entirety of the display on the device 20. While this is one contemplated example, it is understood that the frame perimeter 309 for the superimposed video 310 may otherwise occupy a smaller portion of the display on the device 20. The critical concept relating to the ability of either the first human element 216 or the second human element 218 to occupy any space within the frame perimeter 309 is that the first human element 216 and the second human element 218 may occupy adjacent positions on the screen, may separate from each other, and may pass in front of or behind each other, or any be represented by any combination of these relative positions. For example, some portion of the first human element 216 may be shown to be touching the second human element 218 while other portions of the first human element 216 may be shown to be separated from the second human element 218.

The portion of the first video 213 and a portion of the second video 215 combined in real-time may be only the extracted first human element 216 and second human element 218, or can include more video 210 from the videos 212, 213. This additional video 210, beyond the human elements 216, 218 may include a background 219. Such a background 219 is illustrated in FIG. 4 (in this case a plain solid color), with the human elements 216, 218 able to occupy any space within the frame perimeter 309 and move independently of each other and the background 219. The background 219 can be generated by the system 10 of captured by a device 20 camera 118, 119 and extracted from either of the videos 212,213. In the example shown in FIG. 4, the first human element 216 (a hand) is superimposed on top of the second human element 218 (a face) with both elements 216, 218 being able to occupy the same location at the same time. In this example, since the first human element 216 is superimposed by the processor 31 over the second human element 218, the hand is able to obscure the face in the superimposed video 310. The frame perimeter 309, also illustrated in FIG. 4, is the defined size of the superimposed video 310 (e.g., the aspect ratio, etc.) which may be automatically determined by the processor 31 based off the videos 210 provided to it.

The final step 250 of the computer-implemented method of superimposing video 210 carried out by a processor 31 is transmitting the superimposed video 310 to a user device 20. Such transmission is shown in FIG. 4, in which the superimposed video 310 is displayed on the first user and second user's devices 20. Worth noting here is that the example shown in FIG. 4 utilizes one user device's 20 front camera 118 and one user device's 20 back camera 119, but the present invention may also utilize multiple cameras of a device 20 facing the same direction to capture video 210 concurrently. One such device 20 with multiple cameras facing the same direction is the iPhone 7, which is capable of blending or stitching images captured by is multiple cameras together to provide wide angle images, greater image quality, etc. Such functionality may be utilized by the current invention to improve the quality of video calls carried out upon it.

Additionally, FIG. 4 demonstrates two human elements 216, 218 which may occupy the same location within a frame perimeter 309 at the same time. This results in one of the human elements 216 being able to obscure the other 218. The present system 10 may also be configured in a manner which prevents the identified and extracted human elements 216, 218 from obscuring one another. In practical terms, the human elements 216, 218 would be treated as "solid" instead of one element 216 being able to pass over and obscure another 218, with the background 219, frame perimeter 309, etc. being automatically adjusted by the system 10 to prevent such overlap.

Figure 6:
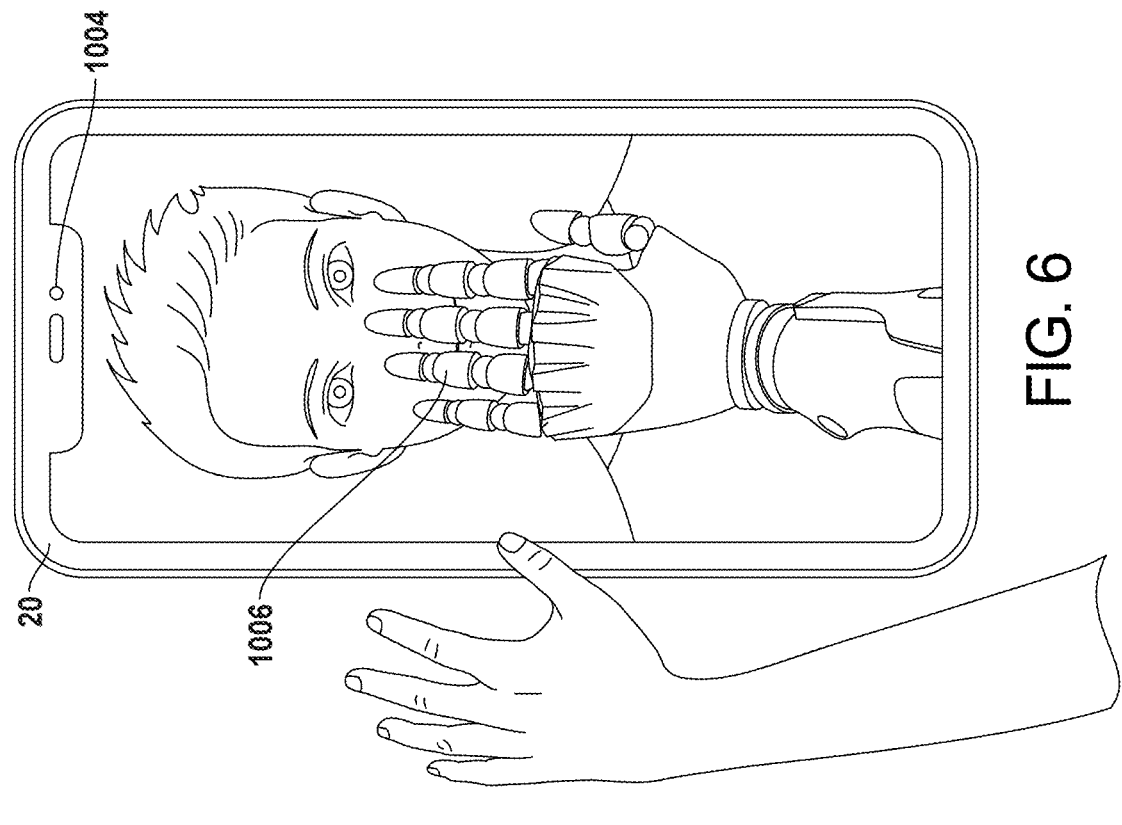
FIG. 6 illustrates an example of an augmented reality/virtual element generated from the tracking data landmarks of FIG. 5.
Figure 5:
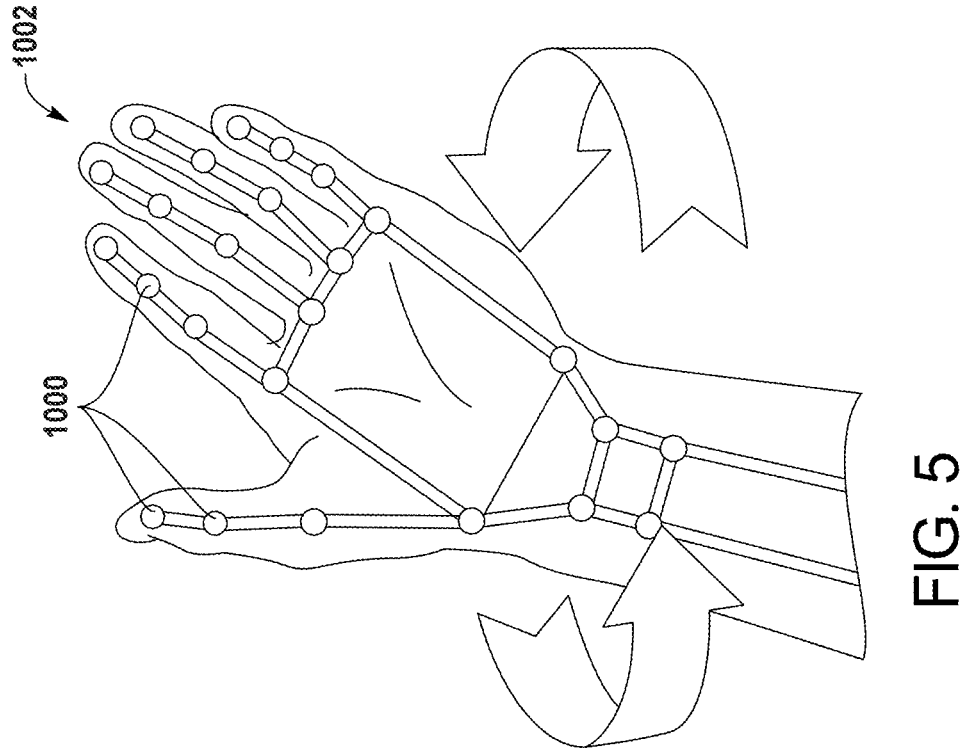
FIG. 5 is a diagram illustrating an example tracking data landmarks of a human element.

In some embodiments, the system 10 may collect tracking data of the first or second human element, such as a hand, using a single or multiple RGB camera array or depth sensing camera in the user device as shown in FIGS. 5 and 6, and replace the human element with a virtual human element in the superimposed video.

In one embodiment, human element tracking data landmarks 1000 of a human element 1002 illustrated in FIG. 5 are detected by the camera array or depth sensing camera 1004 of the camera subsystem 116 of the user device 20 shown in FIG. 6. The human element tracking data landmarks 1000 illustrated in FIG. 5 primarily are joints of a human hand 1002, although other landmarks, markers, indicators, or other recognizable bodily features may be used or detected by the camera 1004.

The system 10 then uses the tracking data collected from one or more surfaces of the human element 1002 to construct a two-dimensional or three-dimensional virtual element 1006. The tracking data may be taken from a front or rear facing camera/sensor 1004 of the user device 20 and can be used to generate and display surfaces or sides of the virtual element 1006 that were not included in the collected tracking data of the human element 1002. For example, the hand data taken of tracking data landmarks 1000 of the palm of the hand 1002 by a front facing camera 1004 is reconstructed as a virtual hand 1006 and rotated to display a view of the back of the virtual hand 1006.

This embodiment enables a front facing camera to capture tracking data for a hand in which the palm of the hand is facing the camera, but the user wishes to construct an augmented reality virtual hand that appears on the display as showing the back of the hand. Having the tracking data of the position of the hand (or any other human element) allows either side of the virtual hand to be shown on the display, as the virtual hand is a constructed representation of the human element based on the tracking data representing the position of the hand relative to the camera. The virtual hand will be displayed within the same frame perimeter as the video image taken from the second user. It is understood that either a front facing or rear facing camera may be used to capture the tracking data and the virtual hand may be constructed and displayed either in a rotated or non-rotated perspective. The virtual hand 1006 of FIG. 6 can be rotated and displayed from the point of view of the user of the user device or a third person point of view.

In other embodiments, the system 10 may receive the first and second videos from the respective first and second user devices as noted in steps 240 and 242 of the method of FIG. 3 and subsequently detect the tracking data of the human elements. In some embodiments, step 246 of continuously identifying and extracting a human element also includes identifying human element tracking data in order to create an augmented reality virtual human element and present the virtual human element in place of the human element in the superimposed video. For example, a virtual element may be positioned within the combined video 310 according to the human element tracking data of the respective video feed 210 identified in step 246. This embodiment also enables a camera to capture tracking data of a human element from a first angle and present an augmented reality virtual human element of the tracked human element from a second angle, different from the first angle, in the superimposed video, as described above.

Both embodiments described above with reference to FIGS. 5 and 6 may be implemented together or separately with respect to the presently claimed system 10. Further, the use of tracking data of a human element may be implemented in each embodiment described herein.

Figure 7:
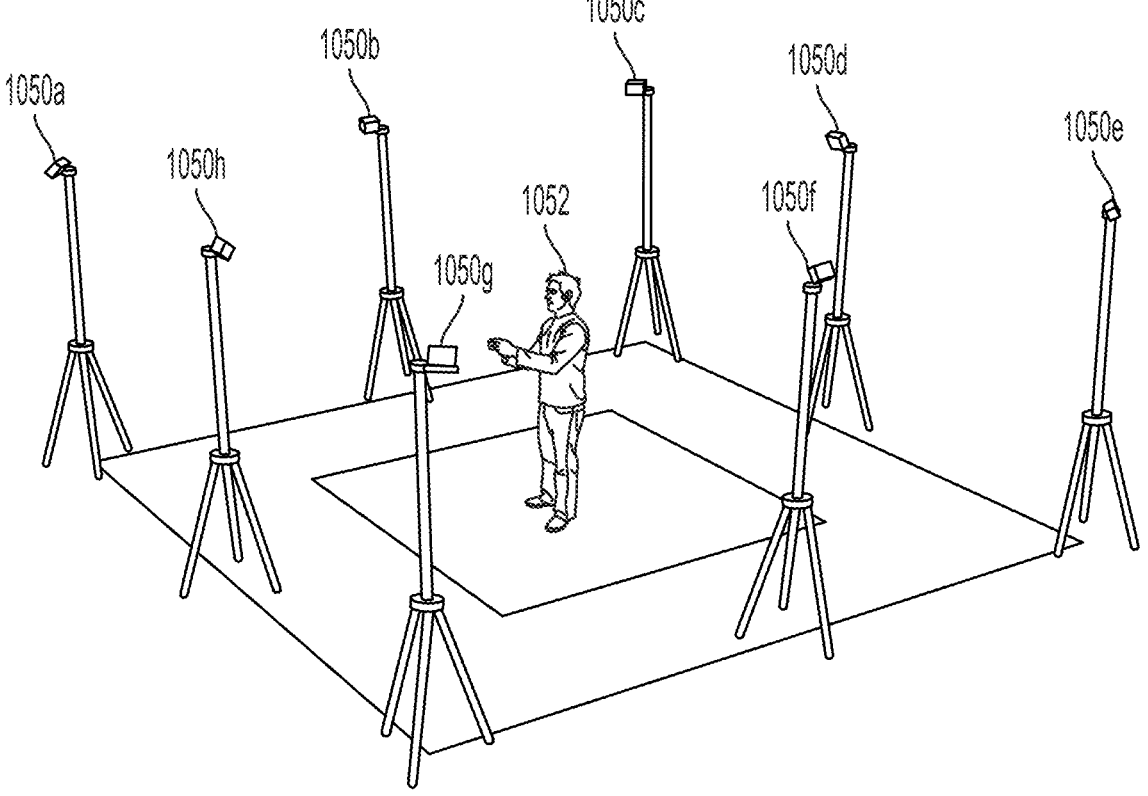
FIG. 7 illustrates a camera configuration used to generate volumetric imaging or holograms.
Figure 8A:
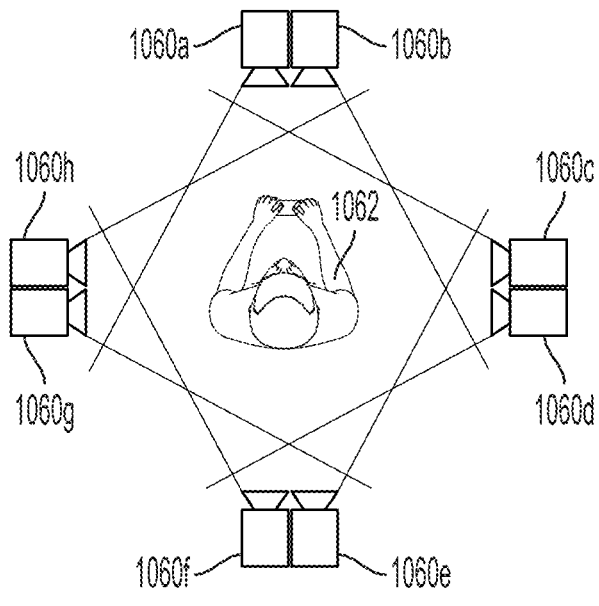
FIGS. 8A and 8B illustrate an alternative embodiment to the camera configuration of FIG. 7 for generating volumetric imaging or holograms.
Figure 8B:
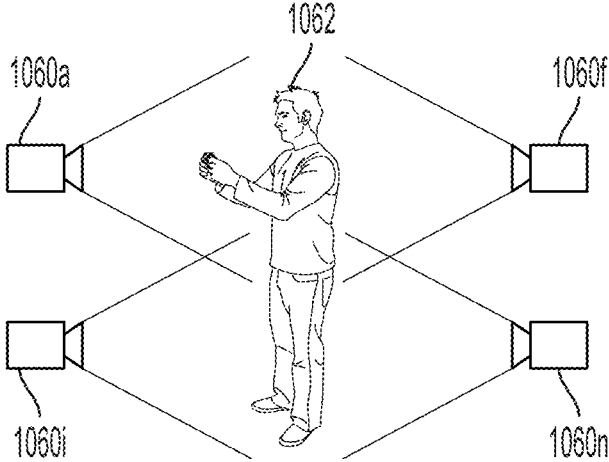
Figure 9:
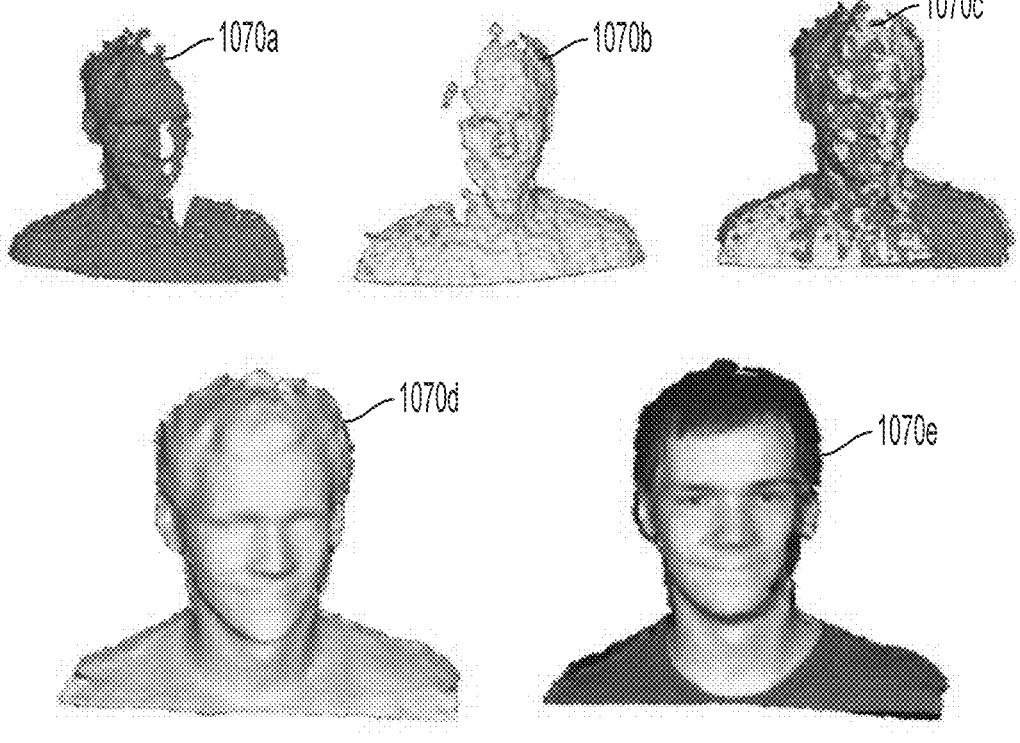
FIG. 9 illustrates volumetric images generated for use in multi-feed video call system of the present application.

In other embodiments, the system 10 may include a camera configuration as shown in FIGS. 7 and 8 to capture images such as those shown in FIG. 9 in order to generate volumetric images, videos, or holograms that can be viewed from any angle in augmented reality or virtual reality, generating very realistic, immersive and interactive 3D content. Volumetric video holograms combine the visual quality of video with the immersion that can only be achieved through spatialized content.

The camera devices 1060, 1070 may include an RGB camera of a mobile device, depth sensing camera technology such as a time-of-flight (ToF) camera or lidar, laser sensors, photogrammetry, stereoscopic/multiview camera arrays, any other suitable technology, and combinations thereof to create the volumetric video or hologram. In FIG. 7, a plurality of camera devices 1060 is arranged around a focal point 1062 to capture imaging of the user or object from various angles. In the example of FIG. 8, eight camera devices 1060*a*-1060*h* are positioned approximately equidistantly along the 360 degree circumference and directed at the focal point 1060. In the example of FIGS. 8A and 8B, four groups of cameras 1070 are positioned at 90 degree angles from one another around the focal point 1072, with each group of cameras including two sets of two cameras vertically aligned. Each camera captures about a 70 to 80 degree span in all directions. The horizontal span in shown in the plan view image of FIG. 8A, while the vertical span is shown in the elevational view of FIG. 8B. The cameras are positioned such that the viewpoints overlap, ensuring that all sides of the focal point are captured. In other embodiments, greater or fewer camera devices may be used. While FIGS. 7 and 8 illustrate professional multi-camera capture systems, it is understood that the volumetric images, videos, or holograms may be derived from the use of a single smartphone or a smaller number of mobile devices, cameras, or other image capture devices.

In one example embodiment, the plurality of camera devices are part of a neural radiance field (NeRF), a neural network that generates views of complex three-dimensional scenes based on a partial set of two-dimensional images. The NeRF may be trained to utilize a rendering loss to generate input views of a scene by interpolating between images captured by the devices. NeRF is effective at generating images for synthetic data. Referring to FIG. 9, input images 1070*a*, 1070*b* captured by the devices 1050, 1060 may be used to generate image 1070*c*. A NeRF network is trained to map directly from viewing direction and spatial location (five-dimensional input) as shown in image 1070*d* to opacity and color (four-dimensional output) as shown in image 1070*e* using volumetric renderings to render new views. The images 1070*a*-1070*e* are examples of volumetric video images of a human element that may be combined and displayed with another human element in a superimposed video feed as described herein. Although shown in these figures as being generated from a more complex system of image capture devices, the human element of the volumetric video feed may be captured and/or created based on a more limited set of data points, such as from a device such as a conventional smartphone camera using NeRF.

It is contemplated that the volumetric camera may be any format that enables volumetric imaging. In some embodiments, volumetric videos may be created using neural radiance field techniques from two-dimensional video/image data sets.

Figure 10:
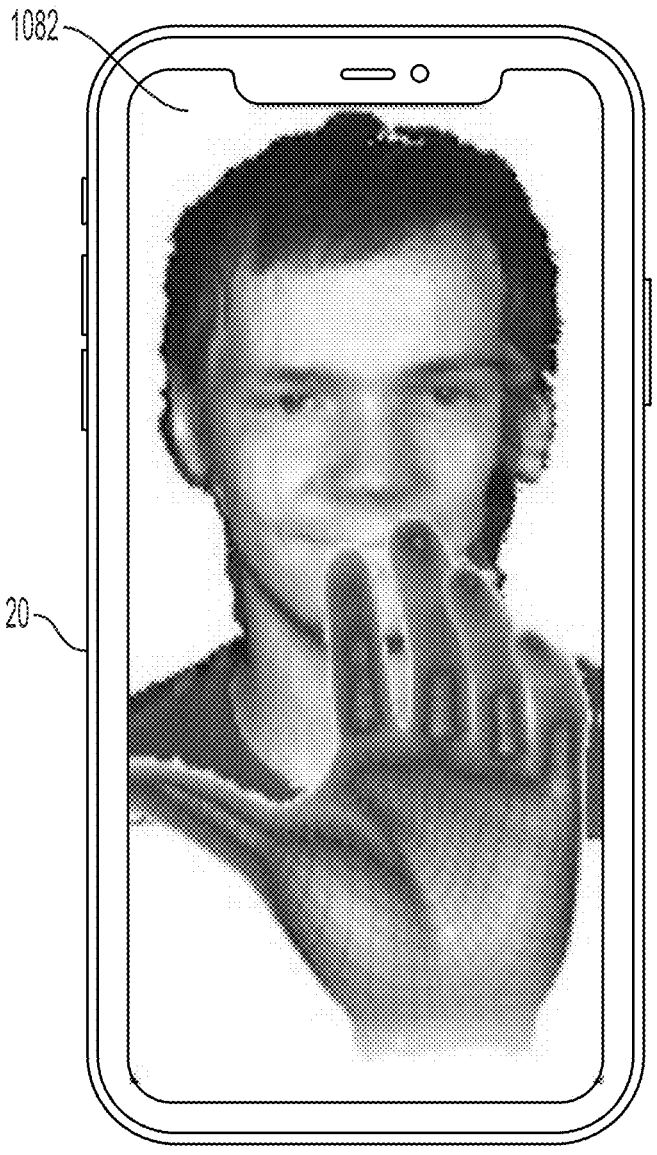
FIG. 10 is a diagram demonstrating volumetric images used during a multi-feed video call.

FIG. 10 illustrates a superimposed real-time video 1082 of video feed from a first user's camera (Caller 1) and a video feed from a second user's camera (Caller 2) displayed on a caller's end user device 20. In the illustrated embodiment, the superimposed video is displayed to both users.

In any of the embodiments of the videos described herein, the individual videos or the combined, composite video may be provided in any format, including two-dimensional, volumetric, holographic, higher dimensional (e.g., four-dimensional, five-dimensional, etc.), or any combination thereof. For example, one the human elements described herein may be displayed as three-dimensional video captured and created using volumetric video techniques while the other video with which it is combined is displayed as two-dimensional video captured and created using traditional two-dimensional video techniques. Regardless of the format (i.e., two-dimensional, volumetric, holographic, etc.), the imaging may be live or pre-recorded video using any suitable method.

FIG. 11 illustrates an alternative a computer-implemented method of superimposing video 210' carried out by the central processor 31'. In this method, tracking data of human elements may be undertaken by the processor of each user device prior to being received by the central processor 31 as described in Steps 240' and 242'. Additionally, the central processor 30 may identify tracking data of the first and/or second human elements of the videos 210 using the detection/recognition algorithm in Step 246'. The central processor 30 then combines a portion of the first video and a portion of the second video to create a superimposed video in Step 248', wherein the superimposed video includes a first human element or virtual element and a second human or virtual human element, the first or second virtual human elements being presented in the superimposed video according to the track data provided by either user devices and/or the central server 30.

FIG. 12A is an overview diagram of a One Way Touch call using the multi-feed video call system 10. As shown in FIG. 12A, a superimposed real-time video 310 of one user's front camera 118 (Caller 2) and another user's rear camera 119 (Caller 1) is displayed to both users. In this example, the video 210 from Caller 2's device's front camera 118 is shown on both Caller 1 and Caller 2's device 20 screens, with the video 210 from Caller 1's device's back camera 119 superimposed over Caller 2's front camera 118 video 210 allowing Caller 1 to "touch" (i.e., see their hand or other human element(s) superimposed upon the face and/or body of another user) Caller 2 via an illusion created by the superimposition of the video 210. In this example, the first human element 216 is associated with Caller 1's hand and the second human element 218 is associated with Caller 2's face, neck, and upper torso. It should be noted however the labels regarding the first human element 216 and second human element 218 could be reversed in this example (and the examples seen in FIGS. 13A, 14A, and 15A) as which human element is labeled first and second does not automatically dictate which element will be superimposed over the other.

FIG. 12B is a flowchart of a One Way Touch call using the multi-feed video call system 10. As shown in FIG. 12B, the videos 210 which will be superimposed by the system originate on respective caller's end user devices 20. One user's (Caller 1's) rear camera 119 and another's (Caller 2's) front camera 118 send videos 210 or tracking data of human element(s) within the videos 210 to a centralized sever 30. In this embodiment, as well as other embodiments, the system 10 may automatically determine which user's video 210 is superimposed over the other (e.g., which human element (hand, face, torso, etc.) or virtual human element is superimposed over the other human element(s) or virtual human element(s) displayed in the superimposed video 310). In other embodiments, the determination of which human element(s) or virtual human element(s) of video 210 are superimposed upon one another may also be manually set by the participants of a given video call or the system 10 may be set to not superimpose human elements. The video 210 may be sent via the internet or any other functionally useful means, with the central server receiving the separate video 210 and/or tracking data, analyzing them, optionally identifying tracking data of the first and/or second human elements 216, 218, removing extraneous information from the video 210 (e.g., solid colored backgrounds, etc.), and combining the two respective video 210 into one superimposed video 310. In some embodiments, an augmented reality element, such as a virtual human element, is presented in the superimposed video 310 according to the tracking data. The superimposed video 310 is then sent back to the user device's 20 involved in the video chat via the internet or any other functionally useful means.

Figure 12C:
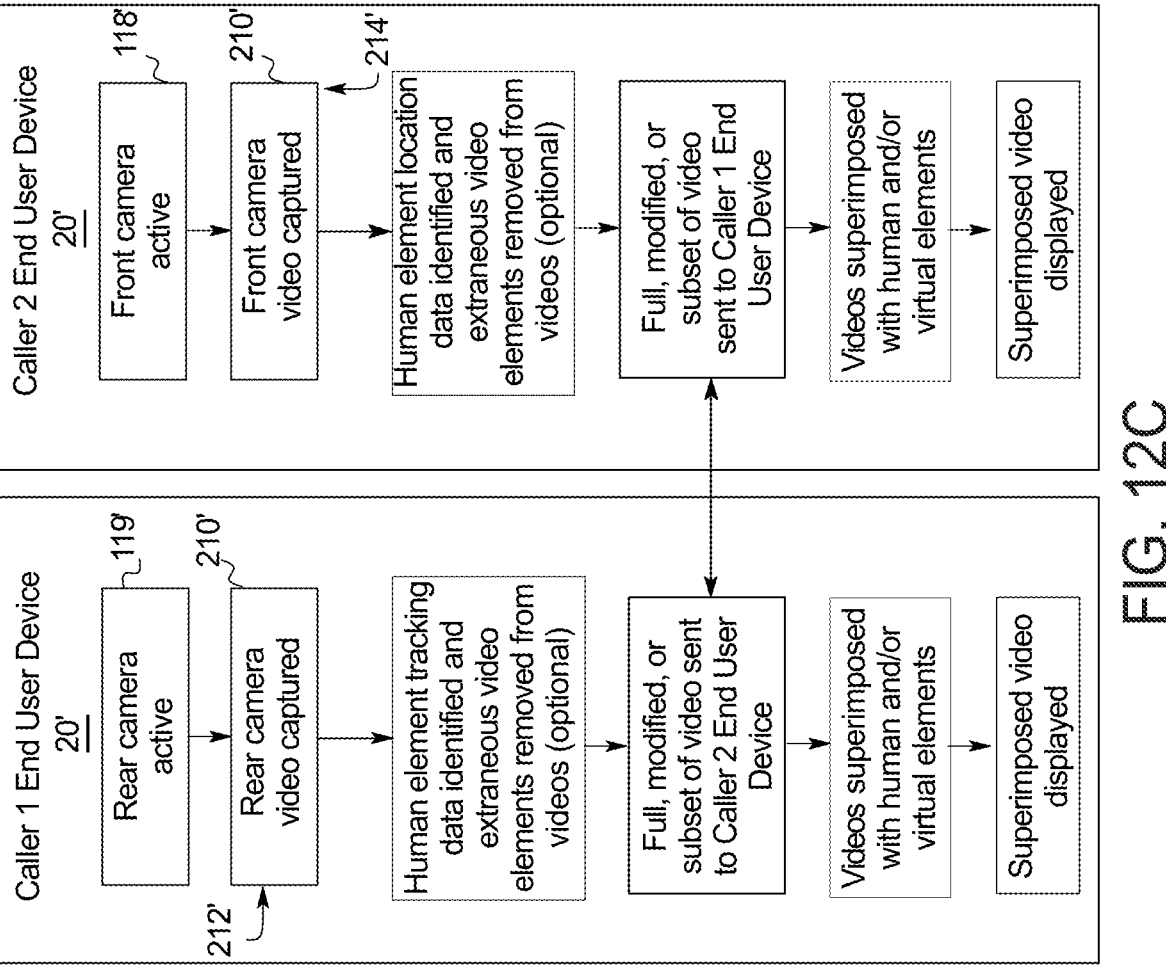

The superimposition functions may instead be accomplished in a peer-to-peer system in which the end user devices 20 communicate directly to each other without any intervention by the central server 30. As such, each of the end user devices 20 may perform the superimposition functions described for the video displayed on that end user device 20 and/or for the video displayed on the other end user device 20. FIG. 12C illustrates an alternative flowchart 10' of the One Way Touch call using the multi-feed video call system 10, with the functions of the central server 30 described above with reference to FIG. 12B are carried out on the Caller 1 and Caller 2 end user devices 20'.

Specifically, in the system 10' of FIG. 12C, each of the Caller 1 and Caller 2 end user devices 20' captures a video 210' and optionally analyzes the video 210' to identify location data of the human elements therein and/or to remove extraneous information from the videos 210'. Each of the Caller 1 and Caller 2 end user devices 20' then sends the full video 210', a modified version of the video 210', and/or a subset of the video 210', such as the location data, to the other end user device 20'. Each end user device 20' then proceeds to combine the received video 210' with the device's own respective video 210' into a superimposed video 310'. In this example embodiment, each of the Caller 1 and 2 end user devices 20' generates its own superimposed video 310' that is displayed on its own respective end user device 20'.

In these examples, the first video 212 is associated with Caller 1 and the second video 214 is associated with Caller 2. It should be noted however the labels regarding the videos 212, 214 could be reversed in this example (and the examples seen in FIGS. 13B and 13C, 10B and 10C, and 11B and 11C) as which video 212, 214 is labeled first and second does not automatically dictate which will be superimposed over the other.

Figure 12D:
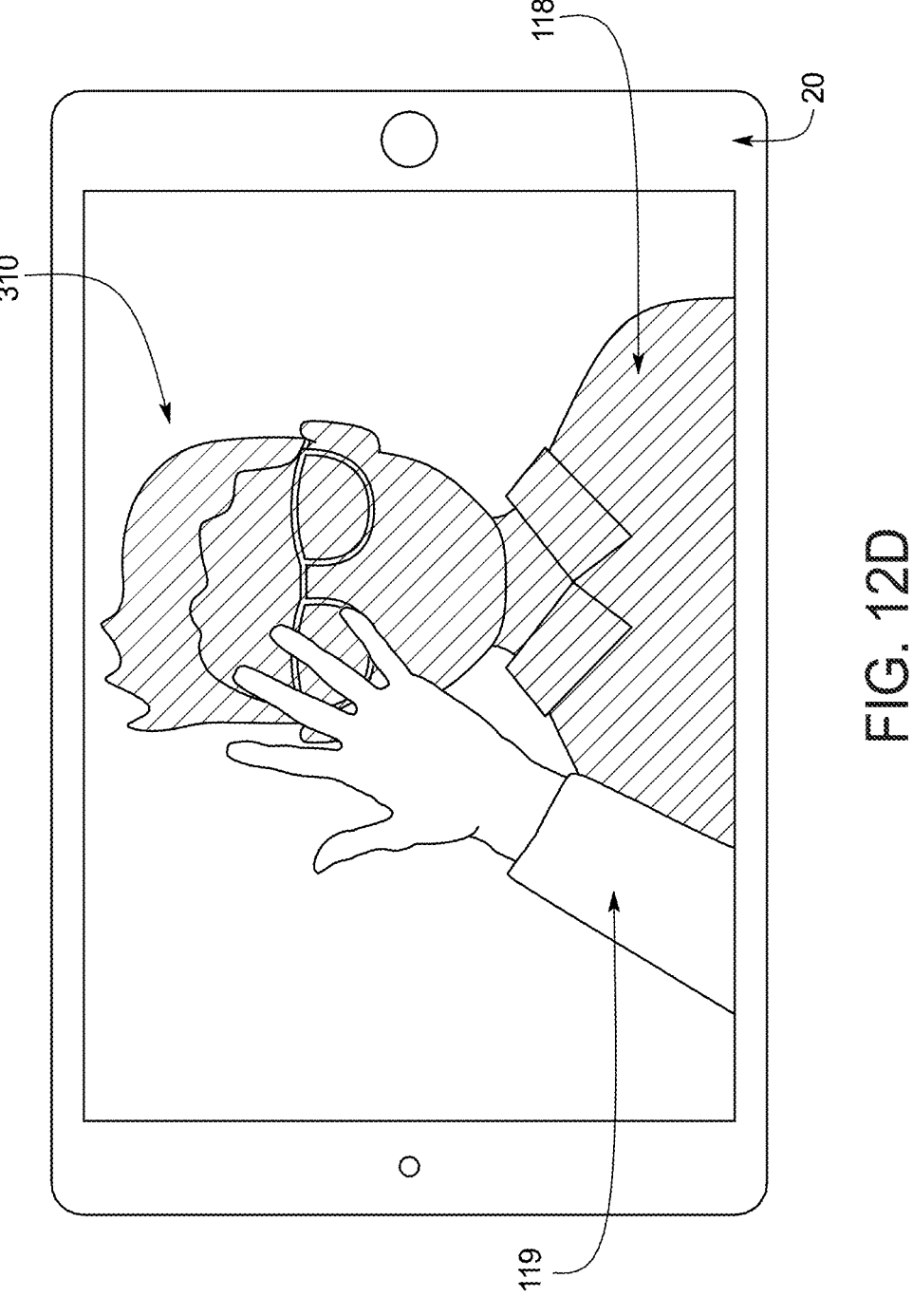
FIG. 12D illustrates a user device displaying a superimposed video in a One Way Touch call.

FIG. 12D is a diagram of a user device 20 displaying a One Way Touch call. As shown in FIG. 12D, an end user device 20 may display a super imposed video 310 which features, in this example, the video 210 from Caller 2's (as shown in FIG. 4) device's front camera 118 with the video 210 from Caller 1's (as shown in FIG. 4) device's back camera 119 superimposed over Caller 2's front camera 118 video 210 allowing Caller 1 to "touch" (i.e., see their hand or other human element(s) superimposed upon the face and/or body of another user) Caller 2 via an illusion shown within the superimposed video 310. In some embodiments, one or more of the human elements 116, 118 is replaced with a virtual element according to the tracking data of the respective video feed 210.

FIG. 13A is an overview diagram of a Front Touch call using the multi-feed video call system 10. As shown in FIG. 13A, a superimposed real time video 310 of both users' front camera 118 (Caller 1 and Caller 2) is displayed to both users. In this example, the video 210 from Caller 1's device's front camera 118 is shown on both Caller 1 and Caller 2's device 20 screens, with the video 210 from Caller 2's device's front camera 118 superimposed over Caller 2's front camera 118 video 210, allowing the users to appear to be physically side by side.

Figure 13B:
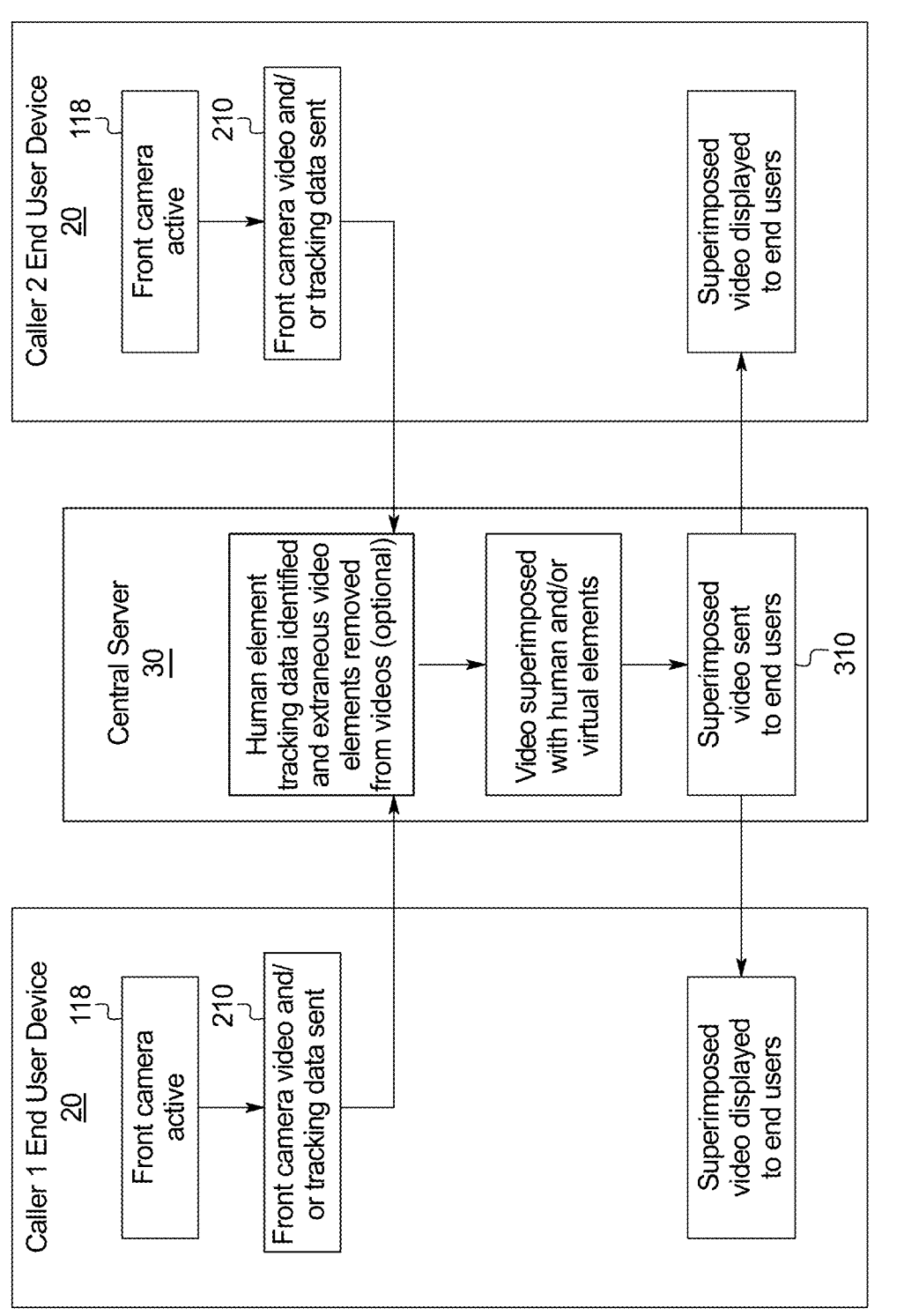
FIGS. 13B and 13C are hybrid schematic-flowcharts showing how the components of the multi-feed video call system may cooperate to accomplish a Front Touch call using the process shown in FIGS. 3 and 11.

FIG. 13B is a flowchart of a Front Touch call using the multi-feed video call system 10. As shown in FIG. 13B, the video 210 which will be superimposed by the system 10 originate on respective caller's end user devices 20. Both users' (Caller 1 and Caller 2) front camera 118 send video 210 to a centralized server 30. The videos 210 and/or tracking data of human element(s) within the videos 210 may be sent via the internet or any other functionally useful means, with the central server 30 receiving the separate videos 210 and/or tracking data, analyzing them, optionally identifying location data of the first and/or second human elements 216, 218 and removing extraneous information from the video 210 (e.g., solid colored backgrounds, etc.), and combining the two respective video 210 into one superimposed video 310. In some embodiments, an augmented reality element, such as a virtual human element, is created and presented in the superimposed video 310 according to the tracking data. The superimposed video 310 is then sent back to the user device's 20 involved in the video chat via the internet or any other functionally useful means.

Figure 13C:
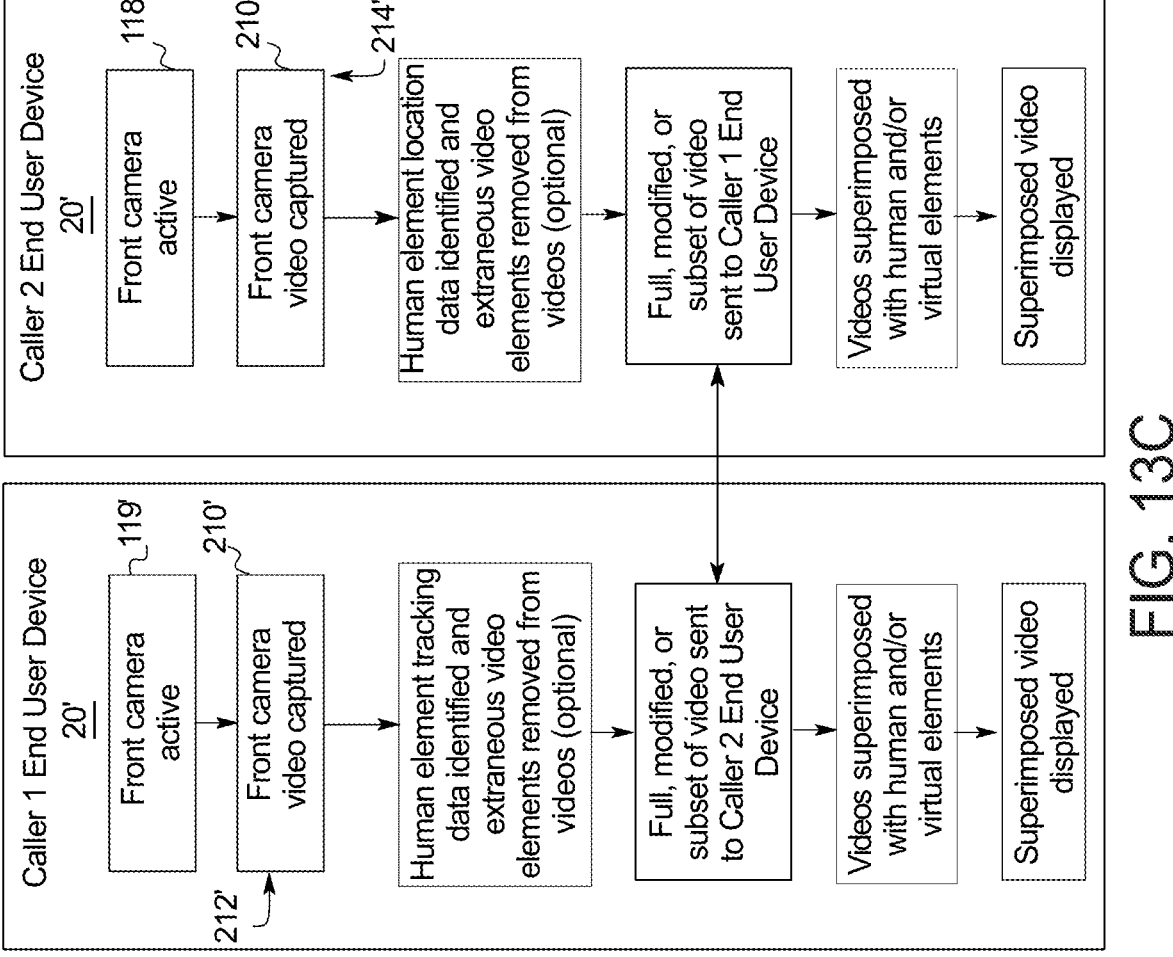

The superimposition functions may instead be accomplished in a peer-to-peer system in which the end user devices 20 communicate directly to each other without any intervention by the central server 30. As such, each of the end user devices 20 may perform the superimposition functions described for the video displayed on that end user device 20 and/or for the video displayed on the other end user device 20. FIG. 13C illustrates an alternative flowchart 10' of the One Way Touch call using the multi-feed video call system 10, with the functions of the central server 30 described above with reference to FIG. 13B are carried out on the Caller 1 and Caller 2 end user devices 20'.

Specifically, in the system 10' of FIG. 13C, each of the Caller 1 and Caller 2 end user devices 20' captures a video 210' using the front cameras thereof and optionally analyzes the video 210' to identify location data of the human elements therein and/or to remove extraneous information from the videos 210'. Each of the Caller 1 and Caller 2 end user devices 20' then sends the full video 210', a modified version of the video 210', and/or a subset of the video 210', such as the location data, to the other end user device 20'. Each end user device 20' then proceeds to combine the received video 210' with the device's own respective video 210' into a superimposed video 310'. In this embodiment, each of the Caller 1 and 2 end user devices 20' generates its own superimposed video 310' that is displayed on its own respective end user device 20'.

FIG. 14A is an overview diagram of a Rear Touch call using the multi-feed video call system 10. As shown in FIG. 14A, a superimposed real-time video 310 of both users' rear cameras 119 (Caller 1 and Caller 2) is displayed to both users. In this example, the video 210 from Caller 1's device's rear camera is shown on both Caller 1 and Caller 2's device 20 screens, with the video 210 from Caller 2's device's rear camera 119 superimposed over Caller 1's rear camera video 210, forming the superimposed video 310, and allowing the users to appear to be physically holding hands, etc.

Figure 14C:
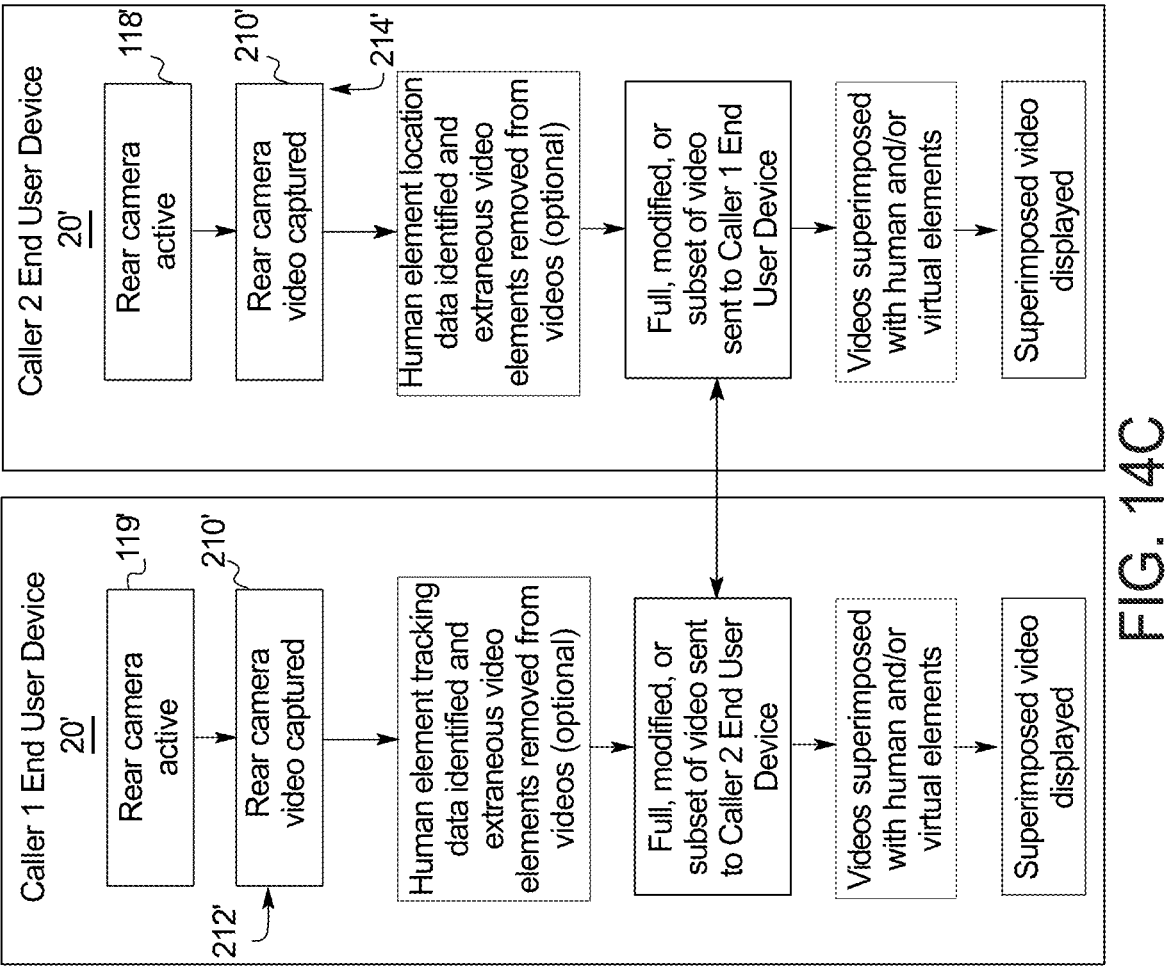

FIGS. 14B and 14C are flowcharts of a Rear Touch call using the multi-feed video call system 10. As shown in FIG. 14B, the video 210 which will be superimposed by the system 10 originate on respective caller's end user devices 20. Both users' (Caller 1 and Caller 2) rear camera 119 send videos 210 and/or tracking data of human element(s) within the videos 210 to a centralized server 30. The videos 210 may be sent via the internet or any other functionally useful means, with the central server 30 receiving the separate videos 210 and/or tracking data, analyzing them, optionally identifying location data of the first and/or second human elements 216, 218, removing extraneous information from the videos 210 (e.g., solid colored backgrounds, etc.), and combining the two respective video 210 into one superimposed video 310. In some embodiments, an augmented reality element, such as a virtual human element, is created and presented in the superimposed video 310 according to the location data. The superimposed video 310 is then sent back to the user device's 20 involved in the video chat via the internet or any other functionally useful means.

The superimposition functions may instead be accomplished in a peer-to-peer system in which the end user devices 20 communicate directly to each other without any intervention by the central server 30. As such, each of the end user devices 20 may perform the superimposition functions described for the video displayed on that end user device 20 and/or for the video displayed on the other end user device 20. FIG. 14C illustrates an alternative flowchart 10' of the One Way Touch call using the multi-feed video call system 10, with the functions of the central server 30 described above with reference to FIG. 14B are carried out on the Caller 1 and Caller 2 end user devices 20'.

Specifically, in the system 10' of FIG. 14C, each of the Caller 1 and Caller 2 end user devices 20' captures a video 210' using the rear cameras thereof and optionally analyzes the video 210' to identify location data of the human elements therein and/or to remove extraneous information from the videos 210'. Each of the Caller 1 and Caller 2 end user devices 20' then sends the full video 210', a modified version of the video 210', and/or a subset of the video 210', such as the location data, to the other end user device 20'. Each end user device 20' then proceeds to combine the received video 210' with the device's own respective video 210' into a superimposed video 310'. In this embodiment, each of the Caller 1 and 2 end user devices 20' generates its own superimposed video 310' that is displayed on its own respective end user device 20'.

FIG. 15A is an overview diagram of a Multi-Way Touch call using the multi-feed video call system 10. As shown in FIG. 15A, a superimposed real-time video 310 of a first user's front camera 118 (Caller 1) and a second user's rear camera 119 (Caller 2) is displayed to the second user, with a superimposed real time video 310 of the video of the second user's front camera 118 (Caller 2) and the first user's rear camera 119 (Caller 1) displayed to the first user. This allows both users to "touch" the other user simultaneously with the visual effect being enabled by the superimposition of video.

Figure 15C:
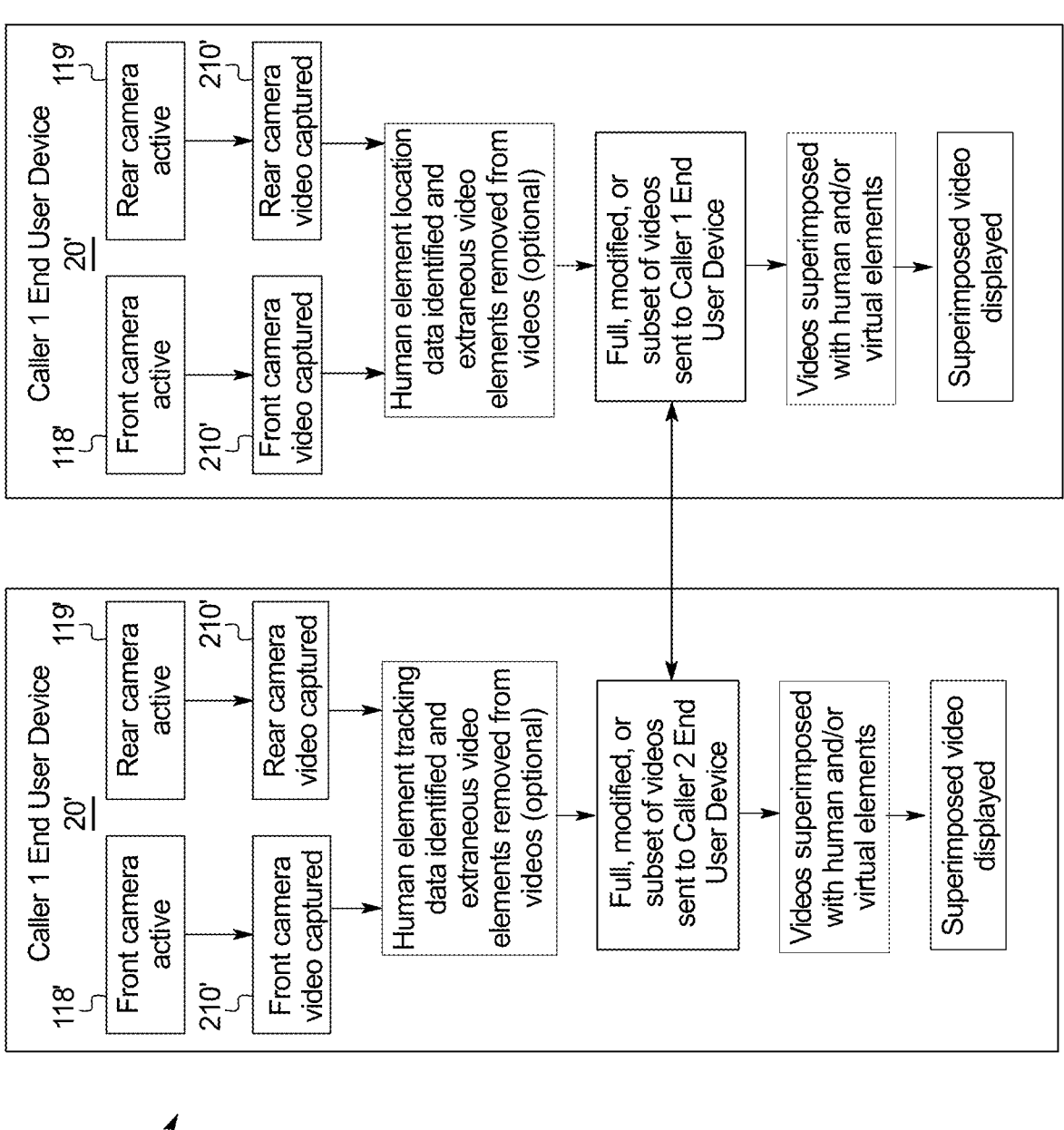

FIGS. 15B and 15C are flowcharts of a Multi-Way Touch call using the multi-feed video call system 10. As shown in FIG. 16B, the video 210 which will be superimposed by the system 10 originate on respective caller's end user devices 20. Both user's rear camera 119 and front camera 118 send videos 210 and/or tracking data of human element(s) within the videos to a centralized server 30. The videos may be sent via the internet or any other functionally useful means, with the central server 30 receiving the separate videos 210 and/or tracking data, analyzing them, optionally identifying tracking data of the first and/or second human elements 216, 218, removing extraneous information from the video 210 (e.g., solid colored backgrounds, etc.), and combining the four respective videos 210 and/or tracking data into two superimposed video 310 (as discussed in FIG. 12A). In some embodiments, an augmented reality element, such as a virtual human element, is created and presented in the superimposed video 310 according to the location data. The superimposed video 310 are then sent back to the respective user device's 20 involved in the video chat via the internet or any other functionally useful means.

The superimposition functions may instead be accomplished in a peer-to-peer system in which the end user devices 20 communicate directly to each other without any intervention by the central server 30. As such, each of the end user devices 20 may perform the superimposition functions described for the video displayed on that end user device 20 and/or for the video displayed on the other end user device 20. FIG. 15C illustrates an alternative flowchart 10' of the One Way Touch call using the multi-feed video call system 10, with the functions of the central server 30 described above with reference to FIG. 15B are carried out on the Caller 1 and Caller 2 end user devices 20'.

Specifically, in the system 10' of FIG. 15C, each of the Caller 1 and Caller 2 end user devices 20' captures a video 210' using the front and rear cameras thereof and optionally analyzes the video 210' to identify location data of the human elements therein and/or to remove extraneous information from the videos 210'. Each of the Caller 1 and Caller 2 end user devices 20' then sends the full videos 210', modified versions of the video 210', and/or location data of the videos 210' to the other end user device 20'. Each end user device 20' then proceeds to combine the received videos 210' with the device's own respective videos 210' into a superimposed video 310'. In this embodiment, each of the Caller 1 and 2 end user devices 20' generates its own superimposed video 310' that is displayed on its own respective end user device 20'.

Figure 16A:
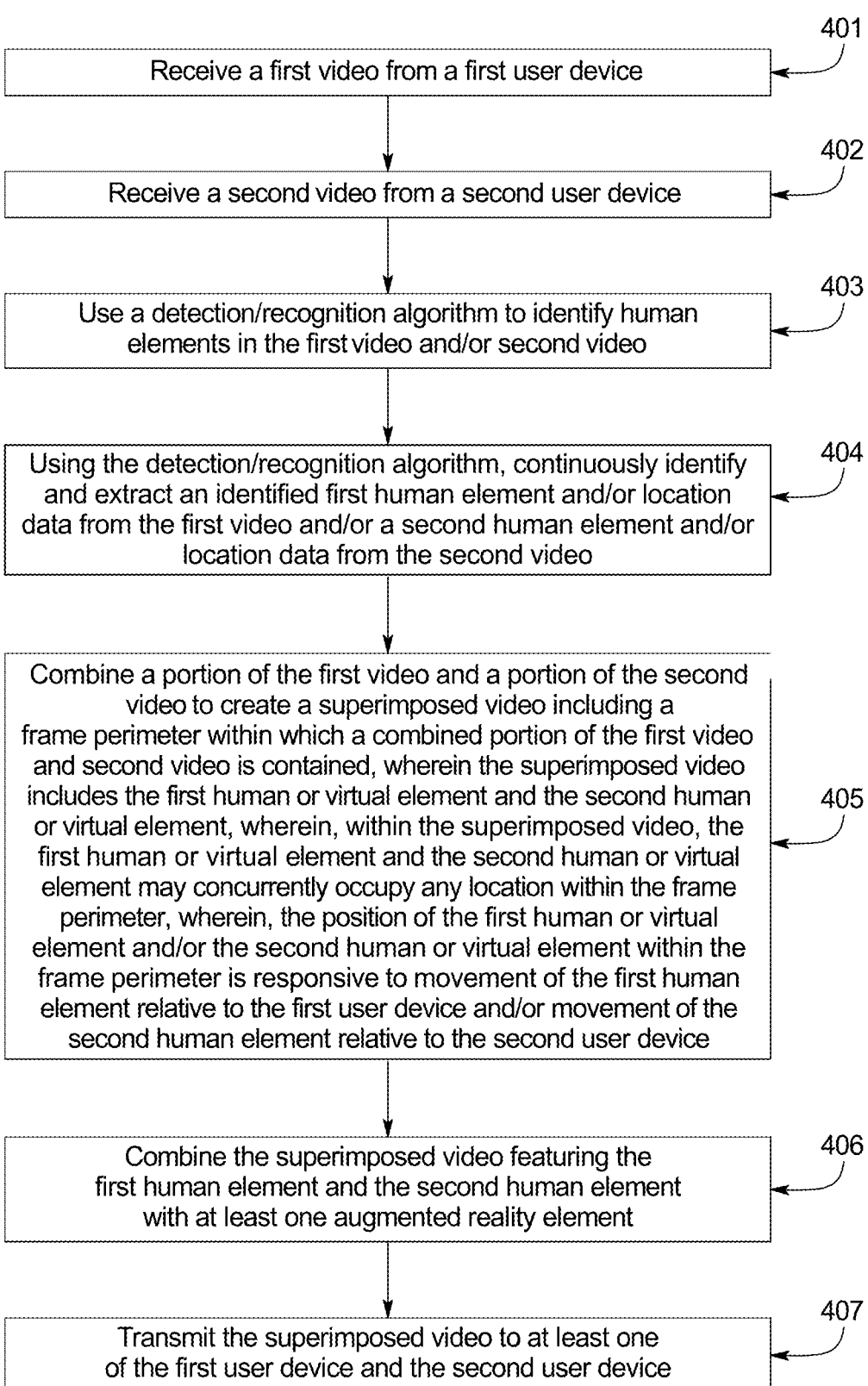
FIG. 16A is a flowchart illustrating a computer-implemented method of superimposing video featuring augmented reality element(s) carried out by a processor.
Figure 16B:
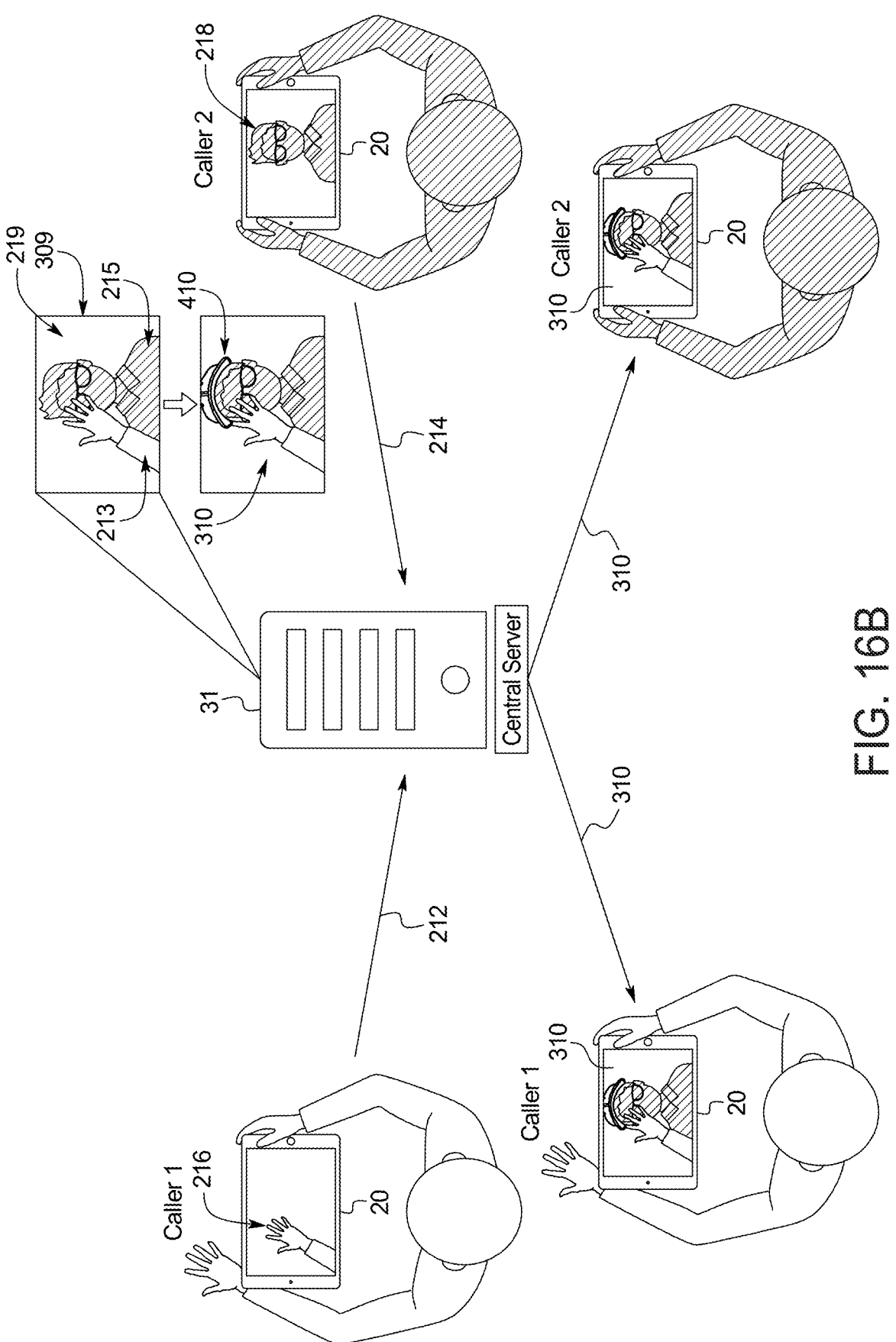
FIG. 16B is a diagram of an augmented reality video call carried out by the system.

FIG. 16A is a flowchart illustrating a computer-implemented method of superimposing video 310 featuring augmented reality element(s) 410 carried out by a processor 31. As shown in FIG. 16A, the method of superimposing video 310 carried out by a processor 31 begins with a processor 31, at a first step 401, receiving a first video 212 from a first user's device 20. Reception by a processor 31 is illustrated in FIG. 16B, wherein the user device 20 of a first user transmits a first video 212 (in this case a video captured by the user's rear camera 119) to a central server 30 including a processor 31 (though the processor 31 may be in a central server 30, the first user device 20, or the second user device 20). The second step 402 of superimposing video 210 carried out by a processor 31 is receiving a second video 214 from a second user's device 20. Again referring to FIG. 16B, reception of the second video 214 from a second user's device 20 by a processor 31 is illustrated (with the second video 214 being captured by the second user's rear camera 119). The third step 403 of this method calls for the processor 31 (within the server 30, the first user device 20, or the second user device 20) to identify a first human element 216 in the first video 212 and/or a second human element 218 in a second video 214 by use of a detection/recognition algorithm. Such human elements are illustrated in FIGS. 16B-16G with the first human element 216 being a hand (captured by the first user's rear camera 119) and the second human element 218 being a face (captured by the second user's front camera 118) or hand (captured by the second user's rear camera 119) in these examples. A human element may be any body part or prosthetic and can even be the body parts of a non-human creature (e.g., dog, cat, gorilla, etc.), however. The system 10 may also only capture a human element from one end user (216 or 218) and transmit it to both.

The fourth step 404 calls for the system 10 to continuously identify and extract a first human element 216 (identified in the first video 212) and/or second human element 218 (identified in the second video 214) from their respective videos. Extraction may be carried out by the detection/recognition algorithm or a separate piece of programing and the methodologies used to extract a given human element may vary depending on technological resources available to a given set of end users. In some embodiments, continuously identifying and extracting a human element also includes identifying human element location data and using this data to create an augmented reality virtual human element. For example, a virtual element may be positioned within the combined video 310 according to the human element location data of the respective video feed 210 identified in step 404.

The fifth step 405 of the computer-implemented method of superimposing video 210 carried out by a processor 31 is combining a portion of the first video 212 and a portion of the second video 214 in real-time to create a superimposed video including a frame perimeter 309 within which a combined portion of the first video 212 and second video 214 is contained, wherein the superimposed video 310 includes the first human element 216 and the second human element 218, wherein, within the superimposed video 310, the first human element 216 and the second human element 218 may concurrently occupy any location within the frame perimeter 309 and the positions of the human elements 216 and/or 218 within the frame perimeter 309 are responsive to movement of these human elements 216 and/or 218 relative to their corresponding end user devices 20. As mentioned above, a human element (216 or 218) may be captured unilaterally by the system without the need for the human element of another to be present for capture, extraction, transmission, etc. to occur. Further, the extracted first human element 216 and/or the extracted second human element 218 may appear as an augmented reality virtual human element presented within the superimposed video 310 according to the human element location data identified in the fourth step 246.

The sixth step 406 of the method of superimposing video featuring augmented reality element(s) is combining the superimposed video 310 (generated in step 404) with at least one augmented reality element 410. Such elements can be seen illustrated in FIGS. 13B-13G and may be used to enhance or alter the human elements 216, 218 seen in the superimposed video 310.

The final step 407 of the computer-implemented method of superimposing video 210 featuring augmented reality element(s) 410 carried out by a processor 31 is transmitting the superimposed video 310 to a user device 20. Such transmission is shown in FIG. 13E, in which the superimposed video 310 is displayed on the first user and second user's devices 20. Worth noting here is that the example shown in FIG. 13E utilizes one user device's 20 front camera 118 and one user device's 20 rear camera 119, but the present invention may also utilize multiple cameras of a device 20 facing the same direction to capture video concurrently. One such device with multiple cameras facing the same direction is the iPhone 7, which is capable of blending or stitching images captured by is multiple cameras together to provide wide angle images, greater image quality, etc. The present invention may also utilize any and all other cameras of a given device or multiple devices to capture video concurrently.

FIG. 16B is a diagram of an augmented reality video call carried out by the system 10. Illustrated in FIG. 16B, wherein the user device 20 of a first user transmits a first video 212 (in this case a video 210 captured by the user's rear camera 119) to a central server 30 including a processor 31 (though the processor 31 may be in a central server 30, the first user device 20, or the second user device 20). Reception of the second video 214 from a second user's device 20 by a processor 31 is illustrated (with the second video 214 being captured by the second user's front camera

118). The processor 31 then identifies a first human element 216 in the first video 212 and a second human element 218 in a second video 214. Such human elements 216, 218 are illustrated in FIG. 4 with the first human element 216 being a hand (captured by the first user's rear camera 119) and the second human element 218 being a face (captured by the second user's front camera 118).

A key feature of the augmented reality multi-feed video call system 10 is that, within the superimposed video 310, the first human element 216 and the second human element 218, are each able to occupy any portion of the superimposed video 310. In the example shown in FIG. 16B, this feature is represented by the ability of either the first human element 216 or the second human element 218 to occupy any space within the frame perimeter 309 and the frame perimeter 309 is shown to occupy the entirety of the display on the device 20. While this is one contemplated example, it is understood that the frame perimeter 309 for the superimposed video 310 may otherwise occupy a smaller portion of the display on the device 20. The critical concept relating to the ability of either the first human element 216 or the second human element 218, or any virtual human elements presented in place thereof, to occupy any space within the frame perimeter 309 is that the first human element 216 or virtual human element and the second human element 218 or virtual human element may occupy adjacent positions on the screen, may separate from each other, and may pass in front of or behind each other, or any be represented by any combination of these relative positions. For example, some portion of the first human element 216 may be shown to be touching the second human element 218 while other portions of the first human element 216 may be shown to be separated from the second human element 218.

The portion of the first video 213 and a portion of the second video 215 combined in real-time may be only the first human element 216 and second human element 218, or can include more video 210 from the videos 212, 213. This additional video 210, beyond the human elements 216, 218 may include a background 219 and augmented reality element(s) 410. Such a background 219 is illustrated in FIG. 16B (in this case a plain solid color), with the human elements 216, 218 able to occupy any space within the frame perimeter 309 and move independently of each other and the background 219.

The background 219 can be generated by the system 10 or captured by a device 20 camera 118, 119. In the example shown in FIG. 4, the first human element 216 (a hand) is superimposed on top of the second human element 218 (a face) with both elements 216, 218 being able to occupy the same location at the same time. In this example, since the first human element 216 is superimposed by the processor 31 over the second human element 218, the hand is able to obscure the face in the superimposed video 310. The frame perimeter 309, also illustrated in FIG. 4, is the defined size of the superimposed video 310 (e.g., the aspect ratio, etc.) which may be automatically determined by the processor 31 based off the videos 210 provided to it.

The augmented reality element 410 in this example is a hat. The hat augmented reality element 410 may be automatically placed upon the appropriate corresponding human element by the system 10 (e.g., hat on the head, boxing glove on hand, etc.) and may also be placed anywhere within the frame perimeter 309. The human elements 216, 218 may be set to interact with the augmented reality element 410 (e.g., bump it, push it, smash it), pass through the object 410, or have the element 410 obscured by the human elements 216 and/or 218. It should also be noted that the human elements

216 and 218 are not the only portions of the final superimposed video 310 which may interact with the augmented reality element(s) 410 with other augmented reality element(s) 410 and the background 219 also potentially interacting with a given augmented reality element 410.

It should also be noted the portions of videos 213, 215 may be superimposed upon each other first, with the augmented reality element(s) 410 then being added in a second distinct step as shown or the various portions (e.g., human elements 216 and 218, background 219, and/or augmented reality element(s) 410) of the final superimposed video 310 may be combined all at once by the present system 10. Still yet other sequences of superimposition of the various portions of the final superimposed video 310 are also possible including the system 10 superimposing an augmented reality element 410 upon a human element (216 or 218) from one of the portions (213 or 215) of one of the video feeds (212 or 214) before then superimposing the portions of the two video feeds (213 and 215) upon one another.

Transmission of the superimposed video 310 is displayed on the first user and second user's devices 20. Worth noting here is that the example shown in FIG. 16B utilizes one user device's 20 front camera 118 and one user device's 20 back camera 119, but the present invention may also utilize any cameras of a device 20 facing any direction to capture video 210 concurrently.

Figure 16C:
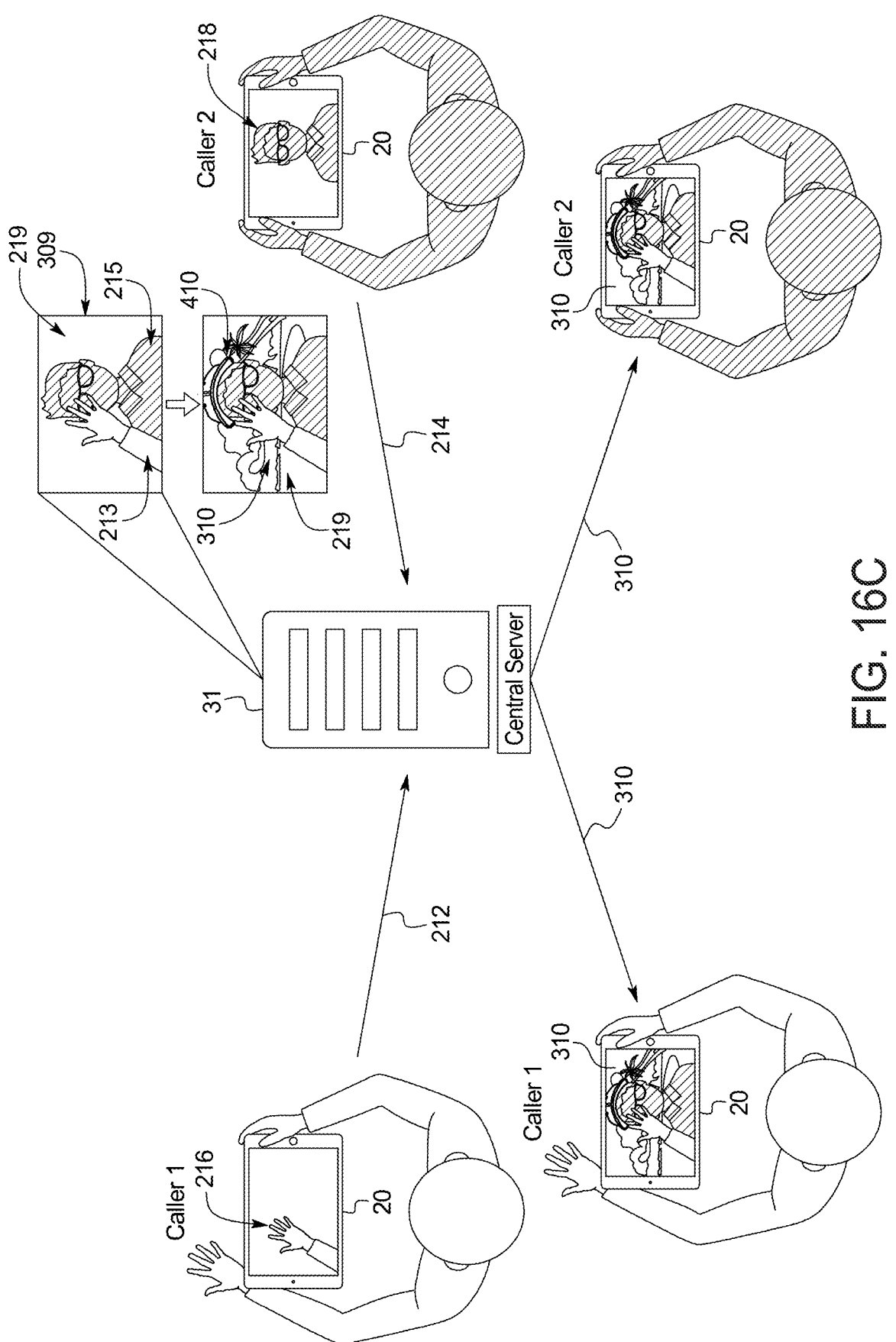
FIG. 16C is a diagram of an augmented reality video call carried out by the system featuring an augmented reality background.

FIG. 16C is a diagram of an augmented reality video call carried out by the system 10 featuring an augmented reality background 219. Similar to the steps illustrated in FIG. 12B, the steps shown in FIG. 16C feature the superimposition of portions of two videos 213 and 215 and the addition of augmented reality elements 410. In this example, the augmented reality elements 410 are both a hat and tropical background 219. To achieve this effect in this example, the system 10 identifies human elements 216 and 218 from the video streams 212 and 214. The system 10 then places the portions of the videos 213 and 215 containing the human elements 212 and 214 within a frame perimeter 309. The human elements 212 and 214 may move freely within this frame perimeter 309 with the system placing an augmented reality element 410 of a tropical environment as the background 219. As it is sunny in tropical locations, the system 10 may also create various visual effects upon the human elements shown within the superimposed video 310. For example, the portion of the second user's video 215 in this example features a head and upper torso as a human element 218. The face, head, and/or neck portion of this human element 218 may have a sunburn effect applied to it within the superimposed video 310. To counteract this augmented reality effect, the first human element 216 may interact with a hat augmented reality element 410 and place the hat upon the head of the second human element 218. With the hat augmented reality element 410 in place, the sunburn effect may then be removed by the system 10 within the superimposed video 310. As described, each of the users may interact with the augmented reality element 410.

Figure 16D:
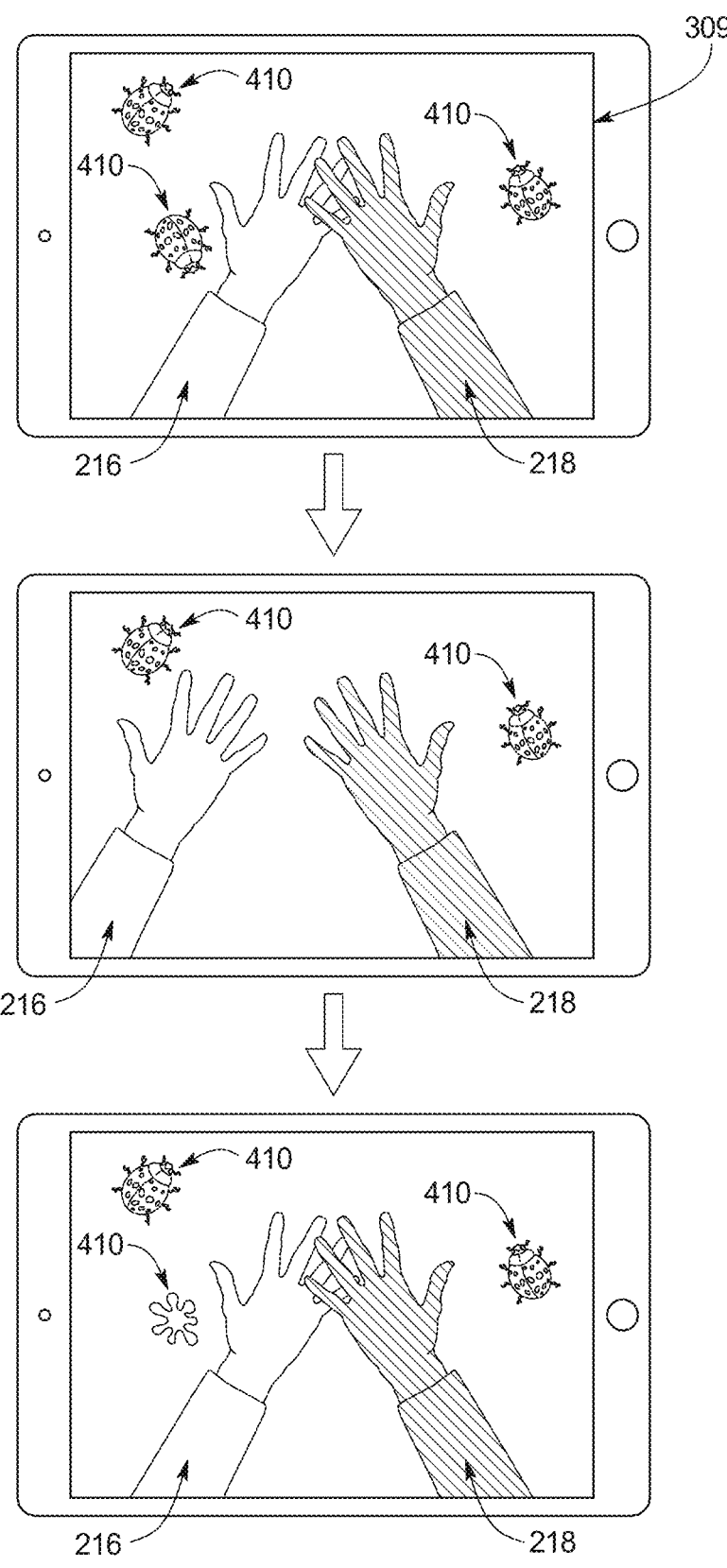
FIG. 16D is a diagram demonstrating how a human element may interact with an augmented reality element during an augmented reality video call.

FIG. 16D is a diagram demonstrating how a human element 216 may interact with an augmented reality element 410 during an augmented reality video call. As shown in FIG. 16D, in this example, the augmented reality elements 410 are bugs. The bug augmented reality elements 410 may be still or animated (e.g., crawl around the area within the frame perimeter 309). In this example, one of the human elements (hand element 216 from a first video feed 212) moves to obscure one of the augmented reality bug elements 410 from sight. The hand element 216 may simply obscure the element momentarily or result in the system 10 displaying the bug element 410 as being squashed by the hand element 216. Such an effect may be achieved by monitoring the relative location of the hand element 216 and the augmented reality elements 410 within the frame perimeter 309. The system 10 may also keep track of how many bugs each human element squashes as part of a competition between participants of a video call.

It should be noted that multiple human elements can interact with the augmented reality elements 410 during a given multi-source video call. For example, two human elements might go to squash the same bug element 410 and knock the bug aside instead. In another example, the two human elements might be able to play tug of war against one another via a rope augmented reality element 410 or team up together and fight augmented reality ninja elements 410.

Figure 16E:
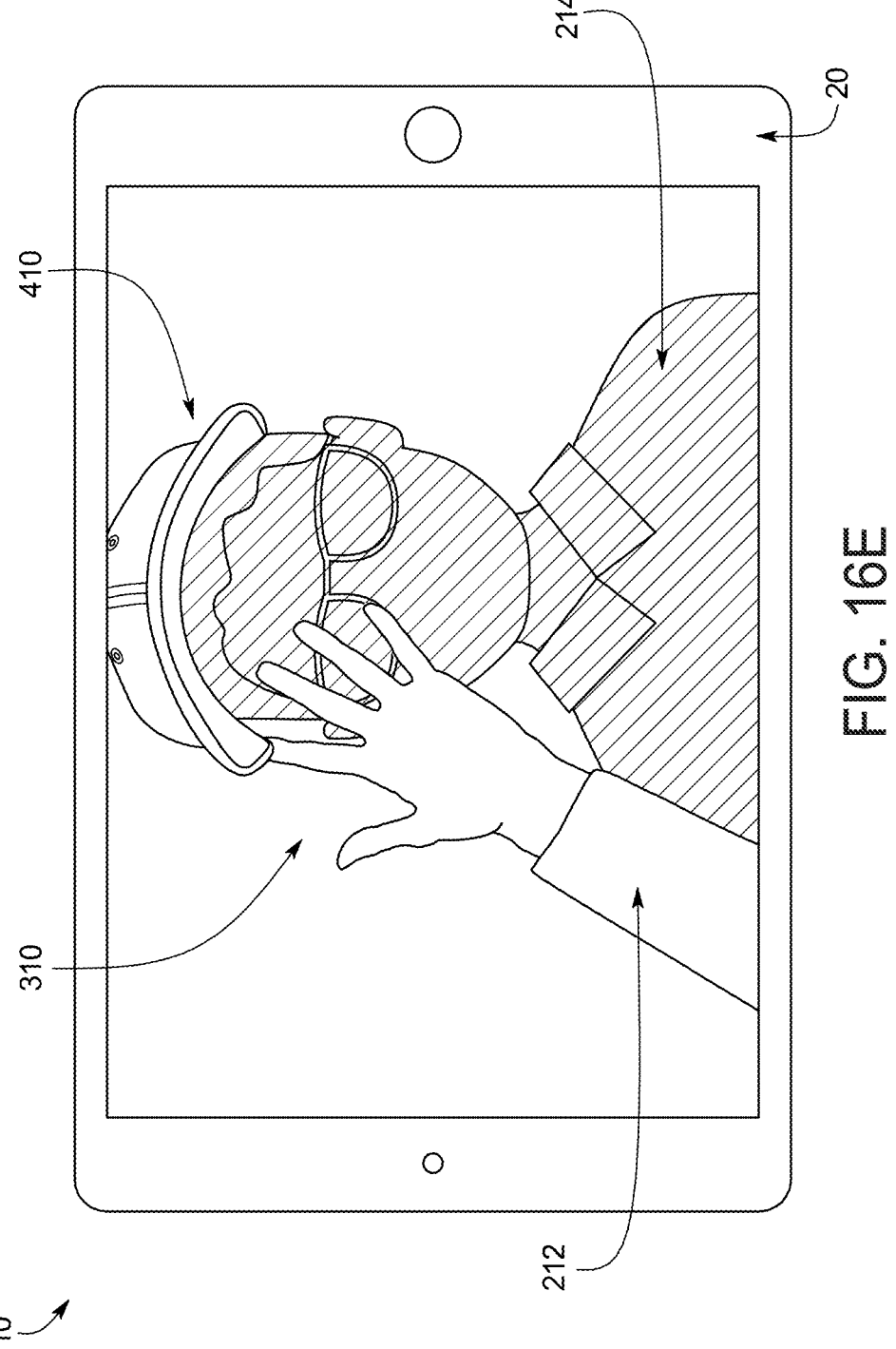
FIG. 16E illustrates a superimposed video created by the multi-source video superimposition system 10 featuring augmented reality elements.

FIG. 16E illustrates a superimposed video 310 created by the multi-source video superimposition system 10 featuring augmented reality elements 410. The superimposed video 310 shown is created from video feeds 210 captured from the rear facing camera 119 of a first user and the front facing camera 118 of a second user. Such cameras may be integrated into any form of computing device (i.e., end user computing devices 20) and may include smartphones, tablets, personal computers, smart televisions, etc. These computing devices may transmit the video feed(s) 210 captured by their respective cameras (119, 118) to a centralized server 30. This centralized server 30 may be responsible for the superimposition of video feeds 210 and addition of augmented reality element(s) 410 to the superimposed video 310 (discussed in FIGS. 16A and 16H). The superimposition functions may instead be accomplished in a peer-to-peer system in which the end user devices 20 communicate directly to each other without any intervention by the central server 30. As such, each of the end user devices 20 may perform the superimposition functions described for the video displayed on that end user device 20 and/or for the video displayed on the other end user device 20.

The multi-source video superimposition system 10 may use a human element detection algorithm to identify the human elements of both users (such as the face/eyes/head/arm/torso etc.) in their respective video feeds 210. These human elements can then interact with each other in the superimposed video in addition to interacting with an augmented reality effects and/or animations. Additionally, the human elements detected by the system 10 may be placed in a frame perimeter 309 featuring augmented reality elements 410 which enables the end users to further interact with one another.

As shown in FIG. 16E, the system 10 enables a hand element (the first human element 216) from a first user's video feed 212 to place an augmented reality element (a baseball cap) 410 onto the head element (second human element 218) from a second user's video feed 214. This action is displayed in real time to at least one end user (in this case the first user) on their computing device 20 with all the action being contained within the frame perimeter 309 (that perimeter being the dimensions of the user device screen in this example).

Figure 16F:
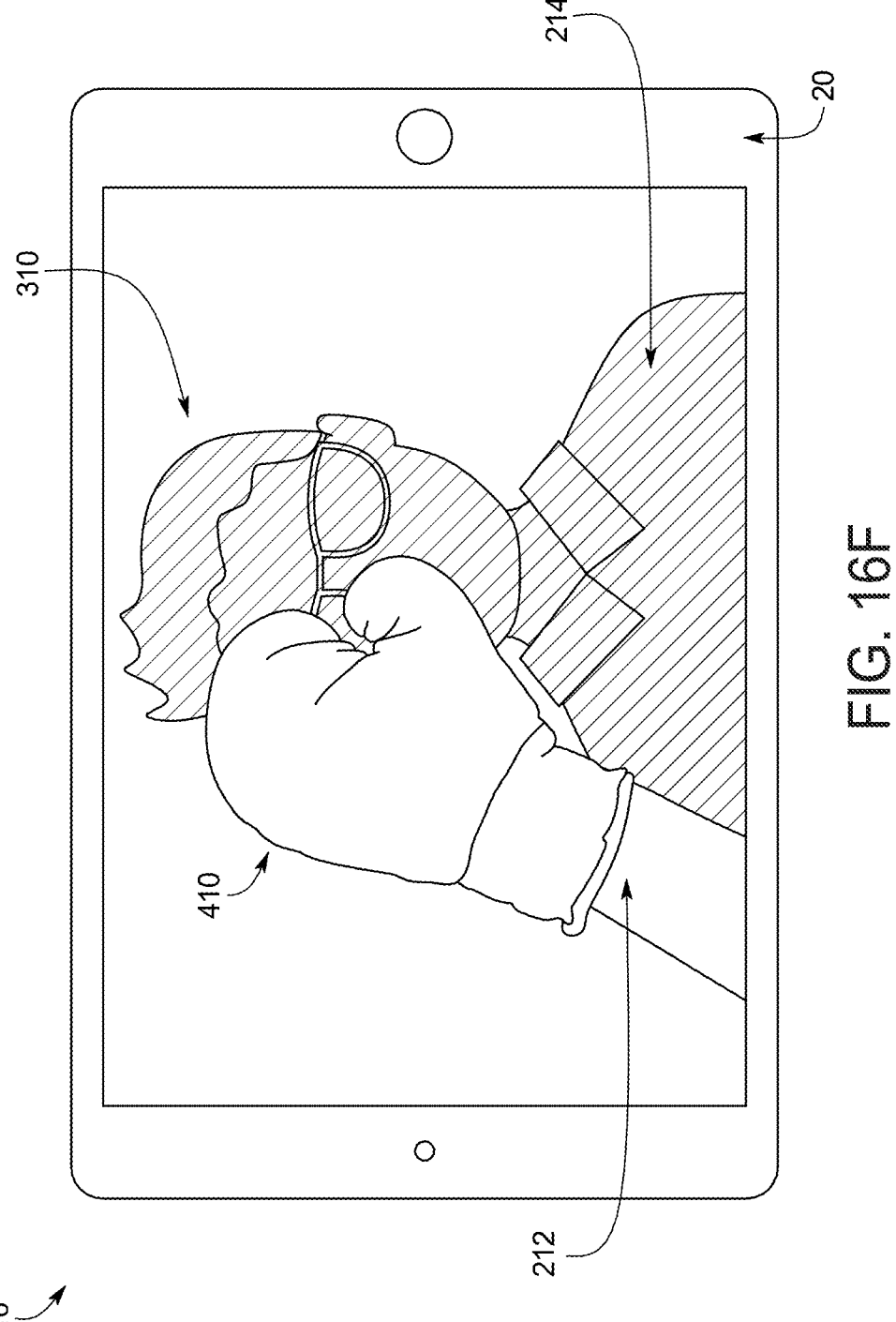
FIG. 16F illustrates another example of an augmented reality element being added to a superimposed video feed by the multi-source video superimposition system.

FIG. 16F illustrates another example of an augmented reality element 410 being added to a superimposed video 310 feed by the multi-source video superimposition system 10. As shown in FIG. 16F, the hand element 216 from a first user's video feed 212 has an augmented reality boxing glove element 410 placed over the hand in the superimposed video feed 310 displayed to the end user(s). The boxing glove covered hand of a first user may then have the ability to interact with the face element 218 of the second user's video feed 214. This interaction may include obscuring the face but can also include creating an augmented reality visual representation of a cut, bruise, etc. on the face element 218 of the second user. Another related example is provided below with reference to FIGS. 23 and 24.

Figure 16G:
FIG. 16G illustrates yet another example of augmented reality element(s) being added to a superimposed video feed by the multi-source video superimposition system.

FIG. 16G illustrates yet another example of augmented reality element(s) 310 being added to a superimposed video feed 310 by the multi-source video superimposition system 10. As shown in FIG. 16G, both the superimposed hand elements of a first user (216) and second user (218) are able to interact with each other and also interact with the augmented reality elements 410 (e.g., bugs) inserted into the superimposed video 310 by the system. The user's hand elements (216, 218) extracted from the respective video feeds (212, 214) may have the ability to squash or flick the bug elements 410 as they appear on screen (shown in FIG. 16D) with such interactions being part of a game or activity with the system also keeping track of score, displaying smashed bugs, etc.

Figure 16H:
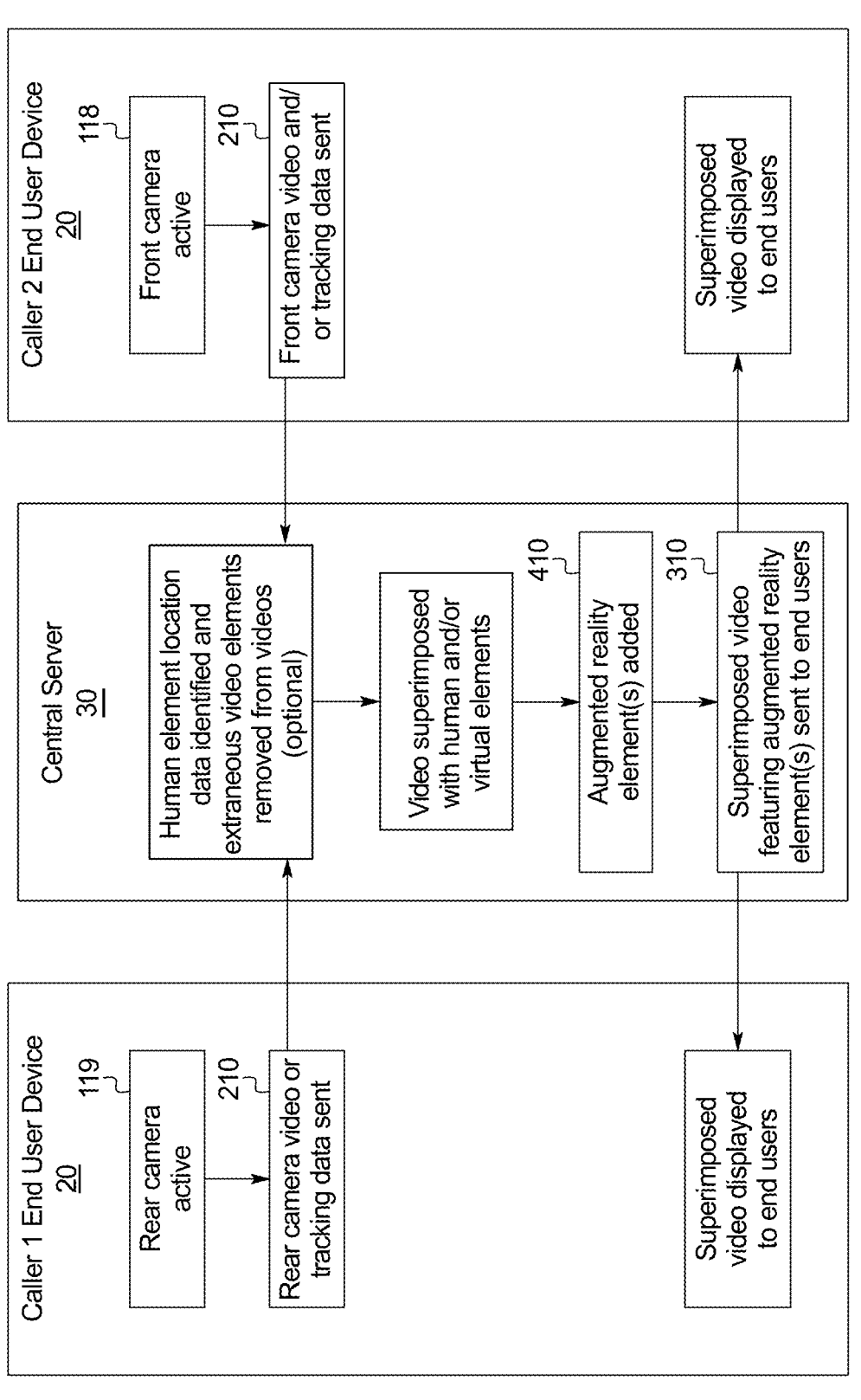
FIGS. 16H and 16I are flowcharts of an augmented reality element being added to a video call using the multi-feed video call system.

FIG. 16H is a flowchart of an augmented reality element 310 being added to a video call using the multi-feed video call system 10. As shown in FIG. 16H, the videos 210 which will be superimposed by the system 10 originate on respective caller's end user devices 20. A first user's rear camera 119 and second user's front camera 118 send videos 210 and/or tracking data of human element(s) within the videos 210 to a centralized server 30. The video may be sent via the internet or any other functionally useful means, with the central server 30 receiving the separate video 210, analyzing them, optionally identifying location data of the first and/or second human elements 216, 218, removing extraneous information from the video 210 (e.g., solid colored backgrounds, etc.), and combining the two respective videos 210 and/or tracking data into a superimposed video 310 (as discussed in FIG. 12A). In some embodiments, an augmented reality element, such as a virtual human element, is generated and presented in the superimposed video 310 according to the location data. The superimposed video 310 then has at least one augmented reality element 410 added to the superimposed video 310, with the system then sending back the super imposed video 310 to the respective user device's 20 involved in the video chat via the internet or any other functionally useful means.

Figure 16I:
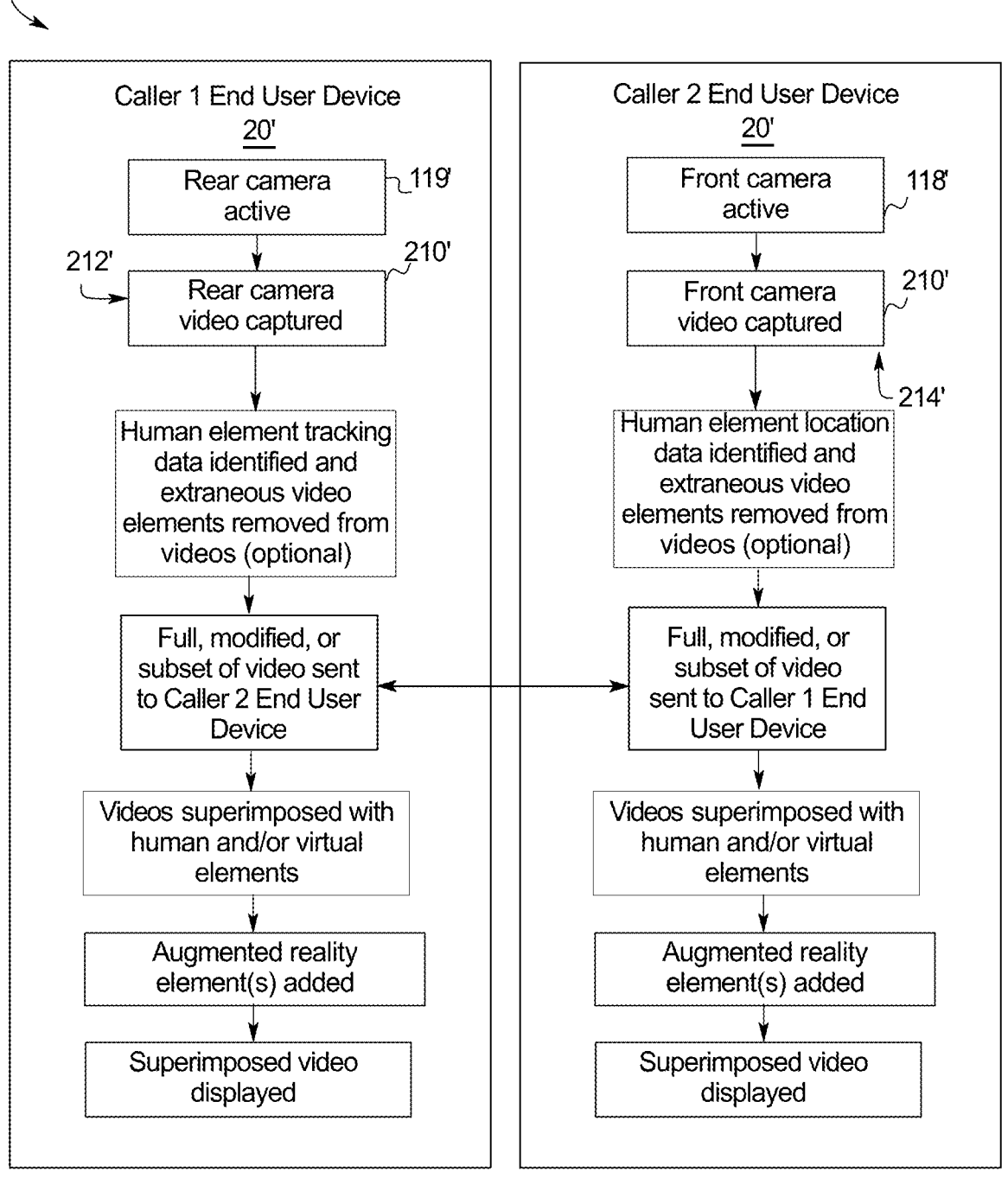

The superimposition functions may instead be accomplished in a peer-to-peer system in which the end user devices 20 communicate directly to each other without any intervention by the central server 30. As such, each of the end user devices 20 may perform the superimposition functions described for the video displayed on that end user device 20 and/or for the video displayed on the other end user device 20. FIG. 16I illustrates an alternative flowcharts 10' of the video call system 10, with the functions of the central server 30 described above with reference to FIG. 16H are carried out on the Caller 1 and Caller 2 end user devices 20'.

Specifically, in the system 10' of FIG. 16C, each of the Caller 1 and Caller 2 end user devices 20' captures a video 210' using the front and rear cameras thereof and optionally analyzes the video 210' to identify location data of the human elements therein and/or to remove extraneous information from the videos 210'. Each of the Caller 1 and Caller 2 end user devices 20' then sends the full videos 210', modified versions of the video 210', and/or location data of the videos 210' to the other end user device 20'. Each end user device 20' then proceeds to combine the received videos 210' with the device's own respective videos 210' into a superimposed video 310'. In this embodiment, each of the Caller 1 and 2 end user devices 20' generates its own superimposed video 310' that is displayed on its own respective end user device 20'. An augmented reality element is then added to each of the superimposed video 310'. It should be noted the types of augmented reality elements 410 added to a superimposed video 310 by the system 10 may be selected via a graphical user interface (GUI) running on one of the end user devices 20. For example, users may have the option to select from a drop-down menu within the GUI of augmented reality elements 410 including objects (e.g., bugs, hats, fruit, etc.) and environments (e.g., moon, mars, rainforest, etc.). The environment(s) selected by users (or automatically applied by the system) may also impact how the human elements and augmented reality objects interact. For example, if an end user was to select the moon as their augment reality environment and bugs as an augmented reality object, the bugs might be given a weightless or low gravity visual effect to simulate being on the moon. The human elements might also have this same visual effect applied.

It should also be noted that the movement and position of all visual elements (human and augmented reality elements 410) may be tracked via a spatial recognition algorithm. The spatial recognition algorithm may keep track of the relative position between elements, movement speed of moving elements, acceleration of moving elements, and any momentum of a moving element (and this momentum's transfer to other elements).

Figure 17:
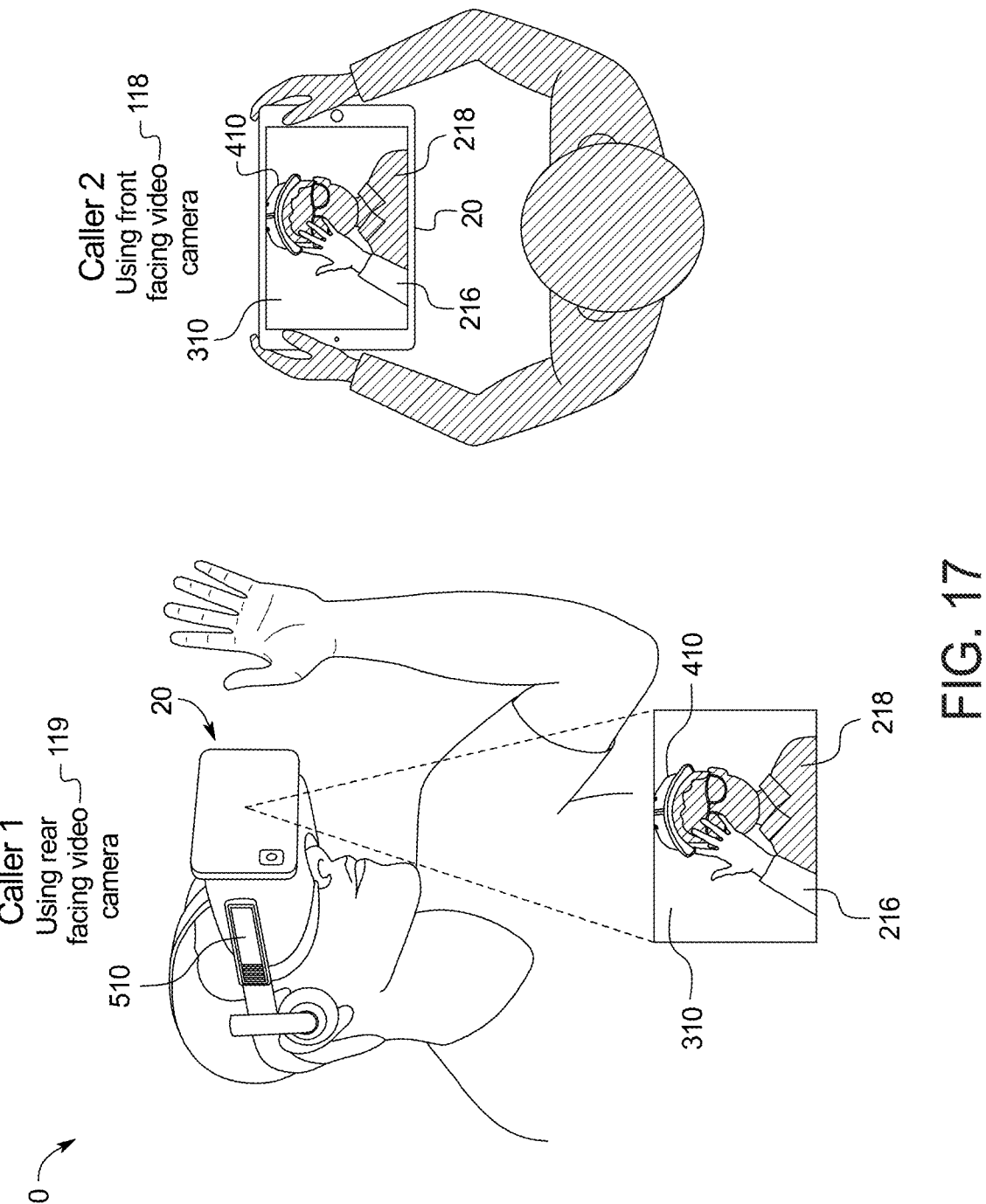
FIG. 17 is a diagram of an augmented reality enhanced video call using the multi-feed video call system and a virtual reality headset.

FIG. 17 is an overview diagram of an augmented reality enhanced video call using the multi-feed video call system 10 and a virtual reality headset 510. As shown in FIG. 17, a superimposed real-time video 310 of one user's front camera 118 (Caller 2) and another user's rear camera 119 (Caller 1) is displayed to both users. In this example, the video 210 from Caller 2's device's front camera 118 is shown on both Caller 1 and Caller 2's device 20 screens, with the video 210 from Caller 1's device's back camera 119 superimposed over Caller 2's front camera 118 video 210 allowing Caller 1 to "touch" (i.e., see their hand or other human element(s) superimposed upon the face and/or body of another user) Caller 2 via an illusion created by the superimposition of the video 210. In this example, the first human element 216 is associated with Caller 1's hand and the second human element 218 is associated with Caller 2's face, neck, and upper torso. It should be noted however the labels regarding the first human element 216 and second human element 218 could be reversed in this example as which human element is labeled first and second does not automatically dictate which element will be superimposed over the other.

The superimposed video 310 shown to the end users may features augmented reality element(s) 410 (examples shown in FIGS. 16B-16G) with the end users potentially being able to also enjoy virtual reality effects as well. As shown in FIG. 17, a first user is utilizing a virtual reality (VR) headset 510. This user may be shown the same superimposed video feed 310 which is shown to a second user, or shown a different superimposed video feed 310 depending on the hardware and software capabilities of each user's device 20. For example, the user wearing the VR headset might be shown 3-D images of a hat augmented reality element 410, etc. in their respective superimposed video 310 while the second user, carrying out a call on a tablet, is shown 2-D images of the hat element 410. etc. The VR headset 510 may be attachable to a smartphone or tablet as shown, or the end user device 20 may be fully integrated into the VR headset 510. Such headsets 510 may include commercially available solutions such as the Sony PlayStation VR, HTC Vive, Oculus Rift, Google Daydream, and Samsung Gear VR, etc. The VR Headset 510 may also be proprietary in design in order to maximize functionality of superimposed augmented reality video calls carried out by the system 10.

Figure 18A:
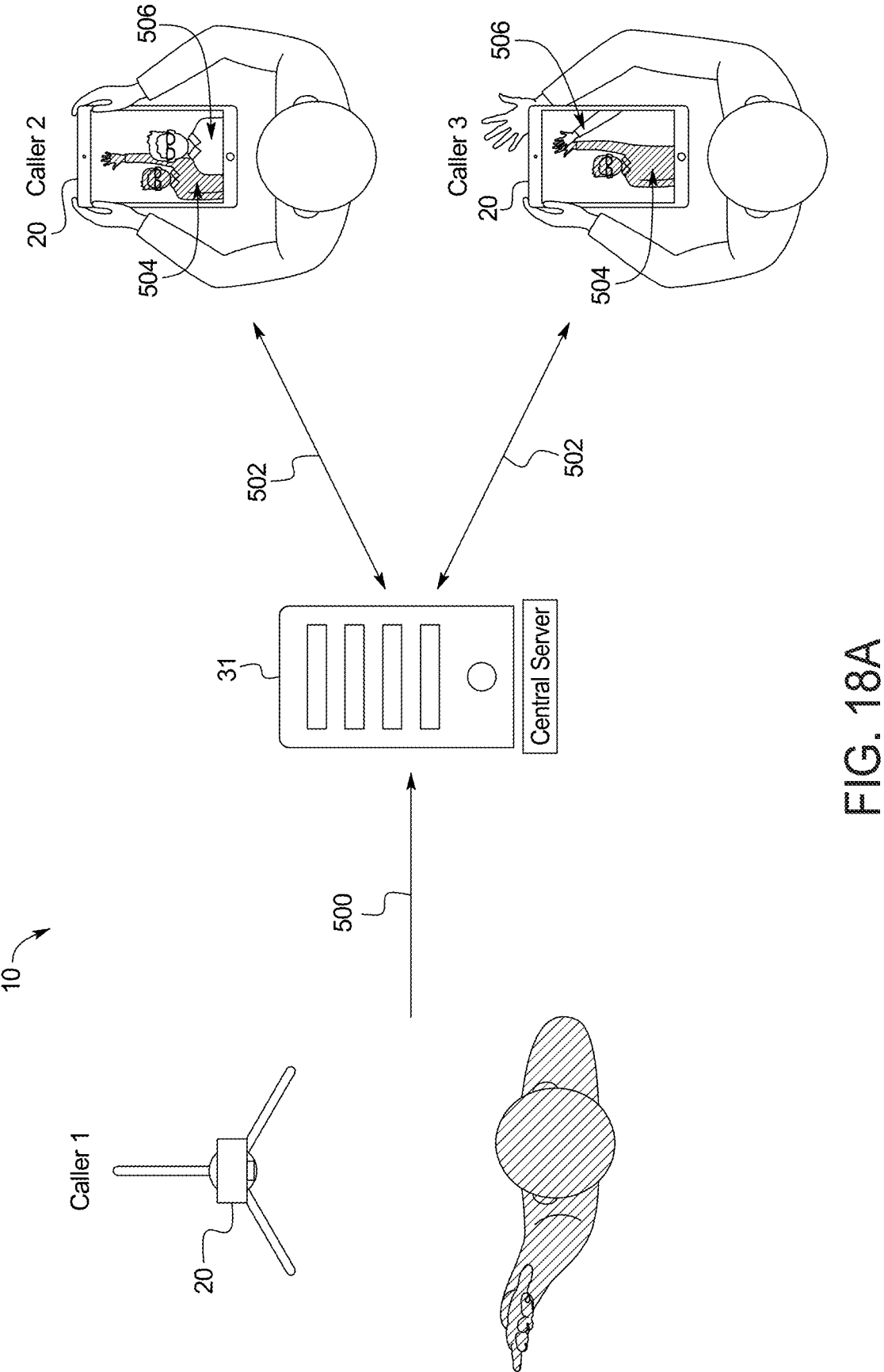
FIG. 18A is a schematic diagram of another example of a multi-feed video call system.

FIG. 18A illustrates an example of an embodiment of the system 10 in which the video feed from one of the devices 20 may be a prerecorded video feed 500 and the video feed of the other device 20 is a live video feed 502. The prerecorded video feed 500 may or may not be recorded using a mobile device 20. For example, as shown in FIG. 18A, the prerecorded video feed 500 may be recorded using professional film making equipment 20. In primary embodiments, a prerecorded element 504 of prerecorded video feed 500 may be taken from the perspective of a front facing camera and a live element 506 of a live video feed 502 may be taken from a rear facing camera of a user's device 20. However, in other examples, the prerecorded video 500 may be taken from a rear facing camera of a mobile device 20 or using a camera associated with a device 20 other than a mobile device.

The prerecorded video feed 500 may be provided to a specific one user or may be provided to many users and their associated devices 20 at once or at multiple points in time. For example, the prerecorded video 500 may be part of a marketing or advertising campaign in which a large number of users are given the opportunity to interact with the prerecorded video feed 500.

In some instances, the prerecorded video feed 500 may be adapted such that it is provided in segments, with transitions from one segment to the next being dependent on the system 10 recognizing a specific movement or action made by the user in the live video feed 502. For example, the prerecorded video feed 500 may feature a celebrity, such as an athlete, who presents an introduction and then asks the viewer for a specific interaction (e.g., asks the viewer for a high-five) and only progresses to a second "un-locked" segment of the prerecorded video 500 when the viewer executes the appropriate action in the live video feed 502. The action required to unlock the subsequent segment of the prerecorded video 500 may be a combination of both movement and audio, just movement, or just audio.

In the example shown in FIG. 18A, the prerecorded video feed 500 includes a person raising his left hand as the prerecorded element 504. The prerecorded video feed 500 is communicated to the central server 30 and then provided a first user's mobile device 20 and a second user's mobile device 20. Alternatively, the prerecorded video feed 500 may be provided directly to each of the end user devices 20.

In the example shown, the first user interacts with the prerecorded video feed 500 using the front facing camera in the user's device 20. As shown in FIG. 18A, the first user positions himself in front of the mobile device 20 and the live element 506 (the user's head and shoulders) overlays the prerecorded video feed 500. When the first user interacts with the prerecorded element 504 in the live video feed 502, a subsequent segment of the prerecorded video feed 500 may be unlocked.

Also in the example shown, the second user interacts with the prerecorded video feed 500 using the rear facing camera in the user's device 20. Accordingly, the second user moves his right hand behind his device 20 to create a live video feed 502 that includes the second user interacting with the hand from the prerecorded video feed 500. When the second user interacts with the prerecorded element 504, for example, to grasp hands with the prerecorded element 504 in the live video feed 502, a subsequent segment of the prerecorded video feed 500 may be unlocked.

The prerecorded video feed 500 and the prerecorded element 504 may overlay the live video feed 502 and the live element 506. In other embodiments, the live video element 506 may overlay the prerecorded video feed 500 and the prerecorded element 504.

Figure 18B:
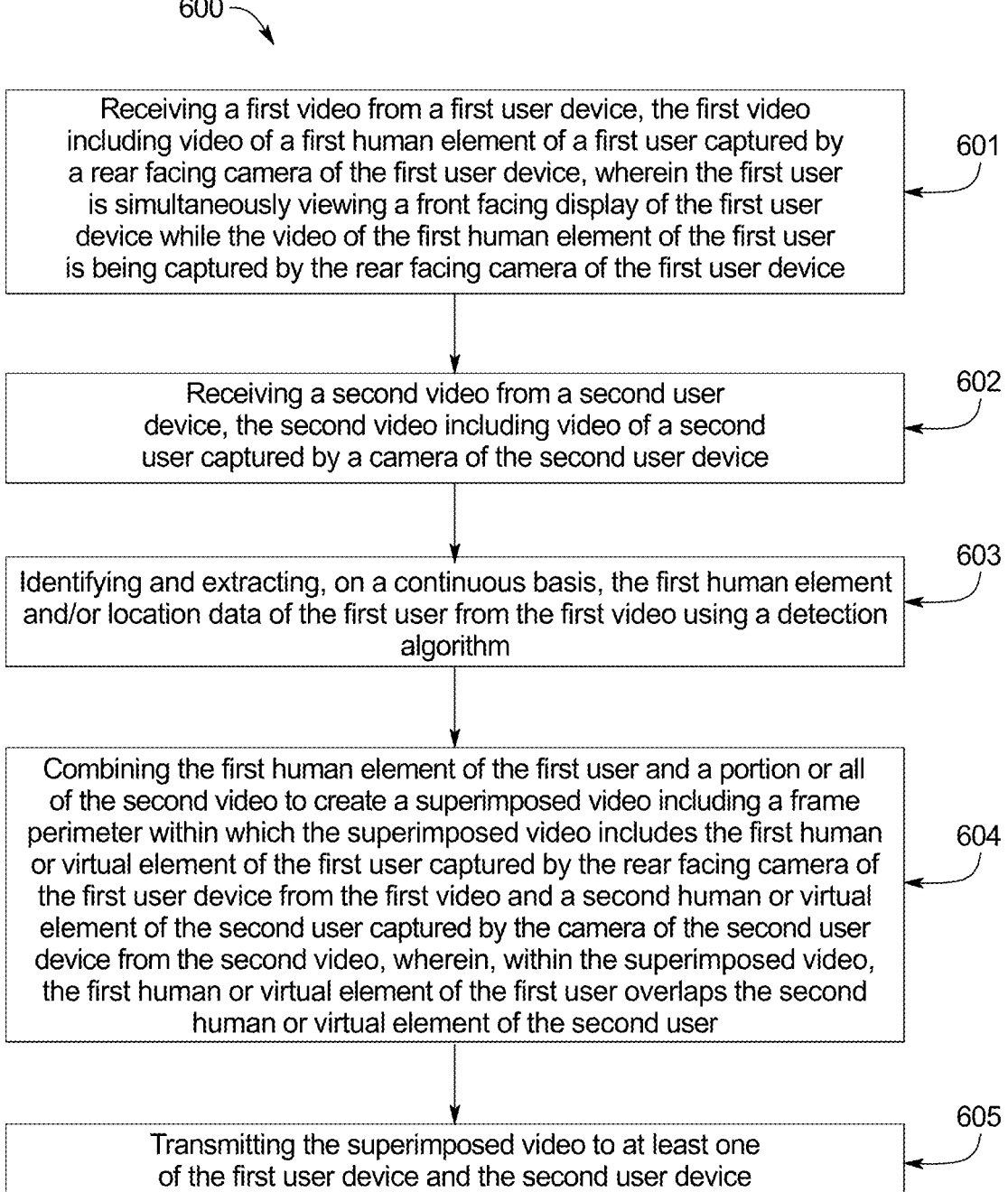
FIG. 18B is a flowchart illustrating a computer-implemented method of superimposing video on a prerecorded video carried out by a processor.

FIG. 18B is a flowchart illustrating a computer-implemented method of superimposing video on a prerecorded video 600. As shown in FIG. 18B, the method 600 includes a first step 601 of receiving a first video from a first user device, the first video including video of a first human element of a first user captured by a rear facing camera of the first user device, wherein the first user is simultaneously viewing a front facing display of the first user device while the video of the first human element of the first user is being captured by the rear facing camera of the first user device. In a second step 602, a second video from a second user device is received, the second video including video of a second user captured by a camera of the second user device. A third step 603 includes identifying and extracting, on a continuous basis, the first human element of the first user from the first video using a detection algorithm. In some embodiments, continuously identifying and extracting a human element also includes identifying human element location data and using this data to create an augmented reality virtual human element. For example, a virtual element may be positioned within the combined video 310 according to the human element location data of the respective video feed 210 identified in step 603.

In a fourth step 604, the first human or virtual human element of the first user and a portion or all of the second video is combined to create a superimposed video including a frame perimeter within which the superimposed video includes the first human or virtual human element of the first user captured by the rear facing camera of the first user device from the first video and a second human or virtual human element of the second user captured by the camera of the second user device from the second video, wherein, within the superimposed video, the first human or virtual human element of the first user overlaps the second human or virtual human element of the second user. The method 600 also includes a fifth step 605 of transmitting the superimposed video to at least one of the first user device and the second user device.

FIG. 18C is a flowchart illustrating a computer-implemented method 700 of superimposing video on a prerecorded video feed 500. In a first step 702, a video feed is recorded using a user device 20. The user device 20 may be a mobile device, professional video recording equipment, or any other device that capable of recording the video described herein. The prerecorded video feed 500 may be intended to be played back as a continuous video or may be intended to be played back in segments. In either instance, the prerecorded video feed 500 includes a prerecorded element 504. In a second step 704, the prerecorded video feed 500 is provided to one or more user devices 20. As noted above, the prerecorded video feed 500 may be provided as a single continuous feed or may be provided to be played back in segments, with the transition from one segment to the next being dependent on recognition of a specific interaction by the live element 506 in a live video feed 502, such as a specific interaction by the live element 506 with the prerecorded element 504 in the prerecorded video feed 500. In a third step 706 shown in the method 700 shown in FIG. 18C, the first segment of the prerecorded video feed 500 is played on a user device 20. In a fourth step

708, a live video feed 502 captured by the user device 20 is overlaid on the prerecorded video feed 500, allowing a user to interact with the prerecorded element 504. In another embodiment, the prerecorded video feed 500 is overlaid onto the live video feed 502. In any embodiment, the live video feed may include an augmented reality virtual element in place of the human element, positioned within the video feed according to location data of the human element collected by the system 10. In a fifth step 710, when the user performs the specific interaction with the prerecorded element 504, the subsequent segment in the prerecorded video feed 500 is unlocked. In a sixth step 712, the subsequent segment of the prerecorded video feed 500 is played on the user device 20. The method 700 then returns to the fourth step 708, in which the live video feed 502 is overlaid onto the prerecorded video feed 500, again allowing the user to interact with a the prerecorded element 504 to either view the remainder of the prerecorded video feed 500 or to unlock the prerecorded video feed 500 in segments.

FIG. 19 illustrates an example of the system 10 in which the end user devices include a mobile device 602 and a personal computer 604 equipped with a webcam 606. In the example shown in FIG. 19, the webcam 606 is an external webcam peripheral. However, it is contemplated that the teachings herein can be applied to the use of a separate professional camera, a front facing integrated camera, a wireless camera, or any other image capturing device.

In the example shown in FIG. 19, a first human element from a first live video 612 is superimposed upon a second human element from a second video 614 to produce a superimposed video 610 in which the human elements (e.g., the first human element 612 and the second human element 614) may interact and be displayed in any position relative to each other to simulate the appearance of the human elements from each video to be present in the same physical space. As shown, the first human element 612 is captured using the rear facing camera 616 of the mobile device 602 and the second human element 614 is captured using an external webcam 606.

In one example of the system 10 shown in FIG. 19, the second human element from the second video 614 is prerecorded and the first human element from the first live video 612 is captured superimposed in real-time. In another example of the system 10 shown in FIG. 19, both the second human element from the second video 614 and the first human element from the first live video 612 are captured and superimposed in real-time.

Many of the various embodiments and examples described herein include a composite video in which two separate video sources, each including a human element, are combined. To more realistically combine human elements from multiple video sources, it may be useful to employ an auto-scaling function in which the size of the human element in each video source is scaled to more appropriately match the human element in the other video source. This may be especially important in examples in which contact is simulated between the human elements from each video source.

The size of the human element in the video may be dependent on the distance between the camera and the human element. Accordingly, the difference in proportions between the human elements may be most noticeable when one or more of the human elements being combined in the superimposed video is closer or further from the camera than expected. Accordingly, the system 10 may auto-scale, auto-zoom, or simply provide some indication to the user to adjust the position to make the human elements within the superimposed video appear more natural in terms of scale and proportion.

Figure 20:
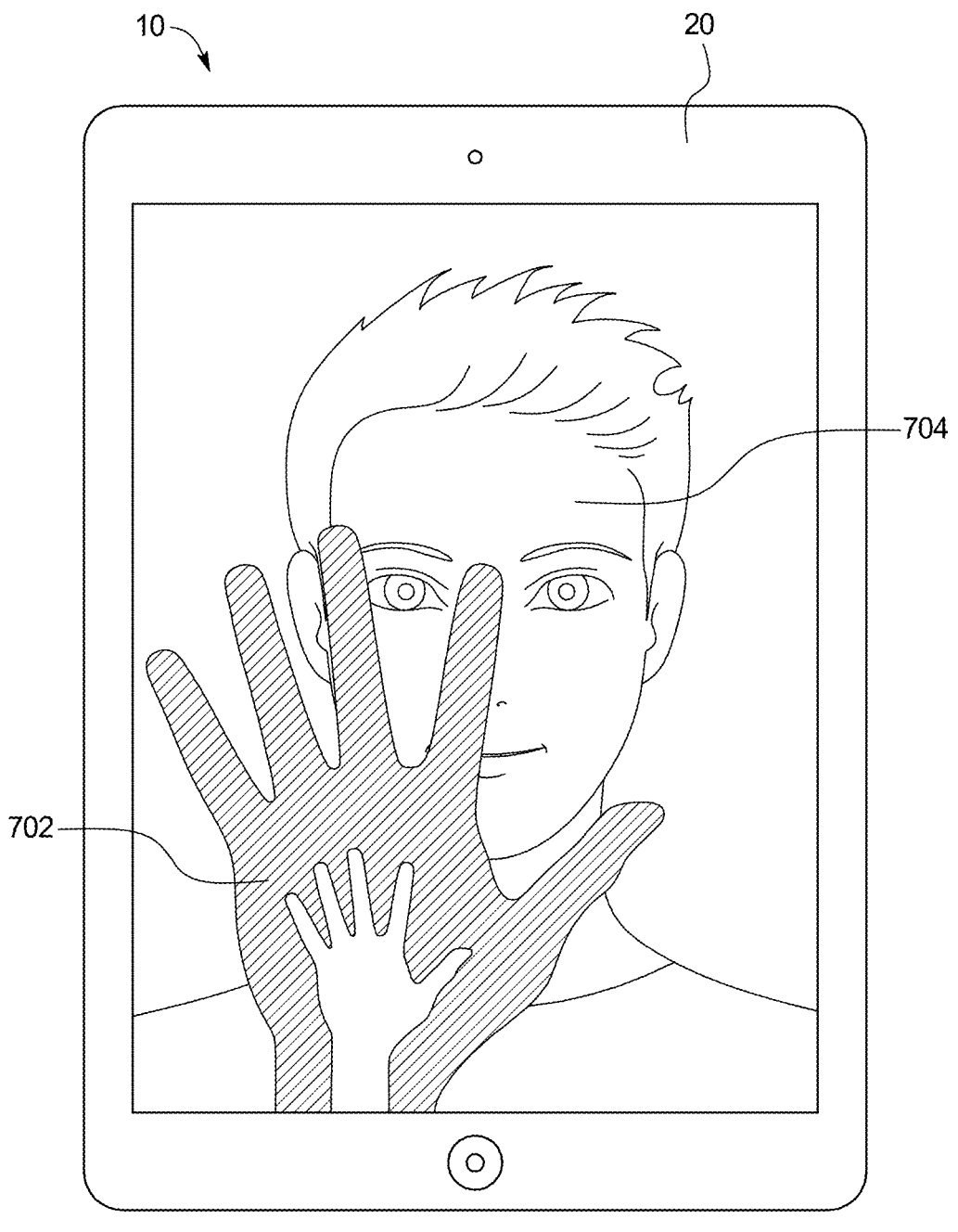
FIG. 20 is a diagram illustrating autoscaling functionality in a multi-feed video call system.

For example, as shown in FIG. 20, when combining a first user's hand 702 from a first video source with a second user's head and neck 704 from a second video source, it may be advantageous to scale the elements of the videos such that the proportions of the first user's hand 702 look natural in light of the proportions of the second user's head and neck 704. Such autoscaling may be accomplished by first recognizing which types of human elements are being combined in the composite video and referencing a data set including physiological parameters such as the standard proportions of body parts compared to each other. In this manner, the system may recognize that a male hand is one of the first human elements from a first video source that is being combined with a female head as one of the second human elements from a second video source and use statistical norms to scale the video including the male hand and/or the video including the female head such that the composite video appears to be a more natural combination.

As shown in FIG. 20, the first user's hand 702 (initially represented as a white hand) may initially be too small of a proportion in relation to the second user's head and neck 704. Then, in response to an autoscaling action, the first user's hand 702 is enlarged to be proportional to the second user's head and neck 704, as represented as a black hand in FIG. 17.

Such automatic scaling may be accomplished in a scaling of the video feed or it may be accomplished by automatically adjusting a zoom setting of the image capturing device. Accordingly, the scaling may occur as part of the capture process, in the process of combining the video feeds, or in some cases in both stages.

Figures 21A, 21B:
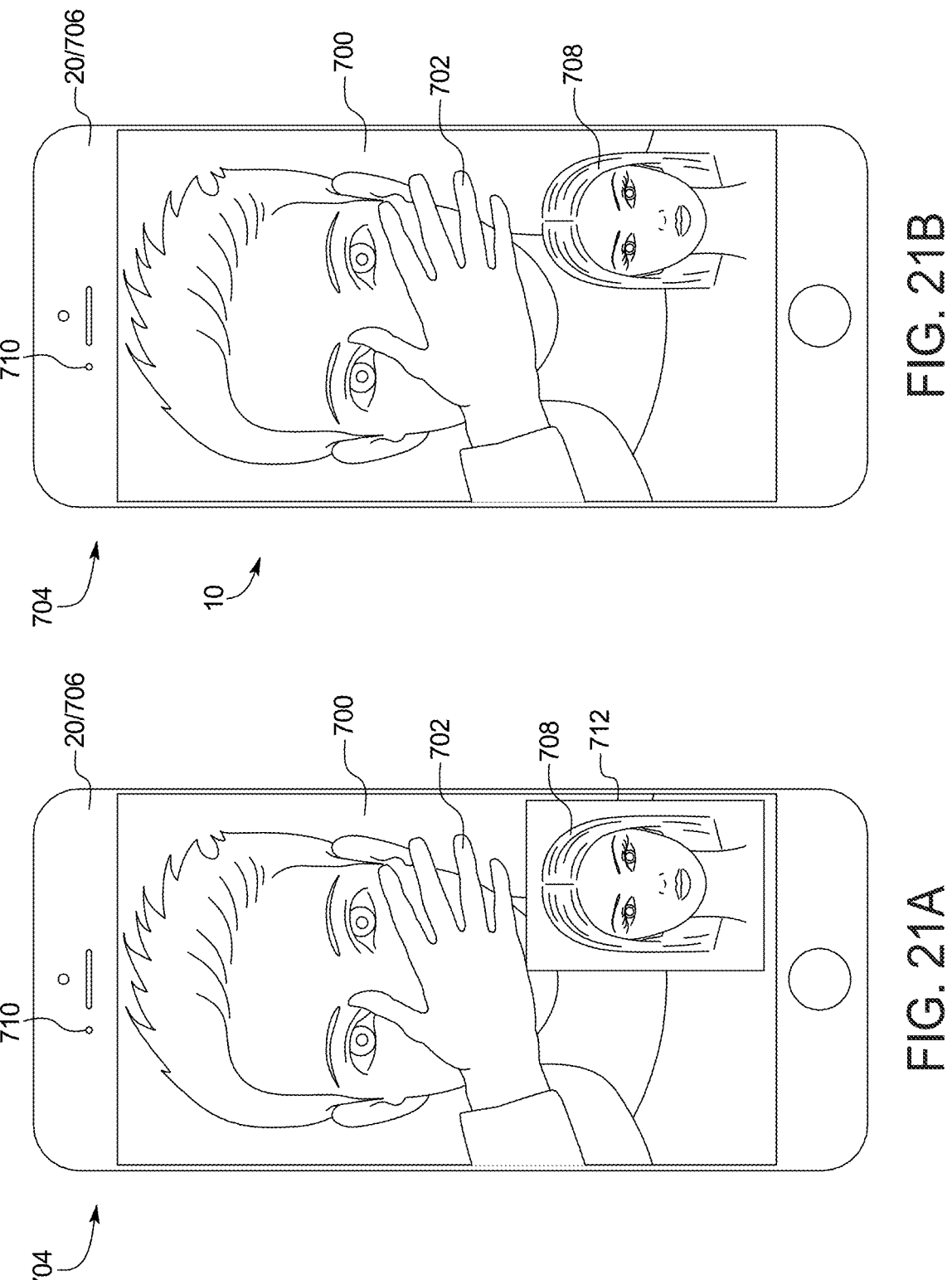
FIG. 21A is a diagram illustrating a picture-in-picture arrangement of a superimposed video including a human element of a first user captured by a rear facing camera of a first device in combination with a framed video feed of the first user captured by a front facing camera of the first device.
FIG. 21B is a diagram illustrating a picture-in-picture arrangement of a superimposed video including a human element of a first user captured by a rear facing camera of a first device in combination with an unframed video feed of the first user captured by a front facing camera of the first device.

FIGS. 21A and 21B illustrate a picture-in-picture arrangement of a superimposed video 700 including a human element 702 of a first user captured by a rear facing camera 704 of a first device 706 in combination with a video feed of the first user 708 captured by a front facing camera 710 of the first device 706. In FIG. 21A, the video feed of the first user 708 captured by a front facing camera 710 of the first device 706 is shown in a frame 712. In FIG. 18B, the video feed of the first user 708 captured by a front facing camera 710 of the first device 706 is shown unframed.

As shown in FIGS. 21A and 21B, the portion of the picture-in-picture feed may be taken from the front facing camera 710 of the first device 706 at the same time as a human element 702 (e.g., hand) of the same user is captured from a rear facing camera 714 of the first device 706. The advantage of this arrangement is that it allows both users of the system 10 to see the facial expression feedback of the other user during the interaction on the video call.

Although shown in the lower right-hand corner of the display on the first device 706, the picture-in-picture element of the video may be positioned anywhere within the frame perimeter of either display. Further, the user may have the option to move the picture-in-picture window as he or she chooses. The size of the picture-in-picture window may be fixed by the system 10 or may be able to be re-sized by the user.

As shown in FIG. 21B, the picture-in-picture element may be only an extracted human element of the second user (e.g., head and shoulders) superimposed onto the transmitted video image without a frame or other framing element. The advantage of this arrangement is that the video image of the second user takes up a minimal space on the display screen and does not include any unwanted background image.

Figure 22:
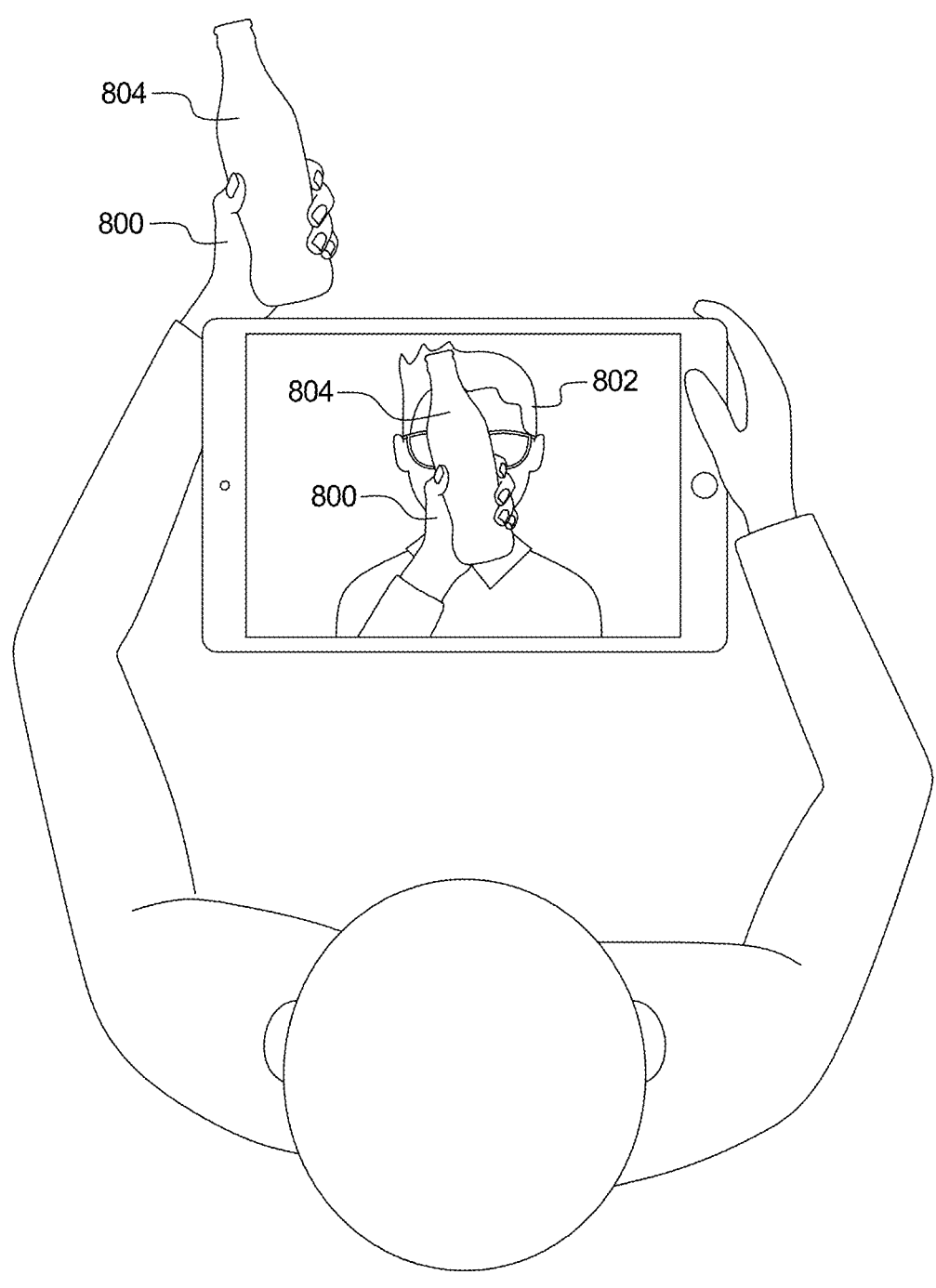
FIG. 22 is a diagram illustrating a picture-in-picture arrangement of a superimposed video including a human element of a first user and extracted non-human element captured by a rear facing camera of a first device in combination with a video feed of the first user and extracted non-human element captured by a front facing camera of the first device.

FIG. 22 illustrates yet another example of the systems 10 and methods provided herein. As shown in FIG. 22, in addition to extracting and combining human elements 800 and 802, the system 10 may be used to extract one or more objects 804 (e.g., non-human elements 804) that are in close proximity to the extracted human elements 800 and 802. In the example shown in FIG. 22, a first user 800 is holding a beverage bottle 804. Because the bottle 804 is in the user's hand 800, the most natural extraction of the user's hand 800 may include the bottle 804 as well. Accordingly, as shown in FIG. 22, the bottle 804 and the user's hand 800 obscure a portion of the second user 802 in the video.

Figure 23:
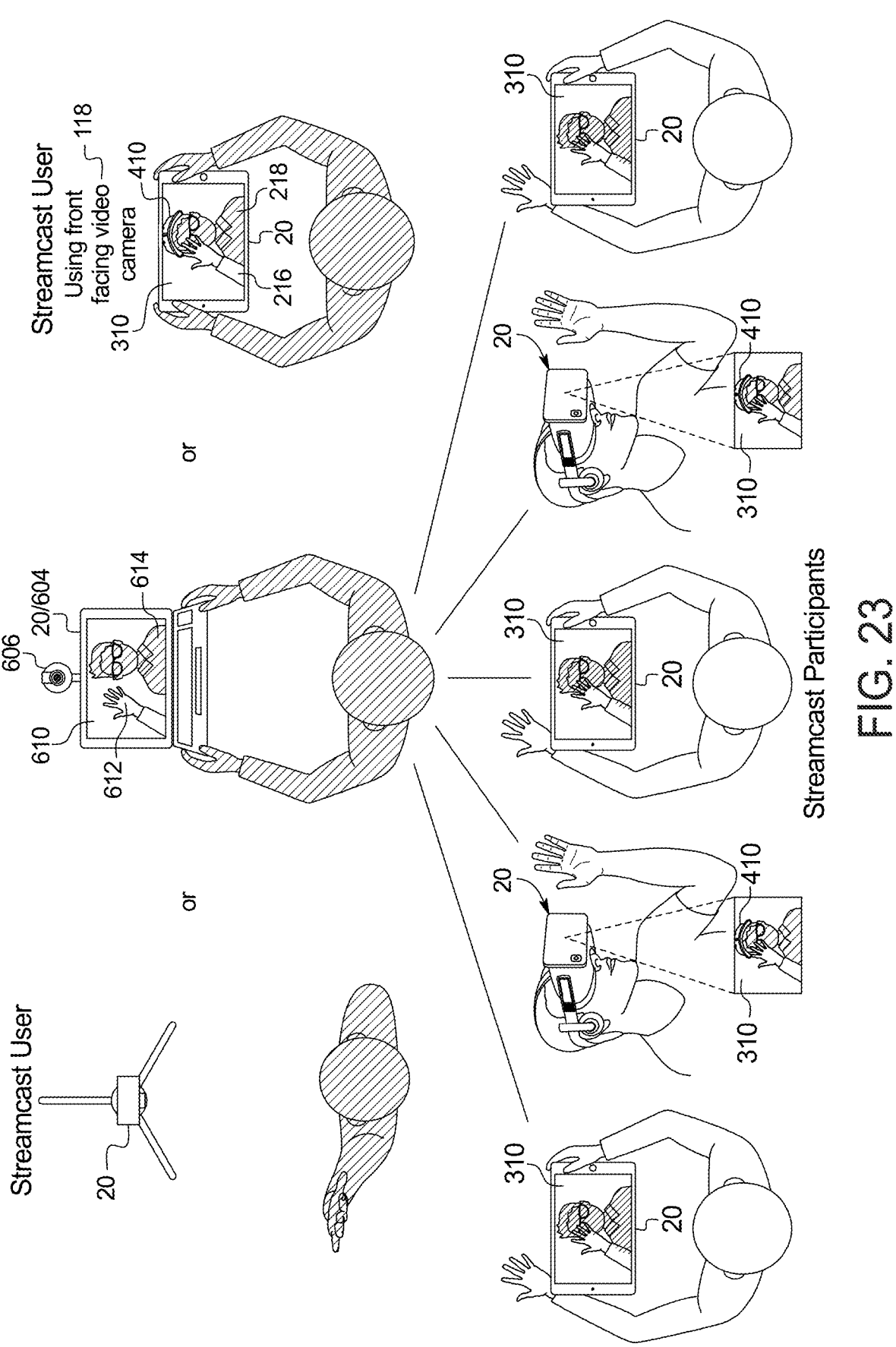
FIG. 23 is a diagram illustrating an embodiment of the system in which a single user streams video content to a plurality of stream viewers, each of which creates a person-alized composite video.

FIG. 23 illustrates an embodiment of the system 10 in which a single user streams video content to a plurality of stream viewers, each of which creates a personalized superimposed video 310 using their respective end user device 20, which may be a mobile device including a rear facing camera, a virtual reality headset 20 with an externally facing camera.

Figure 25:
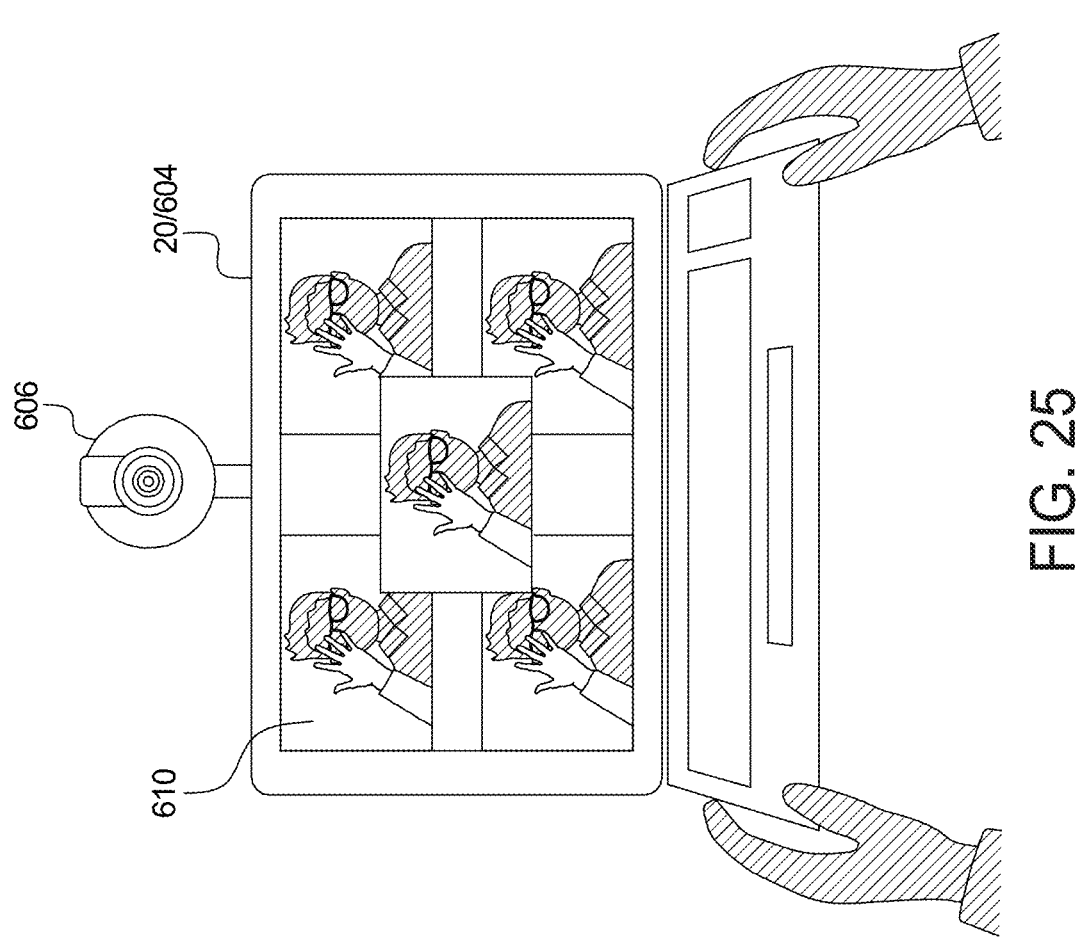
FIG. 25 is a diagram illustrating a closer view of an embodiment of the system in which a streaming user is viewing a plurality of personalized composite videos created by a corresponding plurality of stream viewers.
Figure 24:
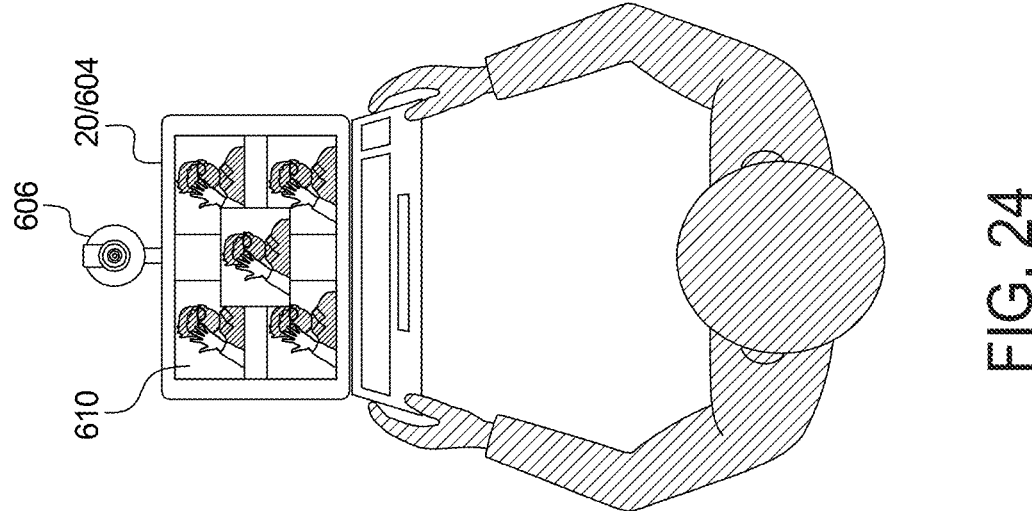
FIG. 24 is a diagram illustrating an embodiment of the system in which a streaming user is viewing a plurality of personalized composite videos created by a corresponding plurality of stream viewers.

FIGS. 24 and 25 illustrates an example of the system 10 in which the end user devices 20 include a personal computer 604 equipped with a webcam 606 that streams content to a plurality of end user devices 20. In the example shown in FIGS. 21 and 22, the webcam 606 is an external webcam peripheral. However, it is contemplated that the teachings herein can be applied to the use of a separate professional camera, a front facing integrated camera, a wireless camera, or any other image capturing device.

In the example shown in FIGS. 24 and 25, a first human element from a first video is superimposed upon a second human element from a second video to produce a superimposed video 610 in which the human elements (e.g., the first human element and the second human element) may interact and be displayed in any position relative to each other to simulate the appearance of the human elements from each video to be present in the same physical space. What is unique in this example compared to others, is that the interaction between a first video and a second video can occur between a single first video (i.e., the streamcasting user) and a large number of different second videos (i.e., the stream participants). This enables a large number of independent superimposed videos 610 to be created simultaneously using a single common streamed video feed and a number of independently distinct second video feeds. As shown, the streamcasting user may be able to view any number of the superimposed videos 610. In other embodiments, the streamcasting user is unable to view any of the superimposed videos 610, providing greater privacy for the stream participants.

In one example of the system 10 shown in FIGS. 24 and 25, the streamcasting user's video is prerecorded and the human element from the stream participants' live videos are captured superimposed in real-time. In another example of the system 10 shown in FIGS. 24 and 25, all of the videos are captured and superimposed in real-time.

In embodiments in which an augmented reality element substitutes for a human element, for example, in which a virtual hand is substituted in place of a human hand in the superimposed video, the augmented reality element may be positioned in the superimposed video using tracking data derived from the live or prerecorded video feed that includes the human element such that the augmented reality/virtual hand replicates the movements of the real hand on a continuous basis.

FIG. 26 is an overview diagram of a Multi-Way Touch call using the multi-feed video call system 10. As shown in FIG. 26, a superimposed real-time video 310 of a first user's front camera 118 (Caller 1) and a second user's rear camera 119 (Caller 2) is displayed to the second user, with a superimposed real time video 310 of the video of the second user's front camera 118 (Caller 2) and the first user's rear camera 119 (Caller 1) displayed to the first user. This allows both users to "touch" the other user simultaneously with the visual effect being enabled by the superimposition of video. This example is a near replica of the example shown in FIG. 12A; however, in the example shown in FIG. 26, each of the superimposed real time videos 310 displays an augmented reality virtual human element derived from tracking data captured by the rear facing camera of the other user device. In other words, a superimposed real-time video 310 of a first user's front camera 118 (Caller 1) and a virtual human element constructed from tracking data captured by a second user's rear camera 119 (Caller 2) is displayed to the second user, with a superimposed real time video 310 of the video of the second user's front camera 118 (Caller 2) and a virtual human element constructed from tracking data captured by the first user's rear camera 119 (Caller 1) displayed to the first user.

To achieve the superimposition effect described throughout this disclosure, the system 10 may include one or more user controllable settings that determine whether or not to extract non-human elements and, when extracting human elements, how to determine which non-human elements to extract. For example, objects in contact or close proximity to the hand can be identified using, background segmentation, computer vision detection algorithms, depth sensing, etc. and the sensitivity of the extraction may be controlled by the user through one or more settings and parameters.

For example, there may be a first setting for choosing whether or not to extract non-human elements from the video feed and there may be a second setting for choosing how close the non-human element must be to be extracted. In this example, the first setting is a binary, on-off, setting that allows the user to turn on or turn off the ability to extract non-human elements. The second setting is a sensitivity adjustment that allows the user to vary how the system 10 chooses which non-human elements to extract by enabling the user to adjust the relative depth a non-human object must be from the extracted human elements to be included in the extraction. The depth sensing camera may identify the distance the human element to be extracted is from the end user device 20.

For example, the second setting may be adjusted such that any non-human element that is both: (1) in contact with the extracted human element; and (2) within a specified distance of the extracted human elements will be extracted with the human elements. In one example, the distance from the extracted human elements may be specified directly as the distance from the human elements (e.g., within thirty centimeters of the extracted human elements). The selectiveness of the extraction of the non-human element may be varied by requiring or not requiring the extracted human and non-human elements to be in contact with each other and/or by changing the distance requirement. For example, a wider range of extraction may be useful for extracting both the user and a bed on which the user is laying while still rejecting non-human elements that are not both within contact of the user and outside of the depth range set by the user.

In another example, the system 10 may be configured such that any object (human or non-human) that is within a specified proximity to the camera is extracted. In this example, the non-human object 804 may not need to be in contact with a human object 800 and 802 to be extracted.

As shown, enabling users to adjust the sensitivity with respect to the non-human elements 804 to be extracted provides a range of options for how the video feeds are to be combined.

In a primary embodiment, an object 804 in close proximity to the human element 800 (e.g., the object 804 is a bottle held by a user and the human element 800 is the user's hand and arm) is captured by a rear facing camera on a first user device. The extracted human element 800 and non-human element 804 are then combined with at least a human element 802 captured by a front facing camera on a second user device to create a superimposed video.

In another example, the settings for controlling which non-human elements 804 to extract may include literal identification of the elements to extract. For example, upon initialization, the system 10 may identify various elements captured in the video, such as, for example, a user, a bottle held by the user, a table next to the user, and a wall in the background of the user. The system 10 may then request the user to select exactly which elements to extract, for example, by touching each element on the screen that is to be extracted. Accordingly, the user can quickly inform the system 10 which elements to extract.

Figure 27A:
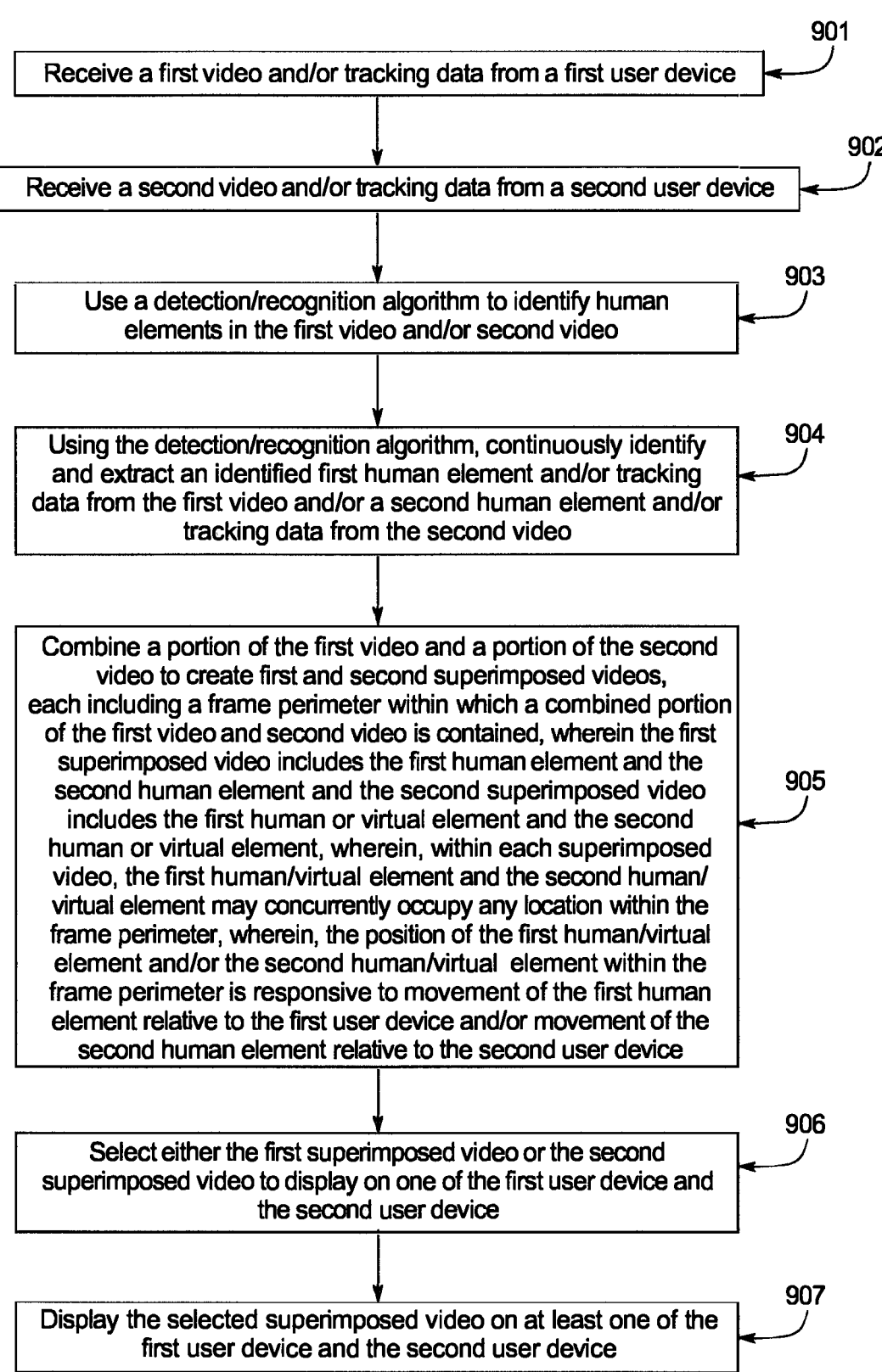
FIG. 27A is a flowchart illustrating a computer-imple-mented method of superimposing video featuring aug-mented reality element(s) carried out by a processor.

FIG. 27A is a flowchart illustrating a computer-implemented method of superimposing video 210 carried out by a processor 31 in which, within a first superimposed video, neither the first human element 216 nor the second human element 218 are virtual human elements and, within a second superimposed video, one or both of the first human element 216 and the second human element 218 are virtual human elements. As shown in FIG. 27A, the method of superimposing video 310 carried out by a processor 31 begins with a processor 31, at a first step 901, receiving a first video 210 from a first user's device 20. Reception by a processor 31 is illustrated in FIG. 27C, wherein the user device 20 of a first user transmits a first video 212 (in this case a video captured by the user's rear camera 119) to central server 30 including a processor 31 (though the processor 31 may be in a central server 30, the first user device 20, or the second user device 20). The second step 902 of superimposing video 210 carried out by a processor 31 is receiving a second video 214 from a second user's device 20. Again referring to FIG. 27C, reception of the second video 214 from a second user's device 20 by a processor 31 is illustrated (with the second video 214 being captured by the second user's rear camera 119). The third step 903 of this method calls for the processor 31 (within the server 30 or any one or more of the end user devices 20) to identify a first human element 216 in the first video 212 and/or a second human element 218 in a second video 214 by use of a detection/recognition algorithm. Such human elements are illustrated in FIGS. 13B-13G with the first human element 216 being a hand (captured by the first user's rear camera 119) and the second human element 218 being a face (captured by the second user's front camera 118) or hand (captured by the second user's rear camera 119) in these examples. A human element may be any body part or prosthetic and can even be the body parts of a non-human creature (e.g., dog, cat, gorilla, etc.), however. The system 10 may also only capture a human element from one end user (216 or 218) and transmit it to both.

The fourth step 904 calls for the system 10 to continuously identify and extract a first human element 216 (identified in the first video 212) and/or second human element 218 (identified in the second video 214) from their respective videos. Extraction may be carried out by the detection/recognition algorithm or a separate piece of programing and the methodologies used to extract a given human element may vary depending on technological resources available to a given set of end users. Identification and extraction includes identifying human element location data and using the data to create a virtual human element for one or more of the human elements.

The fifth step 905 of the computer-implemented method of superimposing video 210 carried out by a processor 31 is combining a portion of the first video 212 and a portion of the second video 214 in real-time to create a superimposed video including a frame perimeter 309 within which a combined portion of the first video 212 and second video 214 is contained, wherein the superimposed video 310 includes the first human element 216 and the second human element 218, wherein, within the superimposed video 310, the first human element 216 and the second human element 218 may concurrently occupy any location within the frame perimeter 309 and the positions of the human elements 216 and/or 218 within the frame perimeter 309 are responsive to movement of these human elements 216 and/or 218 relative to their corresponding end user devices 20. As mentioned above, a human element (216 or 218) may be captured unilaterally by the system without the need for the human element of another to be present for capture, extraction, transmission, etc. to occur. In the example shown in FIG. 27A, the step of creating a superimposed video 310 includes creating a first superimposed video 310 in which the first human element 216 and the second human element 218 are not virtual human elements and a second superimposed video 310 in which one or more of the first human element 216 and the second human element 218 are virtual human elements. As described below, either of the first superimposed video 310 and the second superimposed video 310 may displayed on either of the first user device 20 or the second user device 20.

The sixth step 906 of the method of superimposing video carried out by a processor 31 includes selecting either the first superimposed video 310 or the second superimposed video 310 to display on one of the first user device 20 and the second user device 20.

The final step 907 of the computer-implemented method of superimposing video carried out by a processor 31 is displaying the selected superimposed video 310 to a user device 20.

In the method shown in FIG. 27A, either user may view the version of the superimposed video 310 in which one or more of the human elements are virtual human elements or the version of the superimposed video 310 in which each of the human elements are real life human elements. Further, the computer processing required to perform each of the steps in the method described with reference to FIG. 27A may be carried out by a processor 31 in a central server 30 or either of the user devices 20.

Figure 27B:
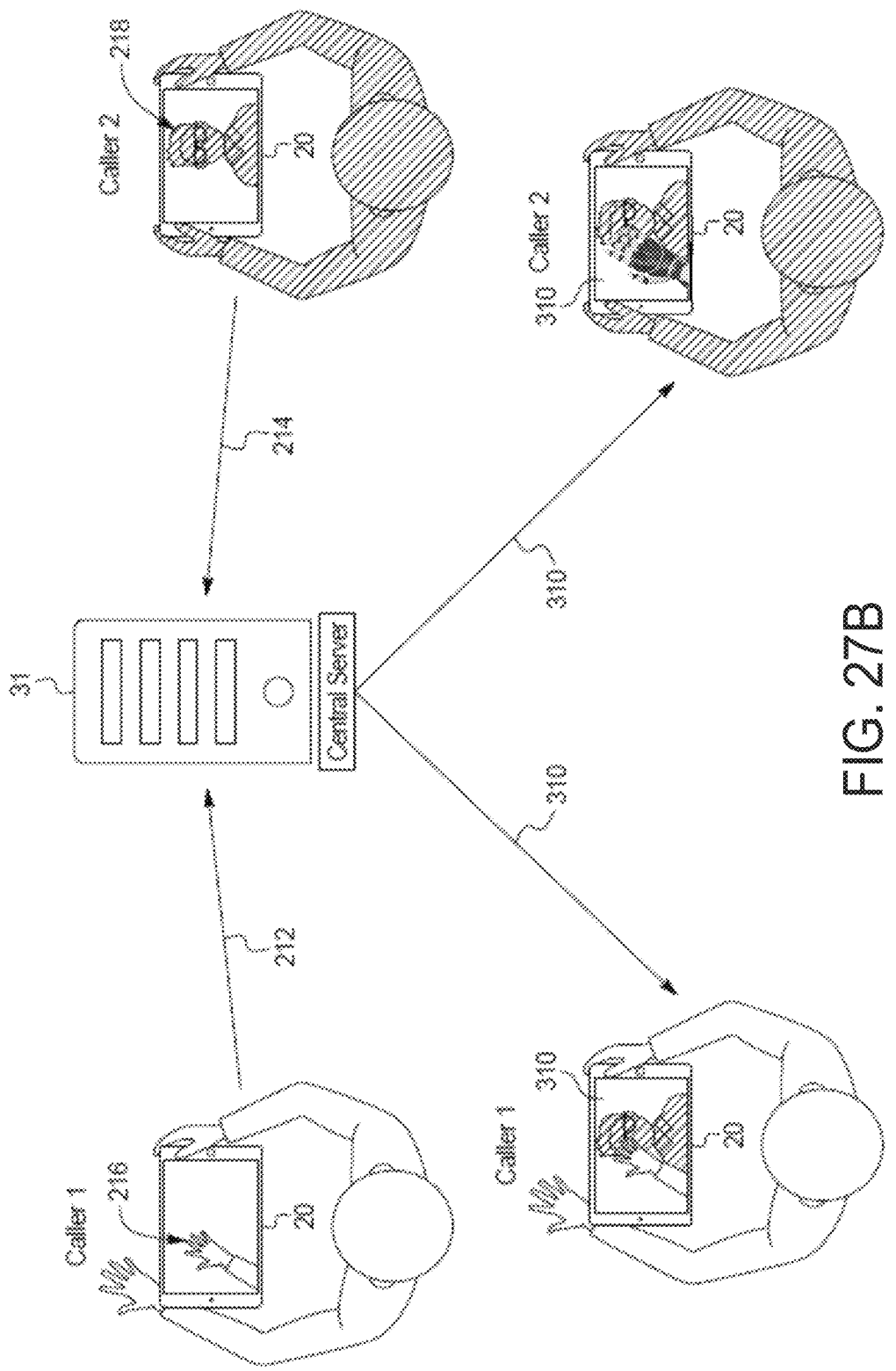
FIG. 27B is a diagram of a Multi-Way Touch call using the multi-feed video call system in which each user device's rear facing camera captures human element tracking data used to constructed and display a virtual human element in a superimposed video.
Figure 27C:
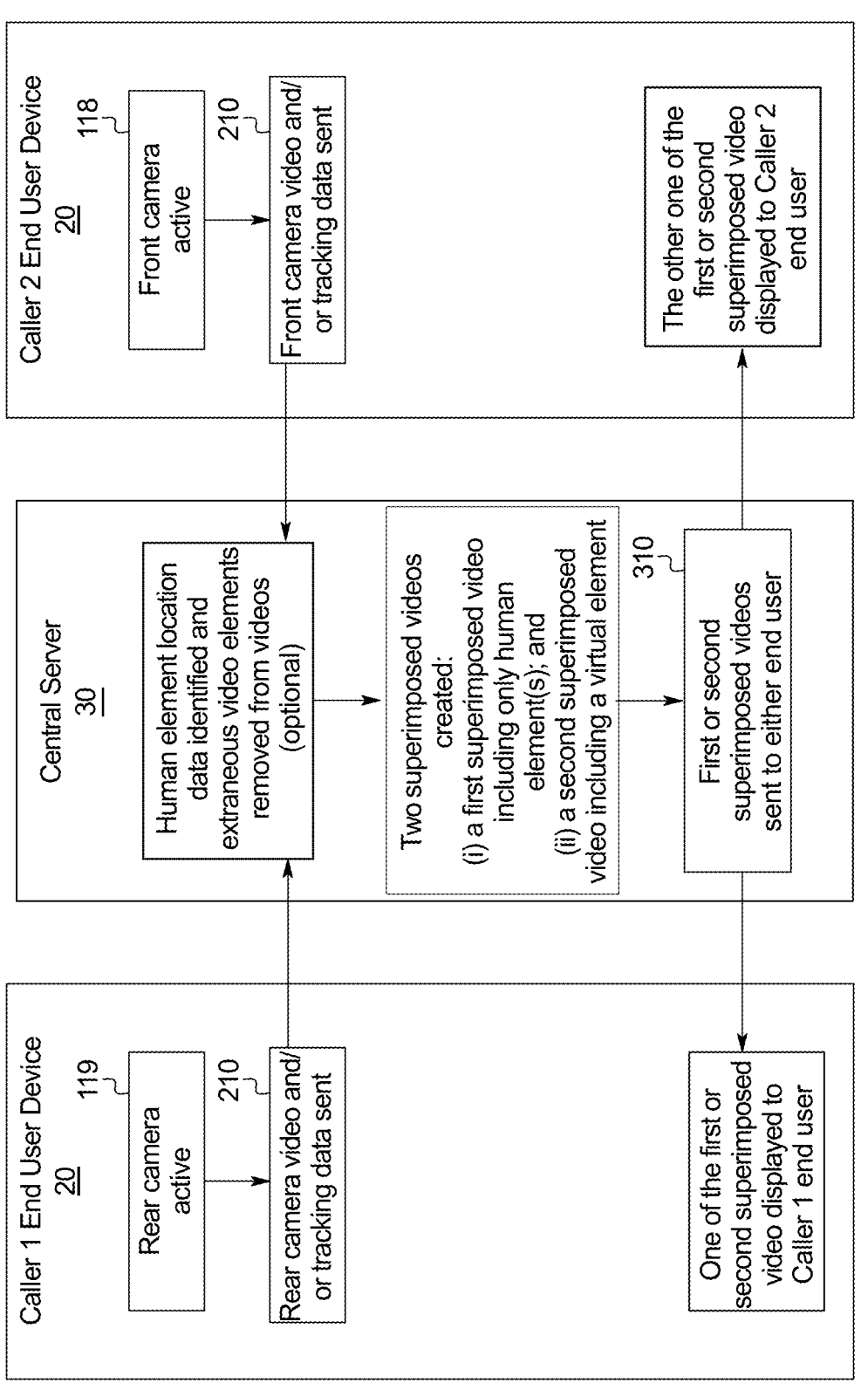
FIGS. 27C and 27D are flowcharts of video calls using the multi-feed video call system in which each of the user devices is able to display one of a first version of a superimposed video including no virtual human elements or a second version of a superimposed video including one or more virtual human elements.

The example shown in FIG. 27B illustrates an embodiment of the method described with respect to FIG. 27A in which a first user device 20 displays a superimposed video 310 including only non-virtual human elements and a second user device 20 displays a superimposed video 310 including at least one virtual human element (a virtual hand representing the first user's hand 216 as captured by the rear facing camera of the first user device 20).

As described with respect to FIG. 27A, the method includes selecting either the first superimposed video 310 or the second superimposed video 310 to display on one of the first user device 20 and the second user device 20. In the embodiment shown in FIG. 27B, the version of the superimposed video 310 including virtual human elements was selected and displayed on the second user device 20. The selection may be made by the processor 31 based on system resources and network capability, it may be made by a user selection based on preference, or may be made in any other manner. In some embodiments, the selection may be made at any time during the video call.

Figure 27D:
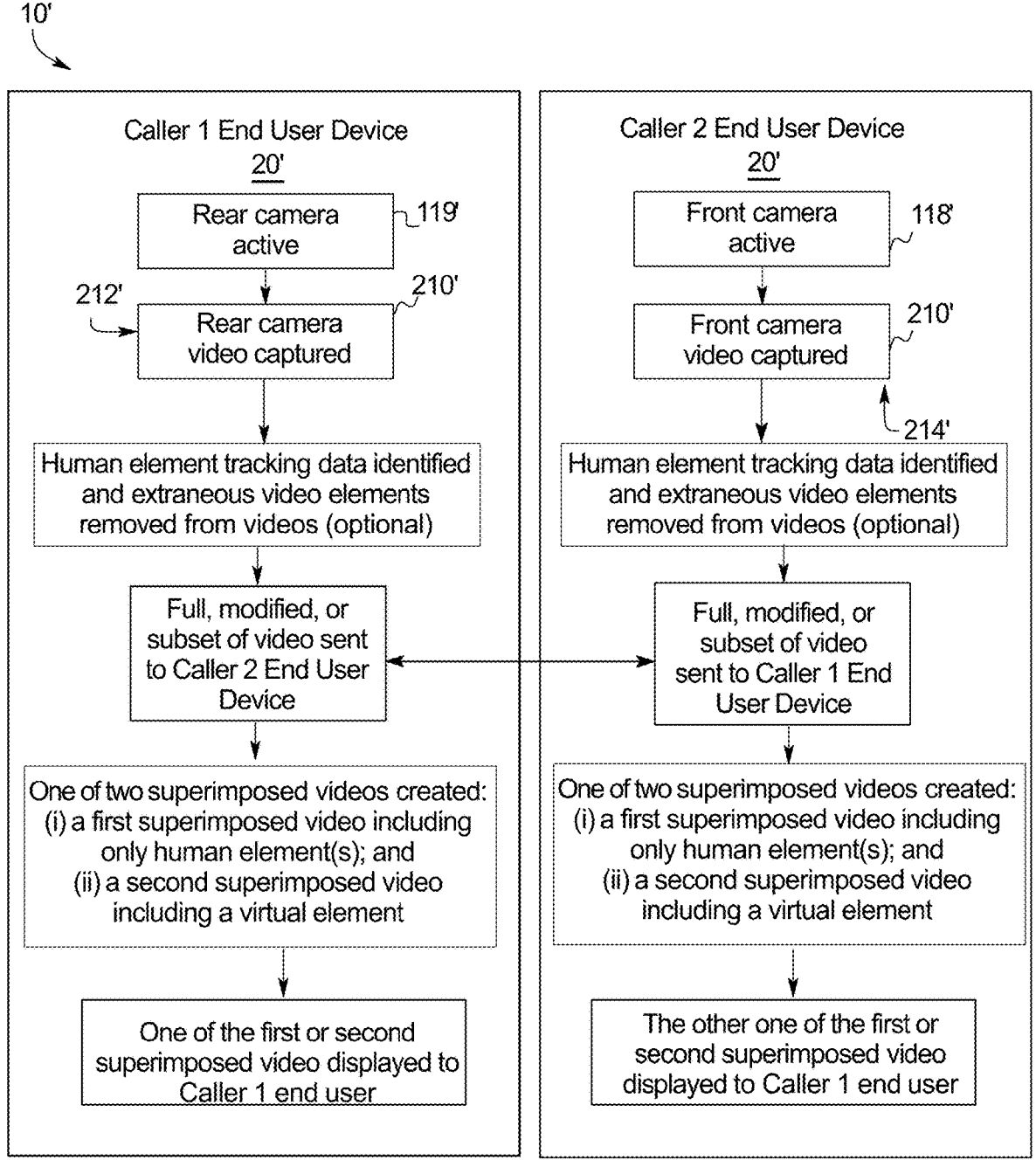

FIG. 27C is a flowchart 10 of a call using the multi-feed video call system 10 in which the system creates two versions of each superimposed video 310, a first version in which there are only human elements and no virtual human elements, and a second version in which at least one of the human elements is a represented by a virtual human element. In this example, either of the user devices 20 may display either of the superimposed videos 310, as shown and described above with respect to FIGS. 27A and 27B. FIG. 27D illustrates an alternative flowchart 10' of the multi-feed video call system 10' with the functions of the central server 30 described above with reference to FIG. 27C are carried out on each of the Caller 1 and Caller 2 end user devices 20'.

Specifically, in the system 10' of FIG. 27D, each of the Caller 1 and Caller 2 end user devices 20' captures a video 210' and optionally analyzes the video 210' to identify location data of the human elements therein and/or to remove extraneous information from the videos 210'. Each of the Caller 1 and Caller 2 end user devices 20' then sends the full video 210', a modified version of the video 210', and/or a subset of the video 210', such as the location data, to the other end user device 20'. Each end user device 20' then proceeds to combine the received video 210' with the device's own respective video 210' into a superimposed video 310'.

Each end user device 20' generates one of two superimposed videos: a first version in which there are only human elements and no virtual human elements, and a second version in which at least one of the human elements is a represented by a virtual human element. Each of the user devices 20' displays one of the superimposed videos 310, as shown and described above with respect to FIGS. 27A and 27B.

Figure 28A:
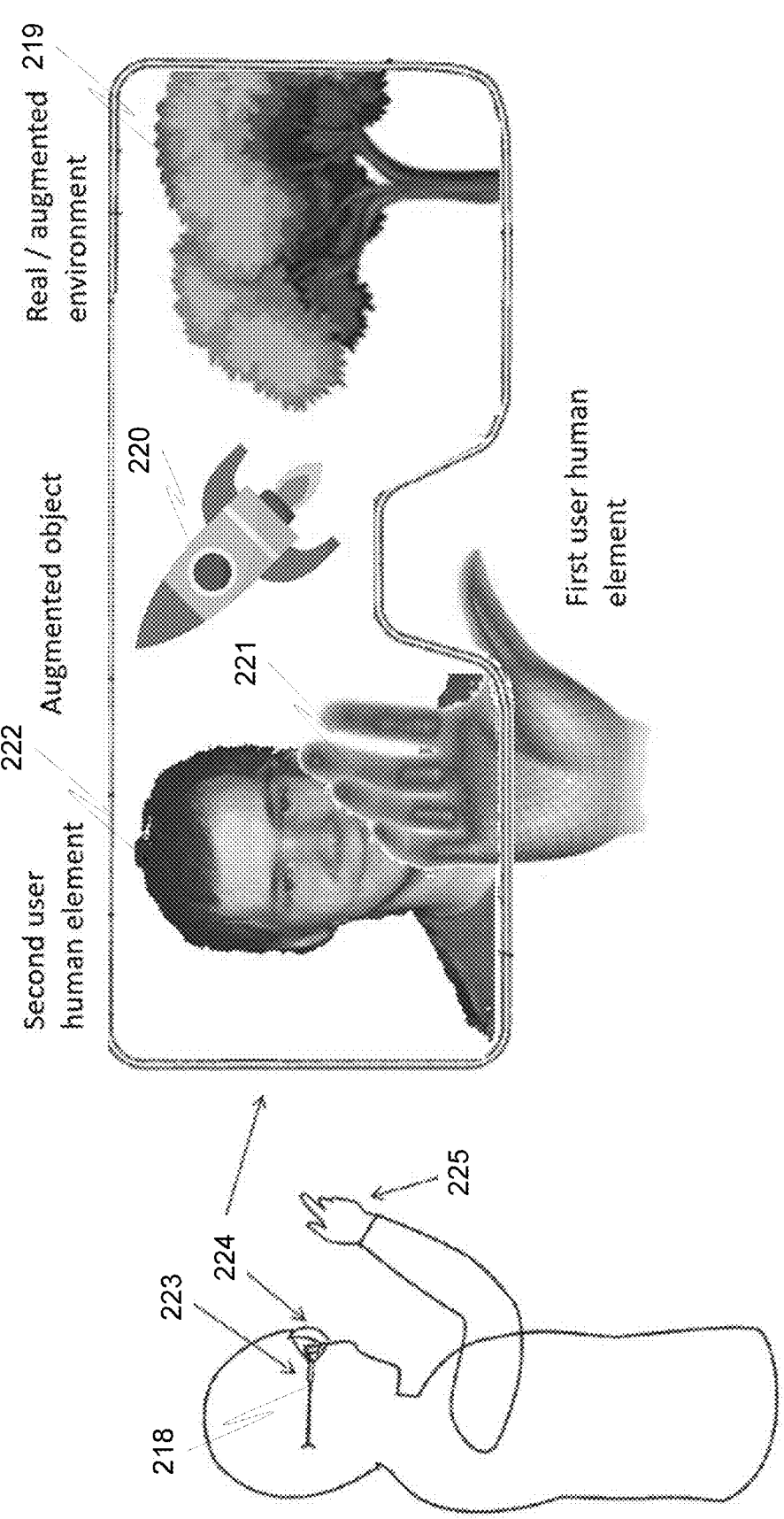
FIG. 28A illustrates an implementation of a method of superimposing images using an XR mixed reality headset (e.g., AR glasses) consistent with the disclosed embodi-ments.

FIG. 28A illustrates an implementation of a method of superimposing images using an XR mixed reality headset (e.g., AR glasses) consistent with the disclosed embodiments.

Referring to FIG. 28A, in this embodiment, the user's device is implemented as an XR/mixed reality headset 218. The human element 225 of the first user may be viewed on the display of the first user's device as an image (or a three-dimensional virtual model) 221, which in this embodiment is the lens 224 of the mixed reality headset 218. In this embodiment, the human element 222 from the second user device (not shown) may be combined with the first human element 221 and visible on the lens 224 of first user device (e.g., XR/mixed reality headset 218). The background may include a simulated augmented/virtual environment 219 and/or augmented object(s) 220. The mobile device/XR headset 218 may have a built-in speaker 223 to simulate the sound of contact being made between the first user and the second user.

Figure 28B:
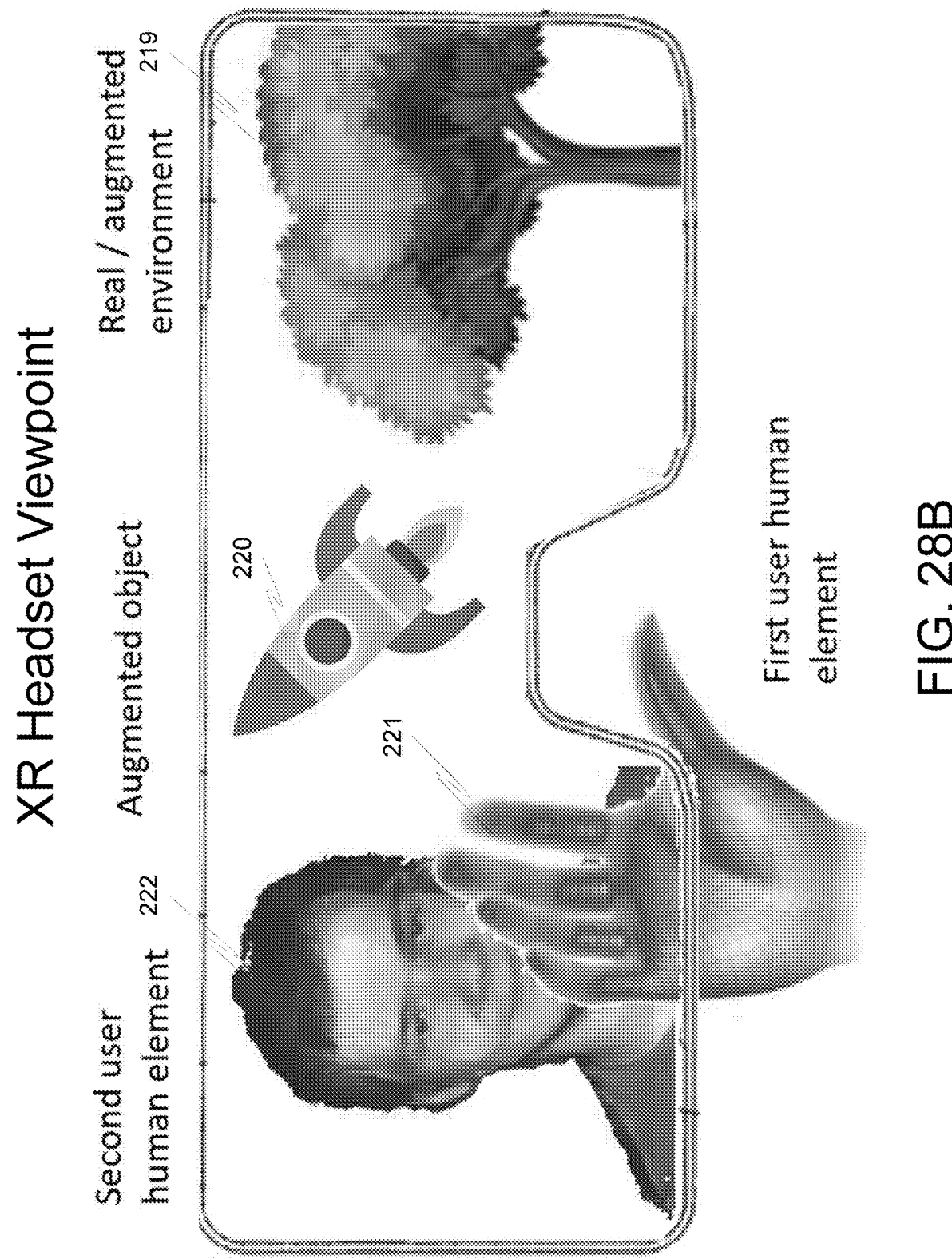
FIG. 28B illustrates XR headset view resulting from the implementation depicted in FIG. 28A.

FIG. 28B illustrates XR headset view resulting from the implementation depicted in FIG. 28A.

Referring to FIG. 28B, in this embodiment, the user's device is implemented as an XR/mixed reality headset 218 that has a screen. FIG. 28B illustrates a view presented to the user on the screen of the XR/mixed reality headset 218. The human element 225 of the first user may be viewed on the display of the first user's device as an image (or a three-dimensional virtual human element) 221, which in this embodiment is the lens 224 of the mixed reality headset 218. In this embodiment, the human element 222 from the second user device (not shown) may be combined with the first human element 221 and visible on the lens 224 of first user device (e.g., XR/mixed reality headset 218). The background may include a simulated augmented/virtual environment 219 and/or augmented object(s) 220.

In one embodiment, a first user human element, such as a hand, may be detected and tracking data of the two-dimension image of the hand may be determined. Then, a classifier or a feature vector may be generated and injected into an AI-based machine learning module programmed to generate a three-dimensional virtual human element. Accordingly, an AI-generated three-dimensional virtual model of the first user human element may be generated and superimposed over the image of the second user element within the simulated augmented/virtual environment 219.

In one embodiment, the users' devices may be implemented as a smartphone or computer. Yet in another embodiment, the users' devices may be implemented as two XR headsets. In the latter case, the human elements may be identified and extracted using outward facing cameras integrated into each of the XR headsets.

In one embodiment, the second human element shown in the XR headset display may be a pre-recorded image or a three-dimensional model. Note that in the XR headset implementation the background may reflect the real-world environment or the virtual reality environment viewed through the viewing lens of the XR headset.

Any of the video arrangements described in the examples herein may, or may not, incorporate a picture-in-picture view showing the view from the user's front facing camera on the user's device 20. The picture-in-picture view may be used such that the rear facing camera is providing a video feed for a combined video while the front facing camera is providing a video feed for the picture-in-picture view. The feed for the picture-in-picture view may be taken from an additional camera.

Throughout the examples provided herein, there are descriptions of various forms of occlusion (i.e., one object obscuring the view of another). There are examples of the first human element 216 obscuring the second human element 218 and vice versa. There are examples in which augmented reality elements 410 are obscured by the human element 216 in the video and vice versa. It will also be understood by those skilled in the art based on the descriptions provided herein that augmented reality elements 410 may occlude other augmented reality elements 410 and that one of the benefits of the occlusive effect is that it helps to create a more interactive, realistic and immersive environment for the users.

In addition, in some embodiments of the system 10 described herein, any occlusion that results in obscuring one or more of the human elements, such as, for example, any overlapping of the human elements on the display of the user's device activates a haptic vibration on at least one of the user devices. This vibration helps to simulate the sensation of touch between the users. This haptic response may be selectively triggered, or induced, by a user who is viewing the relative position of the human elements on a display. For example, a user may align the position of the first human element of the first user to simulate contact with the second human element of the second user in the superimposed video while viewing the position of the first human element of the first user and the second human element of the second user on the front facing display of the first user device to selectively induce a haptic response in one or both of the first user device and the second user device.

In all of the examples embodied in the preceding figures, arrangements, and descriptions, the term "human element" encompasses both: (i) virtual human elements constructed from virtual human element models and tracking data; and (ii) human elements extracted from video images.

Aspects of the systems and methods provided herein encompass hardware and software for controlling the relevant functions. Software may take the form of code or executable instructions for causing a processor or other programmable equipment to perform the relevant steps, where the code or instructions are carried by or otherwise embodied in a medium readable by the processor or other machine. Instructions or code for implementing such operations may be in the form of computer instruction in any form (e.g., source code, object code, interpreted code, etc.) stored in or carried by any tangible readable medium.

It should be noted that various changes and modifications to the presently preferred embodiments described herein will be apparent to those skilled in the art. Such changes and modifications may be made without departing from the spirit and scope of the present invention and without diminishing its attendant advantages.

The following is claimed:

1. A computer-implemented system for superimposing video using a first user device used by a first user and a second user device used by a second user, wherein the first user device includes (i) a front display screen, and (ii) a rear facing camera, and wherein the second user device includes (i) a front display screen, and (ii) a front facing camera, and wherein the front facing camera of the first user device faces the first user while the first user is viewing the front display screen of the first user device, and wherein the rear facing camera of the first user faces away from the first user while the first user is viewing the front display screen of the first user device, and wherein the front facing camera of the second user device faces the second user while the second user is viewing the front display screen of the second user device, and wherein the rear facing camera of the second user faces away from the second user while the second user is viewing the front display screen of the second user device, the system comprising:

(a) a detection algorithm configured to identify and extract human elements in real-time video; and (b) a processor configured to:

(i) receive real-time video captured by the front facing camera of the second user device, (ii) identify and extract a human element of the second user in the real-time video captured by the front facing camera of the second user device using the detection algorithm, (iii) receive real-time video captured by the rear facing camera of the first user device, (iv) identify and extract a human element of the first user in the real-time video captured by the rear facing camera of the first user device using the detection algorithm, (v) superimpose the identified and extracted human elements of the first user and the second user upon one another to create a superimposed video containing overlapping human elements from the first user and the second user, thereby giving a visual impression of physical interaction between the first user and the second user, and (vi) electronically provide the superimposed video to at least one of the first user device and the second user device for viewing on the front display screen of the respective first user device and/or the second user device.

2. The system of claim 1 wherein the first user device is a virtual reality (VR) headset that is configured to add an augmented reality element associated with the first user to the real-time video captured by the rear facing camera of the first user device, and wherein the augmented reality element is included in the superimposed video.

3. The system of claim 1 wherein the second user device is a smartphone or a tablet.

4. The system of claim 1 wherein the rear facing camera of the first user device is a depth sensing camera, and wherein information provided by the real-time video captured by the rear facing camera of the first user device is used by the detection algorithm to identify and extract the human element from the real-time video captured by the rear facing camera of the first user device.

5. The system of claim 1 wherein the front facing camera of the second user device is a depth sensing camera, and wherein information provided by the real-time video captured by the front facing camera of the second user device is used by the detection algorithm to identify and extract the human element from the real-time video captured by the front facing camera of the second user device.

6. The system of claim 1 wherein the processor is remotely located with respect to the first user device and the second user device, and wherein the detection algorithm is executed by the processor, and wherein the superimposed video is electronically transmitted by the remotely located processor to at least one of the first user device and the second user device for viewing on the front display screen of the respective first user device and/or the second user device.

7. The system of claim 1 wherein the first user device and the second user device are in communication with each other via video conferencing software, and wherein the superimposed video is electronically provided to the least one of the first user device and the second user device via the video conferencing software.

8. The system of claim 1 wherein the superimposed video includes a frame perimeter that contains the overlapping human elements from the first user and the second user, and wherein, within the superimposed video, the human elements from the first user and the second user may concurrently occupy any location within the frame perimeter.

9. A computer-implemented method for superimposing video using a first user device used by a first user and a second user device used by a second user, wherein the first user device includes (i) a front display screen, and (ii) a rear facing camera, and wherein the second user device includes (i) a front display screen, and (ii) a front facing camera, and wherein the front facing camera of the first user device faces the first user while the first user is viewing the front display screen of the first user device, and wherein the rear facing camera of the first user faces away from the first user while the first user is viewing the front display screen of the first user device, and wherein the front facing camera of the second user device faces the second user while the second user is viewing the front display screen of the second user device, and wherein the rear facing camera of the second user faces away from the second user while the second user is viewing the front display screen of the second user device, the method comprising:

(a) receiving by a processor real-time video captured by the front facing camera of the second user device;

(b) identifying and extracting a human element of the second user in the real-time video captured by the front facing camera of the second user device using a detection algorithm configured to identify and extract human elements in real-time video;

(c) receiving by the processor real-time video captured by the rear facing camera of the first user device;

(d) identifying and extracting a human element of the first user in the real-time video captured by the rear facing camera of the first user device using the detection algorithm;

(e) superimposing by the processor the identified and extracted human elements of the first user and the second user upon one another to create a superimposed video containing overlapping human elements from the first user and the second user, thereby giving a visual impression of physical interaction between the first user and the second user; and (f) electronically providing by the processor the superimposed video to at least one of the first user device and the second user device for viewing on the front display screen of the respective first user device and/or the second user device.

10. The method of claim 9 wherein the first user device is a virtual reality (VR) headset that is configured to add an augmented reality element associated with the first user to the real-time video captured by the rear facing camera of the first user device, and wherein step (e) further comprises including the augmented reality element in the superimposed video.

11. The method of claim 9 wherein the second user device is a smartphone or a tablet.

12. The method of claim 9 wherein the rear facing camera of the first user device is a depth sensing camera, and wherein information provided by the real-time video captured by the rear facing camera of the first user device is used by the detection algorithm to identify and extract the human element from the real-time video captured by the rear facing camera of the first user device.

13. The method of claim 9 wherein the front facing camera of the second user device is a depth sensing camera, and wherein information provided by the real-time video captured by the front facing camera of the second user device is used by the detection algorithm to identify and extract the human element from the real-time video captured by the front facing camera of the second user device.

14. The method of claim 9 wherein the processor is remotely located with respect to the first user device and the second user device, and wherein the detection algorithm is executed by the processor, and wherein step (f) further comprises electronically transmitting the superimposed video by the remotely located processor to at least one of the first user device and the second user device for viewing on the front display screen of the respective first user device and/or the second user device.

15. The method of claim 10 wherein the first user device and the second user device are in communication with each other via video conferencing software, and wherein the superimposed video is electronically provided to the least one of the first user device and the second user device via the video conferencing software.

16. The method of claim 9 wherein the superimposed video includes a frame perimeter that contains the overlapping human elements from the first user and the second user, and wherein, within the superimposed video, the human elements from the first user and the second user may concurrently occupy any location within the frame perimeter.

17. A computer-implemented system for superimposing video using a first user device used by a first user and a second user device used by a second user, wherein the first user device is a virtual reality (VR) headset and includes (i) a front display screen, and (ii) a rear facing camera, and wherein the second user device includes (i) a front display screen, and (ii) a front facing camera, and wherein the front display screen of the first user device faces the first user while the first user is viewing the front display screen of the first user device, and wherein the rear facing camera of the first user faces away from the first user while the first user is viewing the front display screen of the first user device, and wherein the second user device is a smartphone or tablet, and wherein the front facing camera of the second user device faces the second user while the second user is viewing the front display screen of the second user device, the system comprising:

(a) a detection algorithm configured to identify and extract human elements in real-time video; and (b) a processor configured to:

(i) receive real-time video captured by the front facing camera of the second user device, wherein the real-time video captured by the front facing camera of the second user device includes real-time video of the second user, (ii) receive real-time video captured by the rear facing camera of the first user device, (iii) identify and extract a human element of the first user in the real-time video captured by the rear facing camera of the first user device using the detection algorithm, (iv) superimpose the identified and extracted human elements of the first user and the real-time video of the second user upon one another to create a real-time superimposed video containing overlapping human elements from the first user and the real-time video of the second user, thereby giving a visual impression of physical interaction between the first user and the second user, and (v) electronically provide the real-time superimposed video to the first user device for viewing on the front display screen of the first user device.

18. The system of claim 17 wherein the processor is further configured to:

(vi) electronically add a passive augmented reality environment element to the real-time superimposed video displayed to the first user on the front display screen of the first user device.

19. The system of claim 17 wherein the processor is further configured to:

(vi) electronically add an augmented reality human hand element to the real-time superimposed video displayed to the first user on the front display screen of the first user device.

20. The system of claim 17 wherein the rear facing camera of the first user device is assisted by a depth sensing camera, and wherein information provided by the real-time video captured by the rear facing camera and the depth sensing camera of the first user device is used by the detection algorithm to identify and extract the human element from the real-time video captured by the rear facing camera of the first user device.

21. The system of claim 17 wherein the processor is remotely located with respect to the first user device, and wherein the detection algorithm is executed by the processor, and wherein the real-time superimposed video is electronically transmitted by the remotely located processor to the first user device for viewing on the front display screen of the first user device.

22. The system of claim 17 wherein the first user device and the second user device are in communication with each other via video conferencing software, and wherein the real-time superimposed video is electronically provided to the first user device via the video conferencing software.

23. The system of claim 17 wherein the real-time superimposed video includes a frame perimeter that contains the overlapping human elements from the first user and the real-time video of the second user, and wherein, within the real-time superimposed video, the human elements from the first user and the real-time video of the second user may concurrently occupy any location within the frame perimeter.

24. A computer-implemented method for superimposing video using a first user device used by a first user and a second user device used by a second user, wherein the first user device is a virtual reality (VR) headset and includes (i) a front display screen, and (ii) a rear facing camera, and wherein the second user device includes (i) a front display screen, and (ii) a front facing camera, and wherein the front display screen of the first user device faces the first user while the first user is viewing the front display screen of the first user device, and wherein the rear facing camera of the first user faces away from the first user while the first user is viewing the front display screen of the first user device, and wherein the second user device is a smartphone or tablet, and wherein the front facing camera of the second user device faces the second user while the second user is viewing the front display screen of the second user device, the method comprising:

(a) receiving by a processor real-time video captured by the front facing camera of the second user device, wherein the real-time video captured by the front facing camera of the second user device includes real-time video of the second user;

(b) receiving by the processor real-time video captured by the rear facing camera of the first user device;

(c) identifying and extracting a human element of the first user in the real-time video captured by the rear facing camera of the first user device using a detection algorithm that is configured to identify and extract human elements in real-time video;

(d) superimposing by the processor the identified and extracted human elements of the first user and the real-time video of the second user upon one another to create a real-time superimposed video containing overlapping human elements from the first user and the real-time video of the second user, thereby giving a visual impression of physical interaction between the first user and the second user; and (e) electronically providing by the processor the real-time superimposed video to the first user device for viewing on the front display screen of the first user device.

25. The method of claim 24 further comprising:

(f) electronically adding by the processor a passive augmented reality element to the real-time superimposed video displayed to the first user on the front display screen of the first user device.

26. The method of claim 24 further comprising:

(f) electronically adding by the processor an augmented reality hand element to the real-time superimposed video displayed to the first user on the front display screen of the first user device.

27. The method of claim 24 wherein the second user device is a smartphone or a tablet.

28. The method of claim 24 wherein the rear facing camera of the first user device is a depth sensing camera, and wherein information provided by the real-time video captured by the rear facing camera of the first user device is used by the detection algorithm to identify and extract the human element from the real-time video captured by the rear facing camera of the first user device.

29. The method of claim 24 wherein the processor is remotely located with respect to the first user device, and wherein the detection algorithm is executed by the processor, and wherein the real-time superimposed video is electronically transmitted by the remotely located processor to the first user device for viewing on the front display screen of the first user device.

30. The method of claim 24 wherein the first user device and the second user device are in communication with each other via video conferencing software, and wherein the real-time superimposed video is electronically provided to the first user device via the video conferencing software.

31. The method of claim 24 wherein the real-time superimposed video includes a frame perimeter that contains the overlapping human elements from the first user and the real-time video of the second user, and wherein, within the real-time superimposed video, the human elements from the first user and the real-time video of the second user may concurrently occupy any location within the frame perimeter.

* * * * *